United States Patent

Bartlett et al.

[15] 3,662,349

[45] May 9, 1972

[54] STORED PROGRAM SYSTEM

[72] Inventors: William F. Bartlett, East Rochester; John C. Gifford, Phelps; Pedro A. Lenk, Rochester; William A. Oswald, Rochester; Frank Y. Shaw, Rochester, all of N.Y.; Thomas D. Stuebe, Arvada, Colo.; Lloyd H. Yost, Honeoye Falls, N.Y.

[73] Assignee: Stromberg-Carlson Corporation, Rochester, N.Y.

[22] Filed: Nov. 26, 1969

[21] Appl. No.: 880,110

[52] U.S. Cl. .......... 340/172.5
[51] Int. Cl. .......... G06f 1/04, G06f 9/06
[58] Field of Search .......... 340/172.5

[56] References Cited

UNITED STATES PATENTS

| | | | |
|---|---|---|---|
| 2,913,176 | 11/1959 | Berezin | 340/172.5 |
| 3,513,446 | 5/1970 | Cotton et al. | 340/172.5 |

*Primary Examiner*—Raulfe B. Zache
*Attorney*—Craig, Antonelli & Hill

[57] ABSTRACT

A stored program data processing system including a logic control arrangement including a particular arithmetic and logic unit controlled from instruction translating means responsive to instructions stored in a memory for effecting supervision and control over a telephone exchange in accordance with timed sequences provided by a cycle control arrangement.

82 Claims, 35 Drawing Figures

INVENTORS
William F. Bartlett; John C. Gifford; Pedro A. Lenk; William R. Oswald; Frank Y. Shaw; Thomas D. Stavba AND Lloyd H. Yost

BY

Craig, Antonelli, Stewart & Hill

ATTORNEYS

TABLE OF CONTENTS

| | Column |
|---|---|
| General Description | 3 |
| Machine Cycle Sequencer | 9 |
| Cycle Sequencer Control | 12 |
| Interface System | 14 |
| Arithmetic and Logic Unit | 16 |
| General Operation Description | 21 |
| Interrupt Circuit | 25 |
| Line Scan, Control and Interconnection | 30 |

STORED PROGRAM SYSTEM

The present invention relates to automatic data processing systems, in general, and to a particular automatic control system for controlling operation of a telephone exchange.

The progress of technology in recent years has emphasized the increased dependency upon automation and the use of computor systems for control over application systems and devices. This demand for more sophisticated and more versatile control systems is particularly felt in connection with those industries which provide consumer services. The constant demand for greater categories of services with greater reliability and capacity for service in areas of generally used consumer equipment has spurned an entirely new industry based upon the use of computor techniques for effecting the speed of operation, capacity and capability of service and dependability demanded by the general public.

The telephone industry has progressed through many eras of development wherein the operator controlled exchange was eventually replaced by the much improved automatic switching equipment, which provided for faster operation and greater capacity for service with accompanying reduction in the cost of communication. However, the demand for greater service capabilities and faster operating times has motivated the development of electronic switching systems and common control systems which are capable of providing an even greater amount of subscriber services including direct distance dialing, call forwarding, conference calls, malicious call control and other special classes of service.

Each step in the progress of the telephone industry has resulted in simplification of the communication equipment through elimination of personnel or hardware providing for greater dependability and faster operating times and the capability of producing greater categories of service. In accordance with the present invention, a still greater improvement over existing systems is achieved with use of a stored program computor system for effecting automatic control over and operation of the telephone exchange.

The present invention generally provides a stored program system including a memory capable of storing sets of instructions forming a plurality of programs necessary to effect the desired control over an output load system, which may for example consist of a machine tool, a telephone exchange, or other controllable systems responsive to various ones of said plurality of instructions selected in response to detection of existing conditions and in response to the pre-organized program of instructions necessary to the desired operation and control thereof. As in all stored program systems, the memory not only stores the series of instructions forming the control programs but also that data which is manipulated and detected by various control registers under operation of the stored programs and from which results the formulation of the necessary control signals provided for operation of the output load system.

One advantageous feature of the present invention resides in the arrangement of control registers associated with the processor memory for manipulating the data stored therein in accordance with the programs of instructions. These control registers include the normal address and data registers associated with the memory for extracting from and applying to selected portions of the memory data and instructions. The control registers also include addressable registers, registers associated with the peripheral equipment, an instruction register associated with the sequencer and decoder equipment, and an arithmetic and logic unit for effecting transfer and logical manipulation of the data circulating to and from the various registers. Advantageously, the control registers are arranged essentially in a parallel arrangement so that data flows in a controlled manner from one register to another register through the arithmetic and logic unit. This results in a considerably simplified arrangement of registers which effects the necessary manipulation and control over the flow of data in an efficient and reliable manner.

The arithmetic and logic unit which forms a part of the control register organization forms a particularly advantageous part of the present invention due to its unique configuration and ability to perform various tests on the data applied thereto. More particularly, this unit provides a pair of flip-flops exclusively OR'ed to provide for zero tests, unzero tests, greater than zero tests and other more complicated tests on the data applied thereto. This particularly unique arrangement also allows tests and their direct complement to be performed with little or no additional circuitry.

Another advantageous feature of the present invention resides in the sequencer controls which determine the sequence of cycles to be performed in accordance with the particular selected instruction. The present invention provides for the use of a plurality of separate sequencer sections so that the number of bits per sequencer is decreased over those arrangements which rely upon a single sequencer for control. This also makes decoding simpler by allowing gates with fewer inputs to be used. In addition, the particular sequencer arrangement in accordance with the present invention requires only a single lead for incrementing the plurality of separate sequencer sections thereby greatly simplifying the control over the sequencer operation.

As is well known, noise spikes can conceivably cause misoperation of almost any equipment. Instructions have different numbers of cycles and the machine cycle sequencer must have as many valid cycles as the number of cycles contained in the longest instruction. However, if a noise spike places one of the sequencers into a higher cycle than the instruction decodes, the processor will not know what operation to perform. A noise spike may also affect the circuitry that decodes the cycle and instruction so that once again the processor does not know what operation to perform. In accordance with the present invention means is provided in combination with the separate sequencer sections for indicating when more than one sequencer section has been actuated at a given time or when no sequencer section is actuated so that appropriate action may be taken should such conditions indiate a misoperation.

Another advantageous feature of the sequencer section in accordance with the present invention is the ability of each section to independently shut off automatically at the end of a particular sequence. Clearly, if no instruction appeared as a sequencer started to cycle, the processor would never know what to do. The sequencer would then operate, but the processor would be doing no useful work. In accordance with the present invention the ability of the individual sequencer sections to shut themselves off automatically prevents such an undesirable operating condition.

Control over the operation of the sequencer arrangement and the control registers is effected by a central control unit which simply and efficiently initiates and maintains control over these respective circuits. The central control steps the sequencer units through their respective cycles providing a timed application of control signals to the various registers for effecting the operations required by the selected instructions.

The peripheral equipment includes addressable control circuits which respond to applied data or provide data to the processor only upon receipt of the particular address associated therewith. The supervision relays in the junctors and trunks of the switching network are divided into groups with each group assigned a separate address. Thus, when a scan command is sent to one of these addresses the appropriate output supplies a signal to all supervision relays of the specified group. If any relays within the group are closed, a signal appears as a data input indicating to the processor the condition of the particular junctor or trunk. This scanning of the junctors, trunks and line circuits is conducted on a periodic basis so that constant supervision over the condition of these circuits is maintained with a portion of the memory providing up-to-date data concerning these operating conditions.

These and other objects, features and advantages of the present invention will become more apparent from the following detailed description thereof when taken in conjunction with the accompanying drawings which illustrate an exemplary embodiment of the present invention, and wherein:

FIG. 1 is a schematic block diagram of the automatic data processing system in accordance with the present invention;

FIGS. 2a, 2b and 2c, when combined, provide a more detailed schematic diagram of the system of FIG. 1, as provided in control of a telephone exchange;

FIGS. 3a and 3b, when combined, provide a schematic diagram of a portion of the machine cycle sequencer forming part of the processor in the system of FIG. 1;

Figure 1:
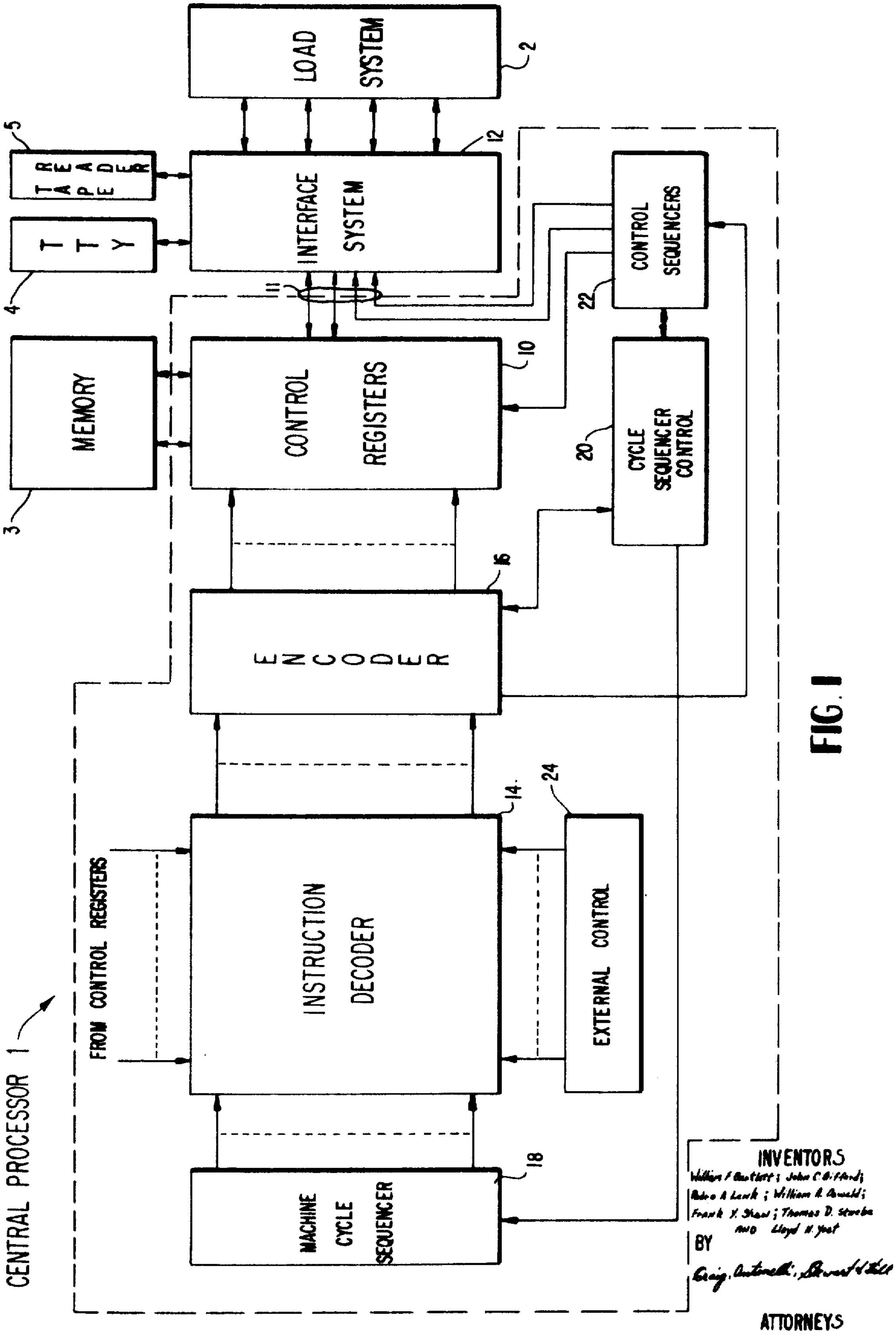
Figure 8A:
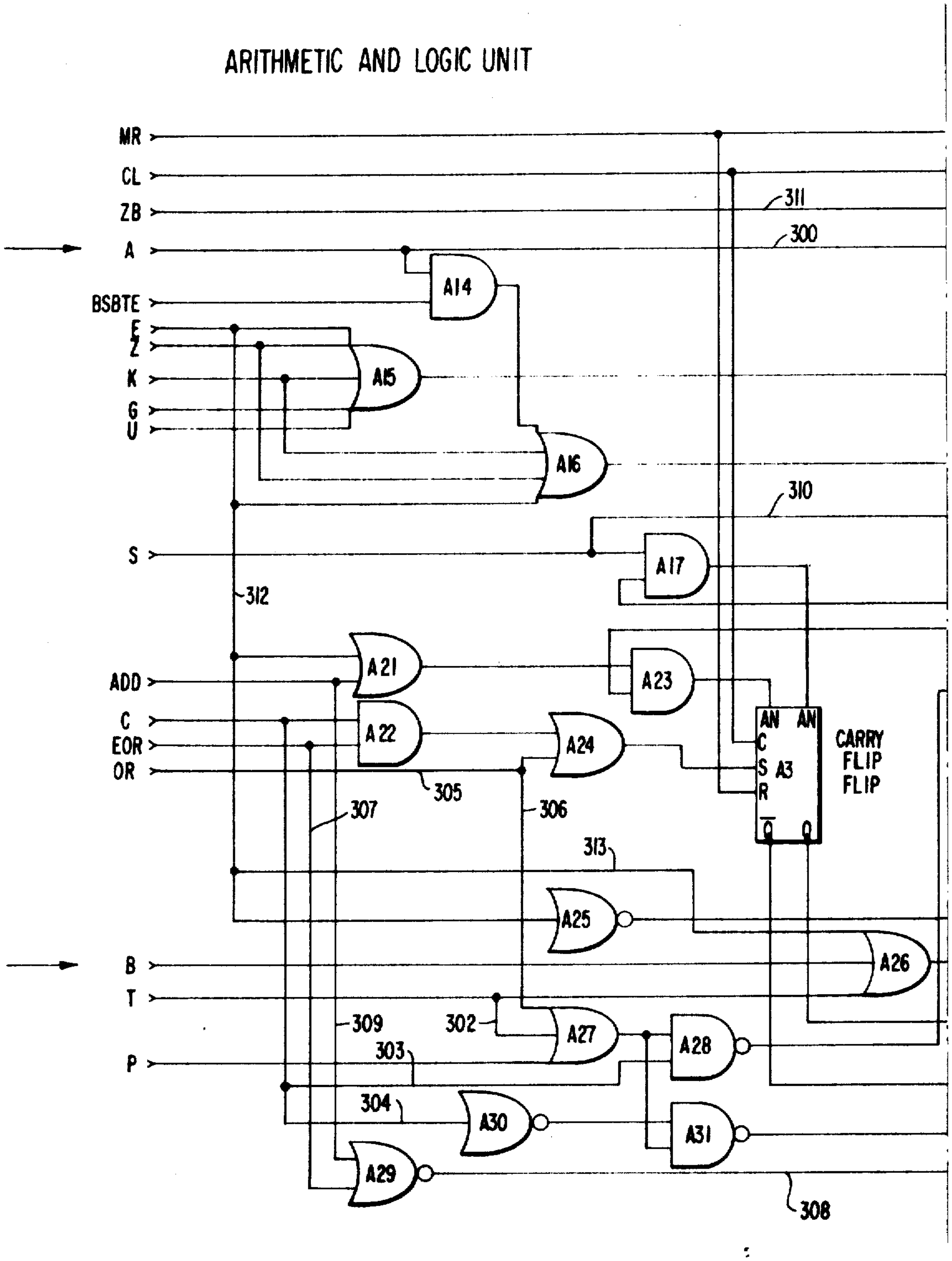
Figure 8B:
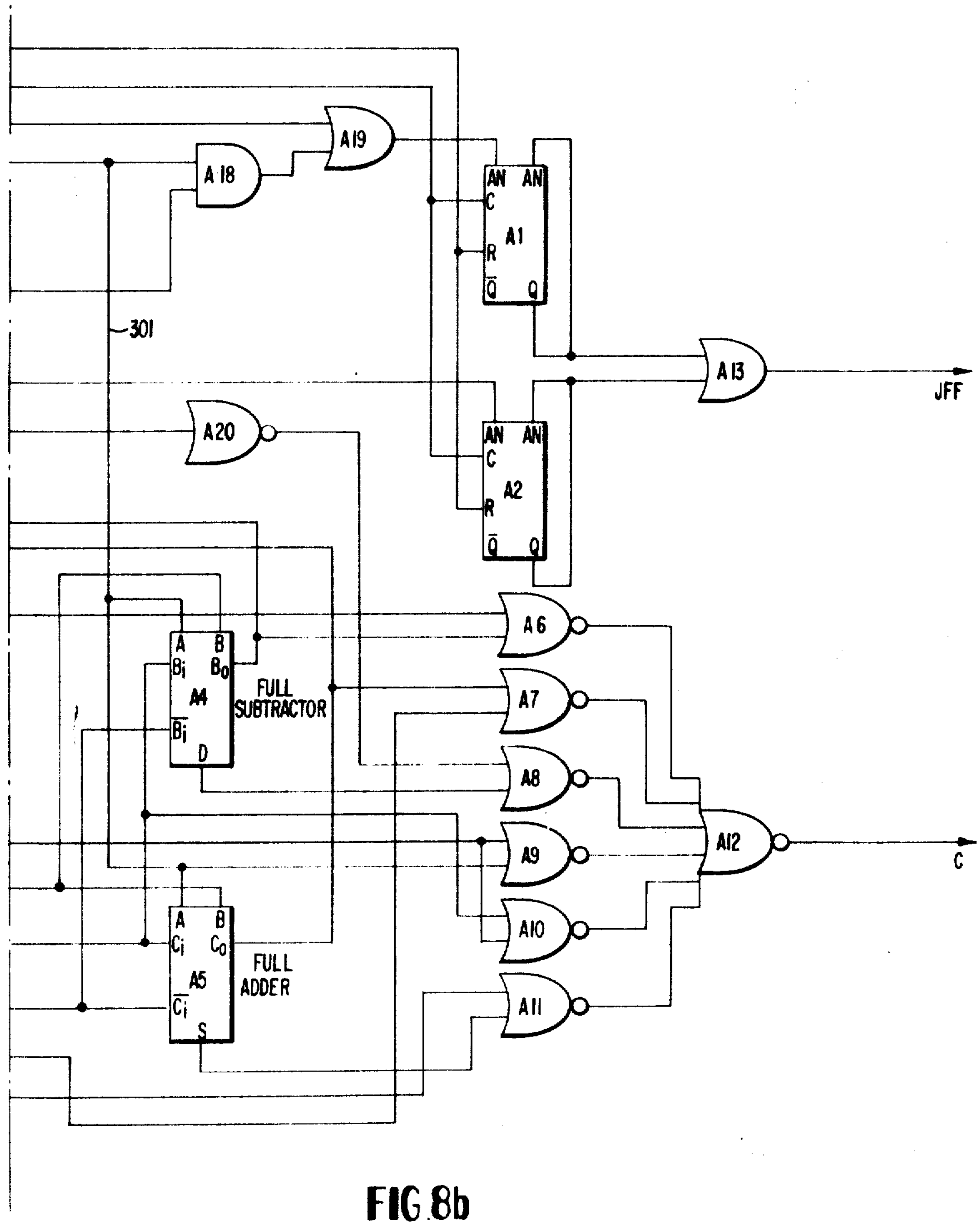
Figure 9:
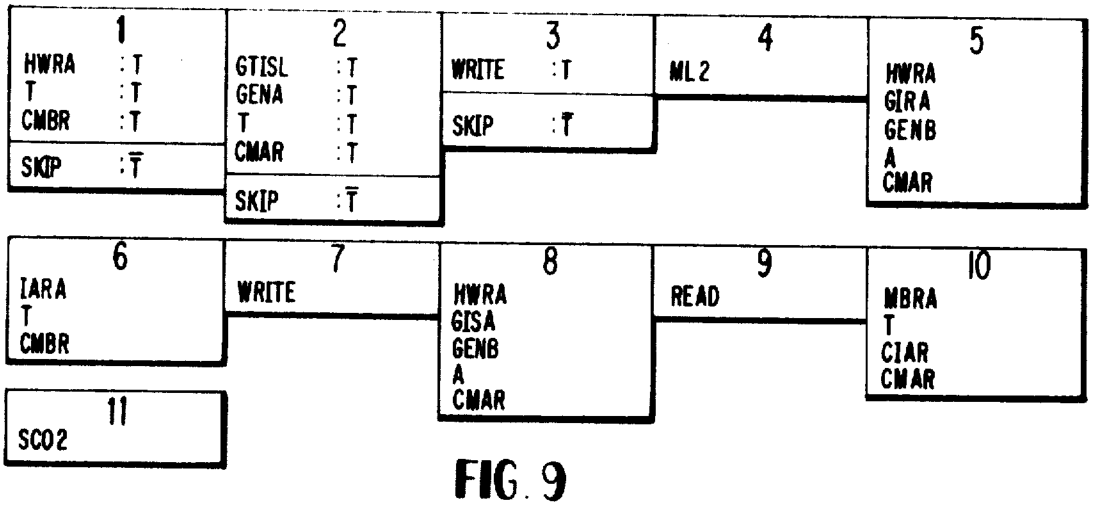
Figure 10:
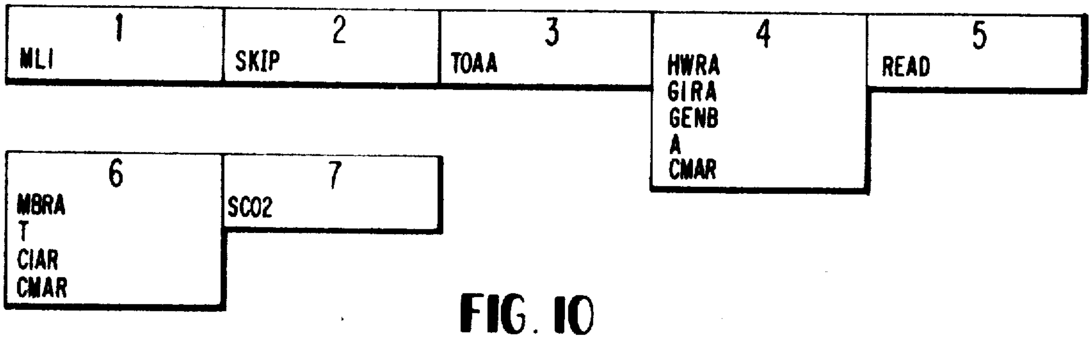
Figure 11:
Figure 12:
Figure 13A:
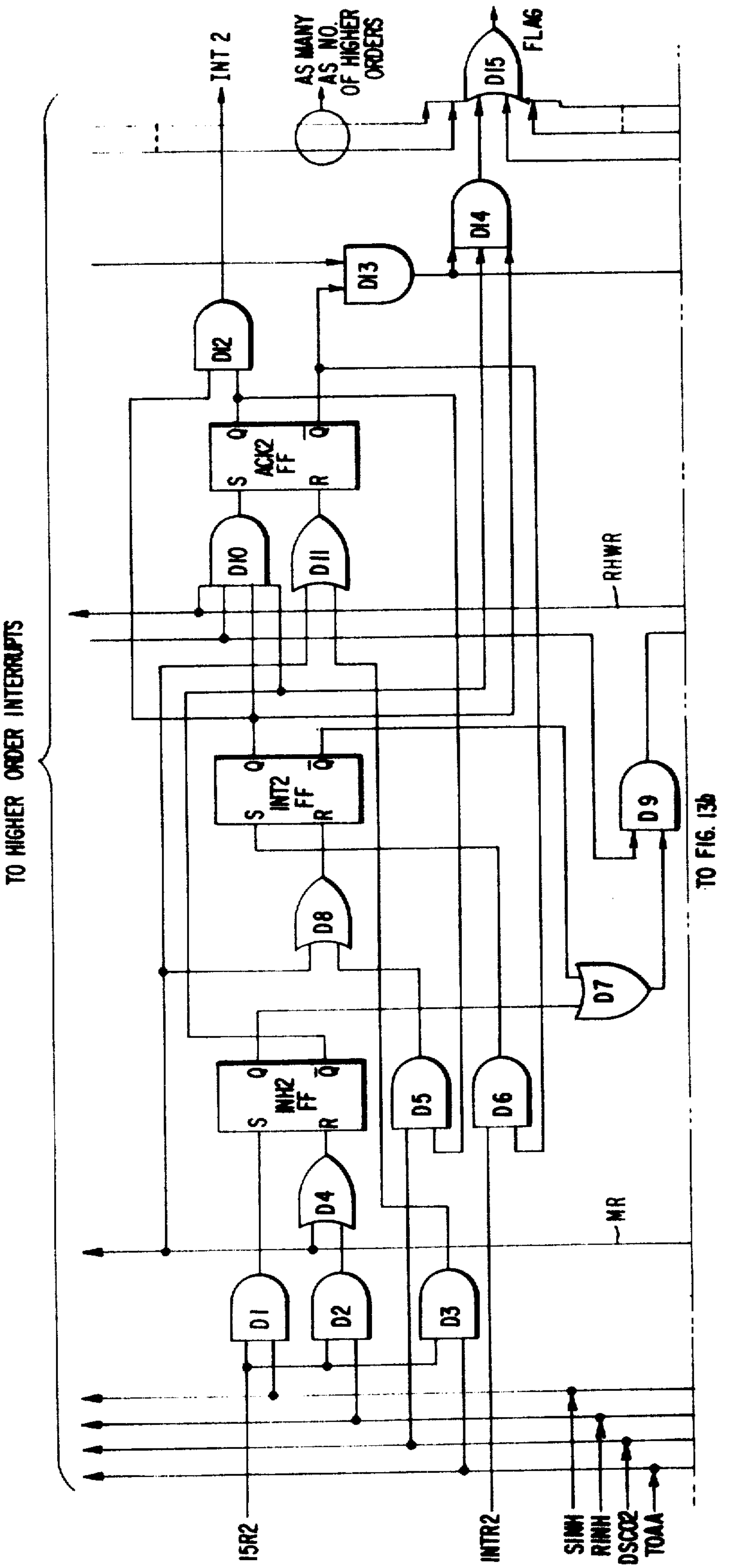
Figure 13B:
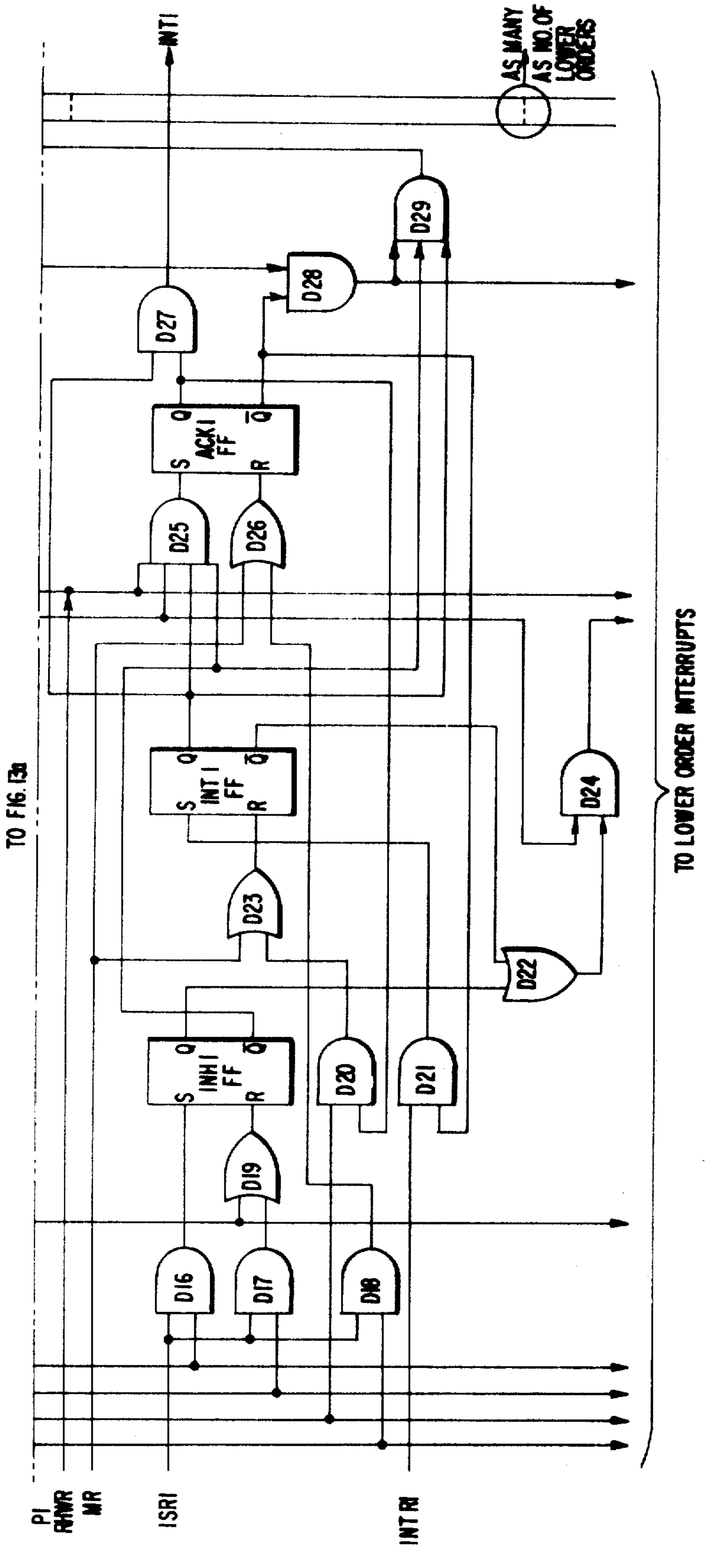
Figure 14:
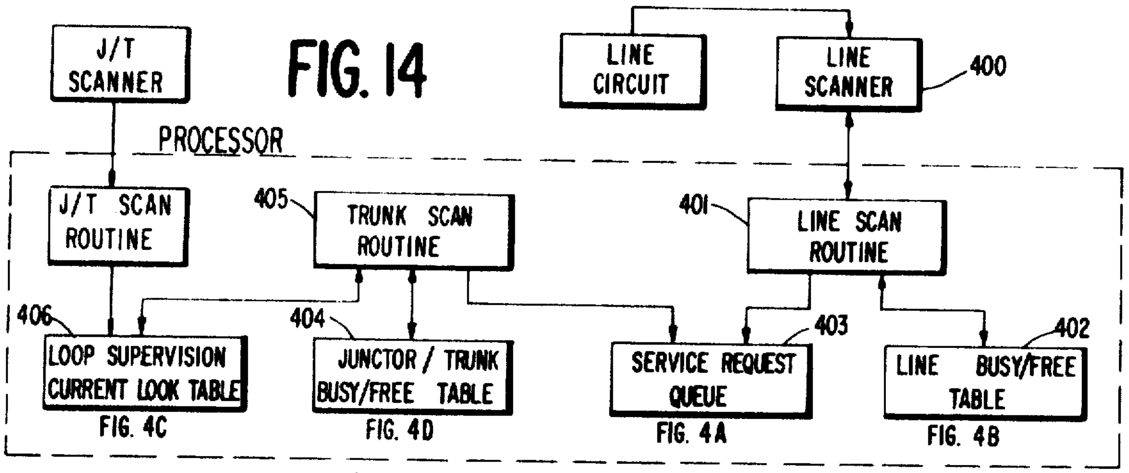
Figure 16:
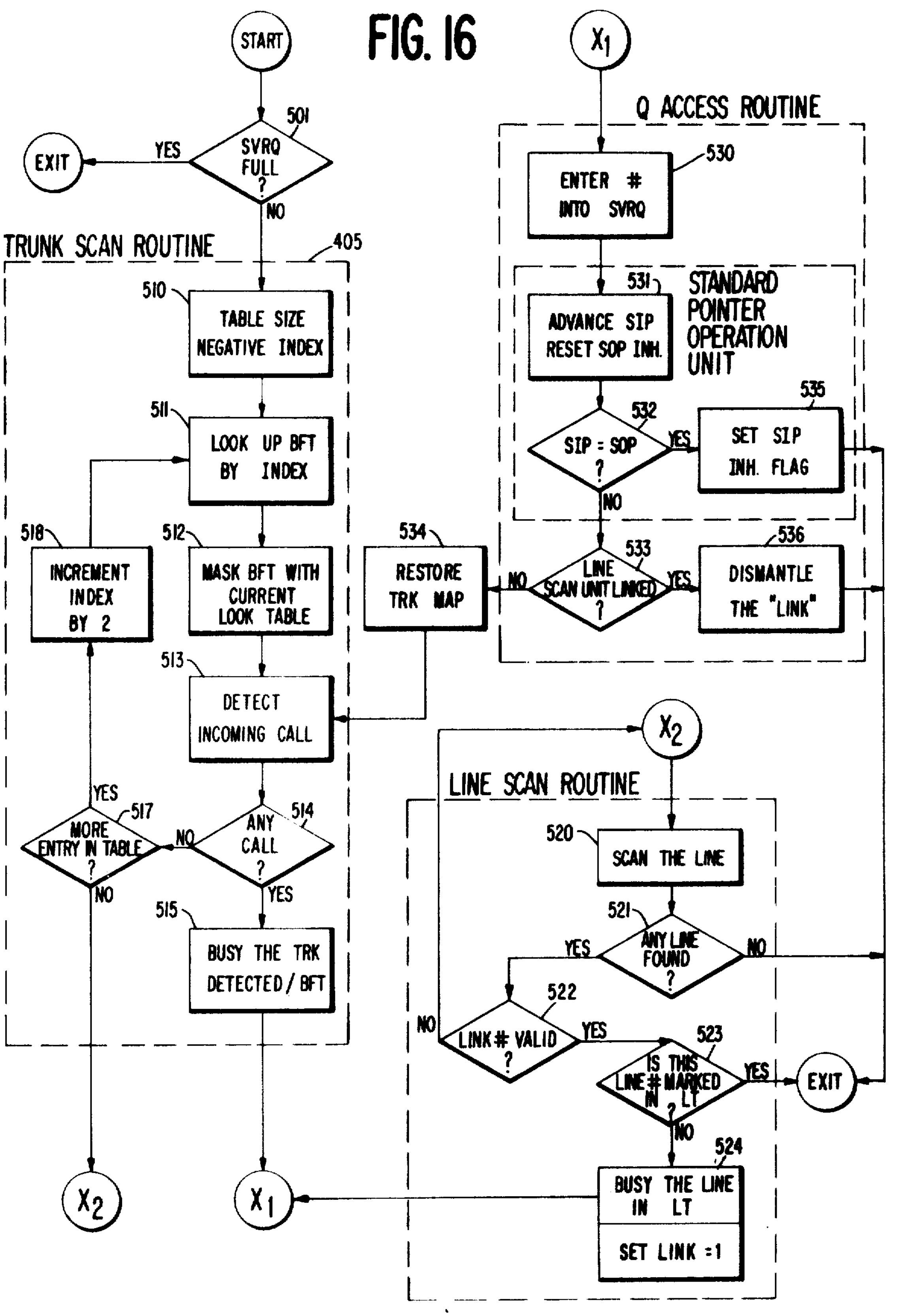
Figure 17:
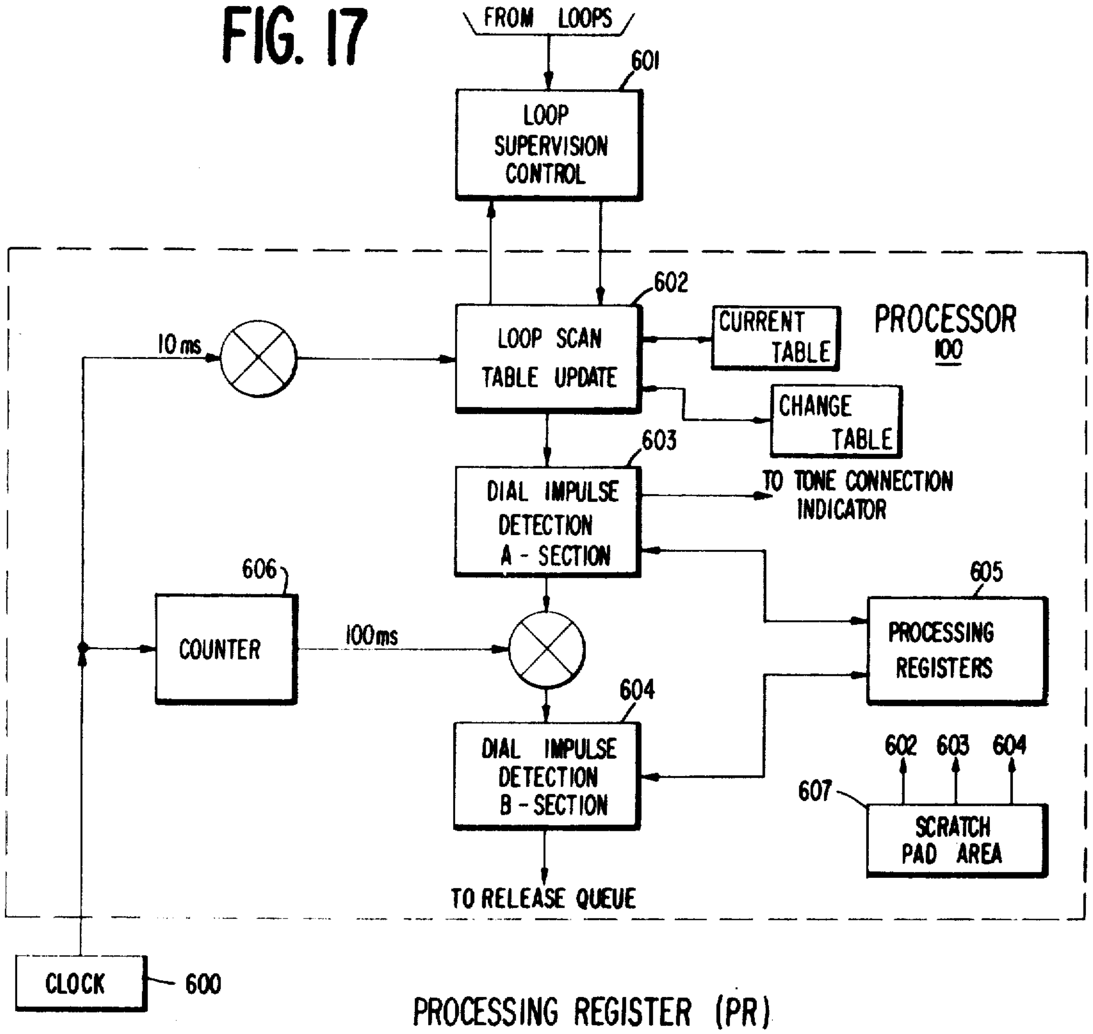
Figure 18A:
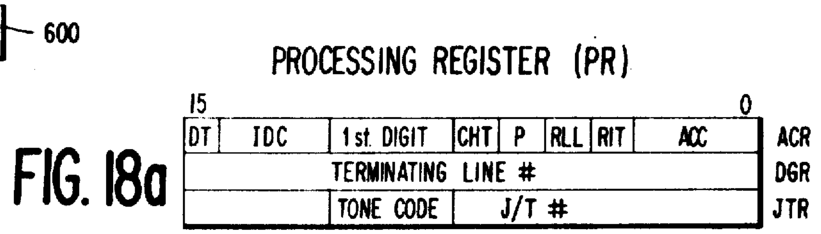
Figure 18B:
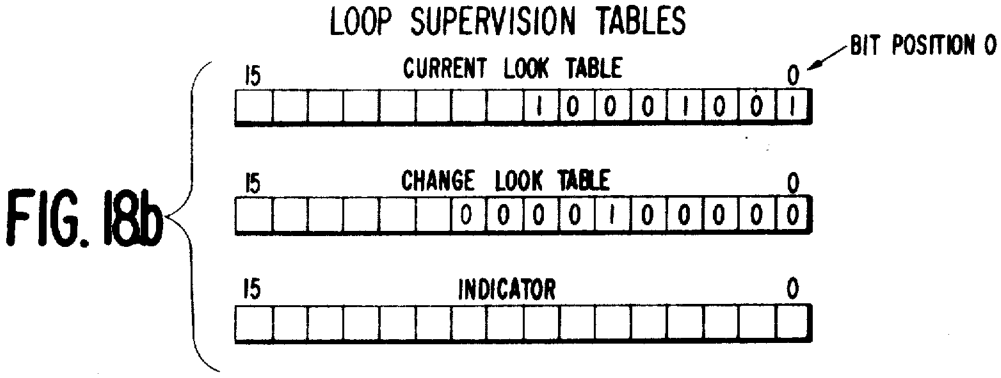
Figures 19A, 19B:
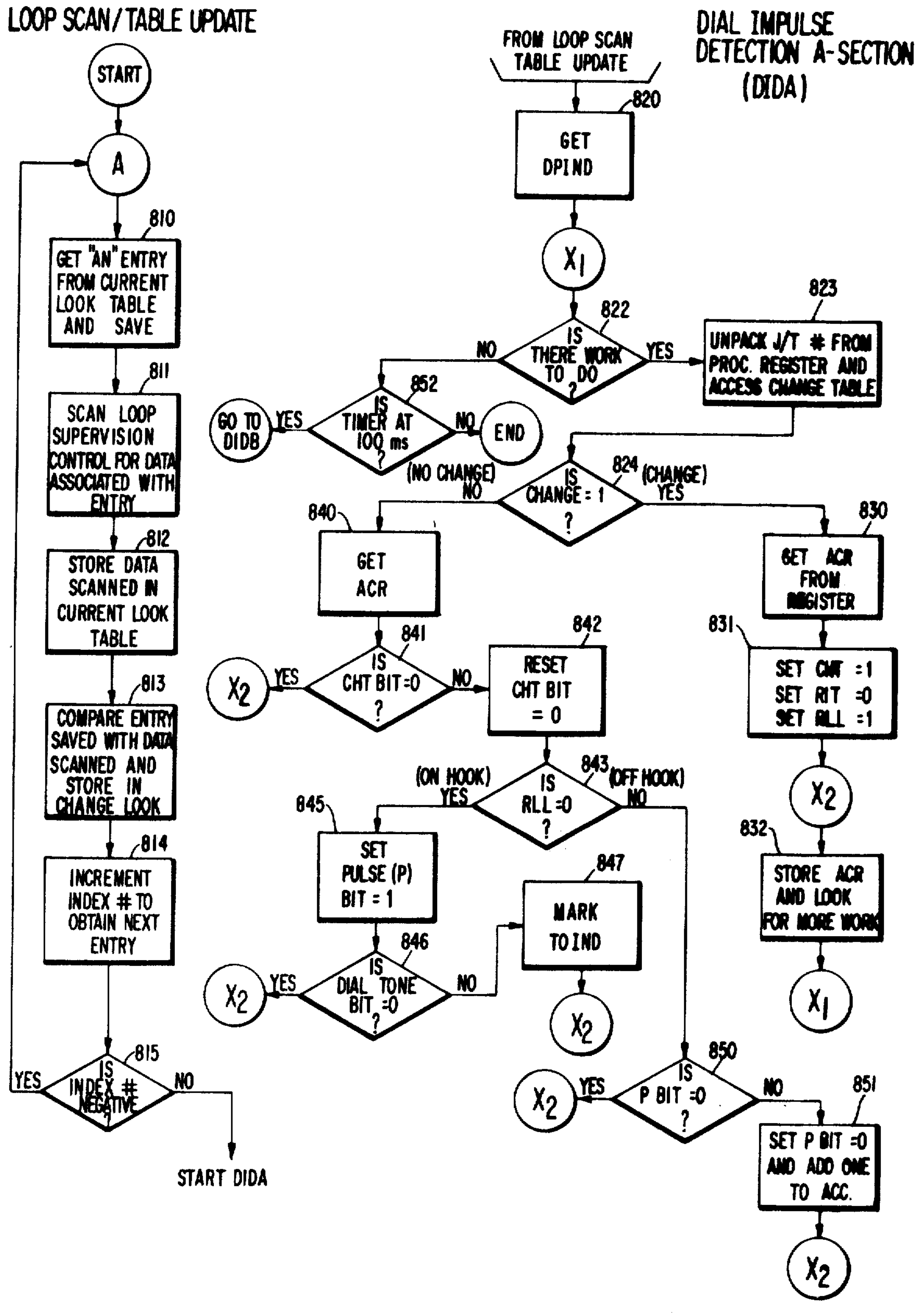
Figure 19C:
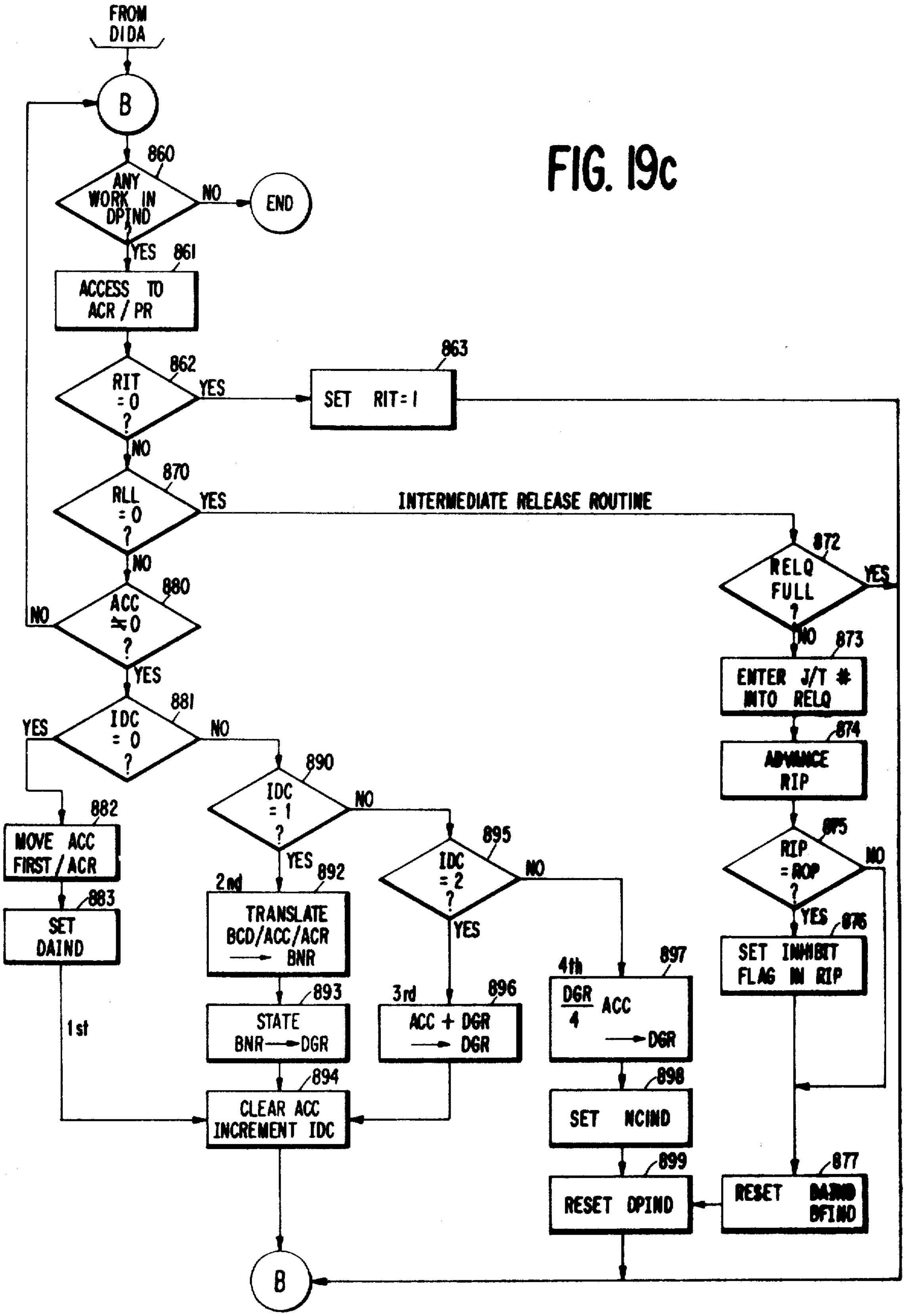
Figure 20A:
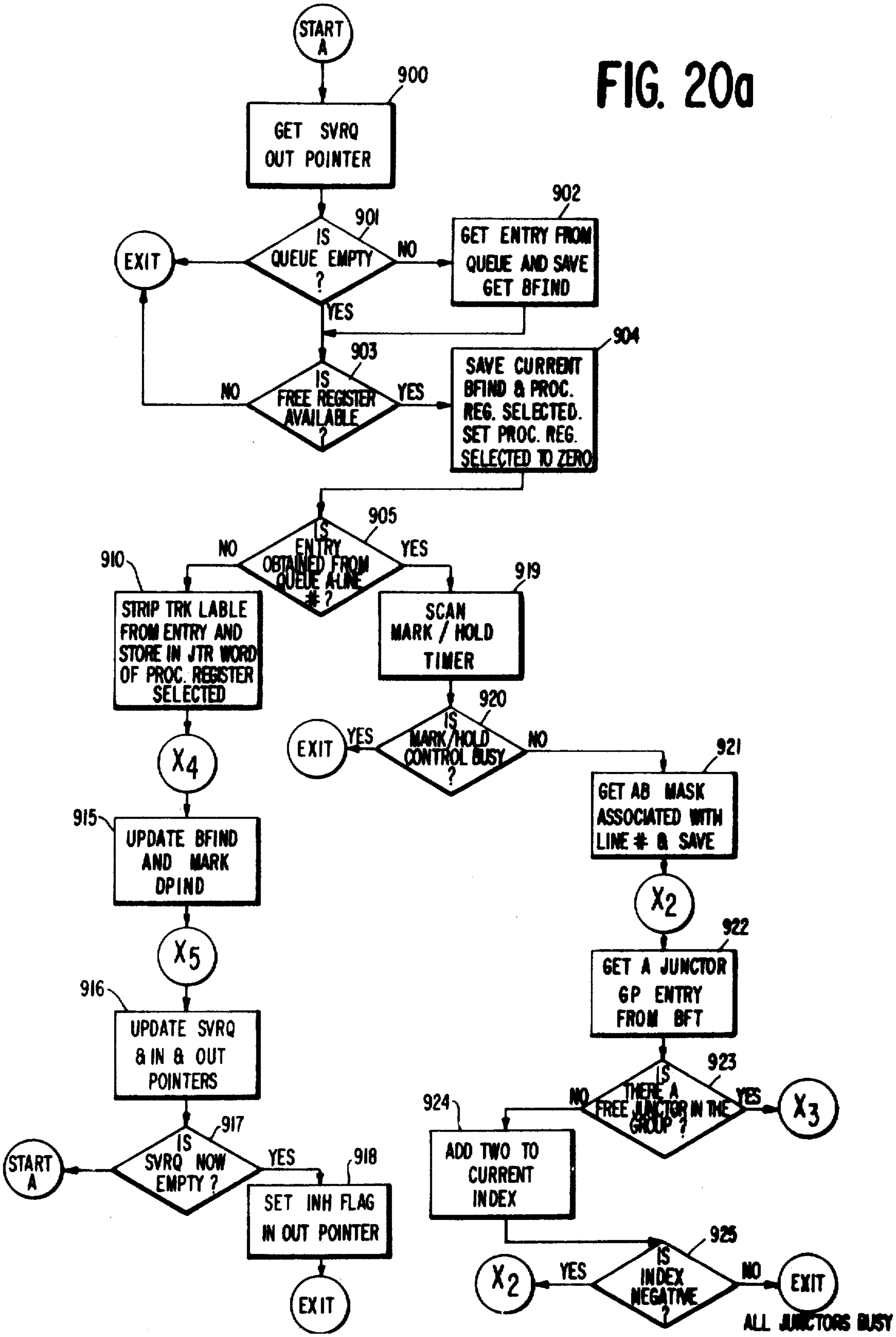
Figure 21A:
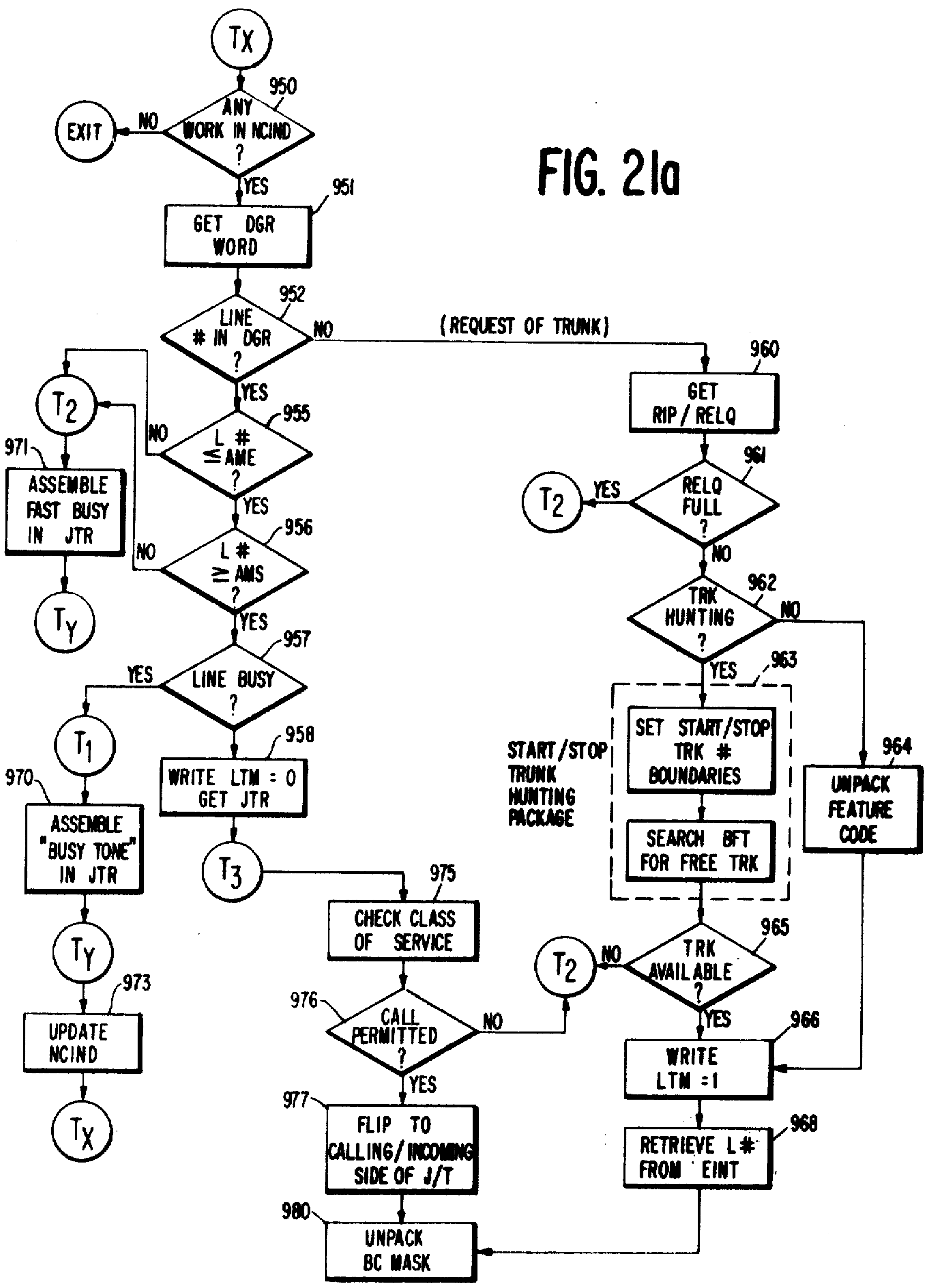
Figures 20B, 21B, 21C:
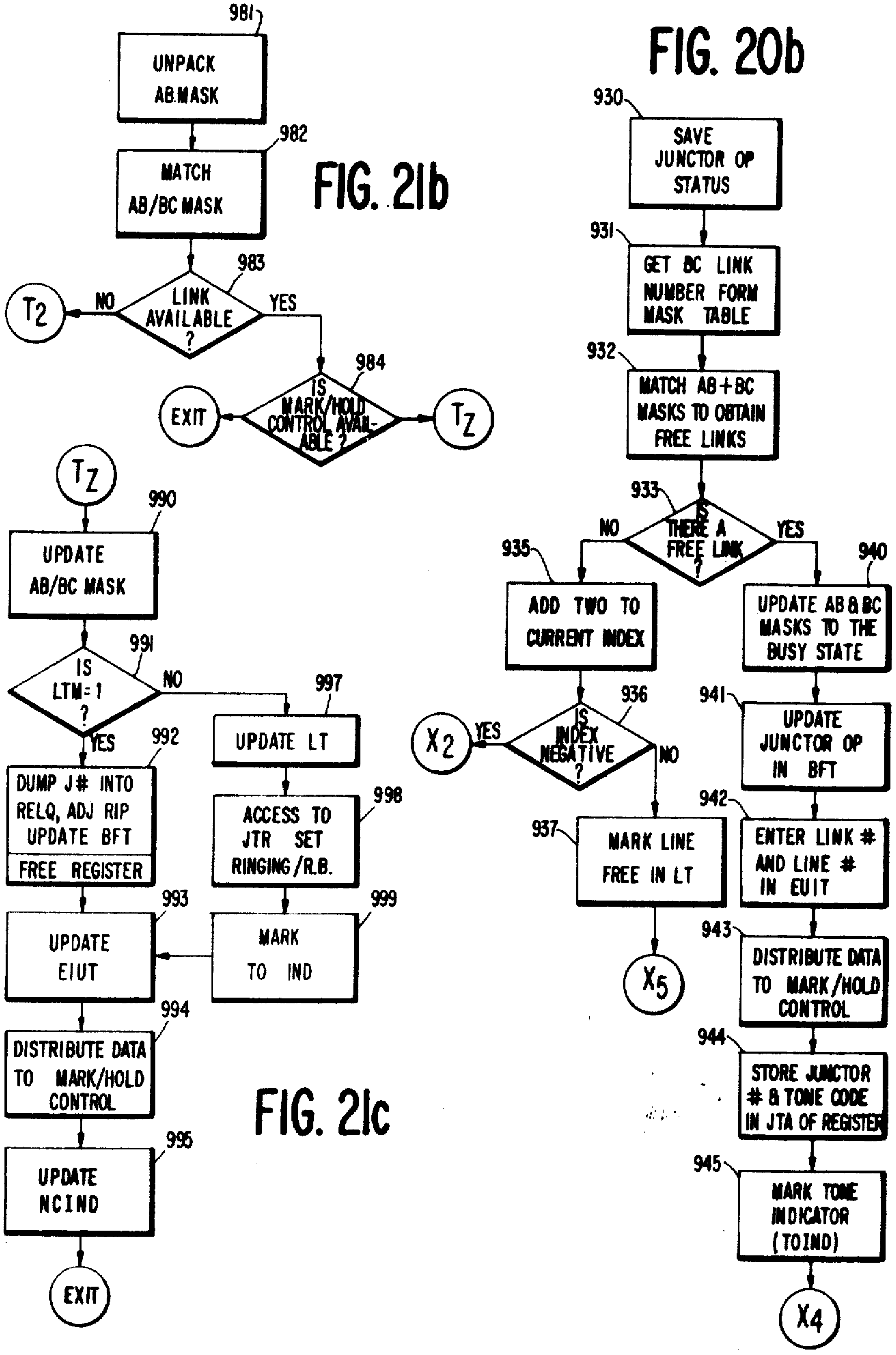

FIGS. 8a and 8b, when combined, provide a schematic diagram of the arithmetic and logic unit forming part of the processor in the system of FIG. 1;

FIG. 9 is a chart of the primary cycles of the interrupt process in accordance with an invention applicable to the data processing system of FIG. 1;

FIG. 10 is a chart of other cycles of the interrupt process;

FIG. 11 is a chart of the inhibit cycles forming an aspect of the interrupt process;

FIG. 12 is a chart of the reset inhibit cycles forming an aspect of the interrupt process;

FIGS. 13a and 13b, when combined, provide a schematic diagram of the interrupt circuit utilized in conjunction with the system of FIG. 1;

FIG. 14 is a schematic diagram illustrating the functional association of systems and data areas for operation of the system of FIG. 1;

FIGS. 15a, 15b, 15c and 15d are schematic diagrams of selected data areas in the memory of the system of FIG. 1;

FIG. 16 is a flow chart of the line/trunk scan process performed by the system in accordance with the present invention;

FIG. 17 is a schematic diagram illustrating the functional association of systems and data areas for effecting control over a telephone system;

FIG. 18a and 18b are schematic diagrams of selected data areas in the memory;

FIGS. 19a, 19b and 19c are flow charts of the loop scan/table update and dial impulse detection A and B sections, respectively;

FIGS. 20a and 20b are flow charts of the network connection-calling process provided by the system of the present invention; and FIGS. 21a, 21b and 21c are flow charts of the network connection-terminating process provided by the system of the present invention.

GENERAL DESCRIPTION

The following description relates to an exemplary embodiment of the invention as applied to the control of a telephone exchange; however, it will be apparent from this description that the stored program data processing system in accordance with the present invention is equally applicable to control of other systems without loss of advantage or the necessity of material change or alteration in the system itself. In addition, while many conventional components and sub-systems are described in connection with the exemplary embodiment for purposes of setting forth the best mode for carrying out the invention, it should be understood that other conventional elements or sub-combinations providing the same functions in an equivalent manner may be utilized in lieu of those specifically disclosed.

The same reference numerals have been used to designate corresponding elements throughout the respective views of the drawings wherever possible thereby facilitating a ready understanding of the relationship therebetween.

In the basic block diagram of the present invention as illustrated in FIG. 1, there is provided a central processor 1 which operates to provide the necessary control signals for physically actuating the load system 2 in accordance with the conditions existing in the load system, which are detected and stored in the memory 3, and pursuant to a set of instructions forming one or more programs also stored in the memory 3. The introduction of data into the central processor is accomplished through use of, for example, a teletype unit 4 and a tape reader 5, which permit the introduction or alteration of programs and individual instructions and makes possible the interruption of the operation of the central processor for purposes of introducing special requests for service as required.

The central processor 1 consists of a combination of elements which analyze data received from the load system, determine from the instructions stored in the memory 3 the necessary steps required in view of the analyzed data, determine the sequence of steps to be performed within the selected instruction and generate the necessary control signals for application in control of the load system 2. Data is transferred to the load system 2 by way of a series of control registers 10, a peripheral bus 11, and an interface system 12. The series of control registers 10 provide the means for introducing into or deriving data and instructions from the memory 3 and includes the necessary registers and computing elements for performing analysis of the data derived from the load system 2 and from the memory 3 in accordance with the programs stored in the memory 3 and for generating the necessary control signal which are applied through the peripheral bus 11, interface system 12 in control of the load system 2.

Operation of the processor in control of the registers 10 takes two basic forms, that is, decoding and sequencing. An instruction or instructions derived from the memory 3 in coded form indicating the necessary control required for a given set of circumstances must be decoded to a form representing a plurality of individual operative steps through which the various control registers are driven so as to achieve the desired output control to the load system 2 and the proper sequence of the required steps must be determined and the operation of the individual control registers must be regulated in accordance with this determined sequence.

Accordingly, the central processor 1 includes an instruction decoder 14 which receives a coded instruction from the control registers 10 and decodes this coded instruction by providing a series of outputs representative of a plurality of individual operation cycles which make up the given instruction. These operation cycles in turn consist of a plurality of steps which are determined by an encoder 16 connected to the output of the instruction decoder 14. Outputs representing the individual steps of each cycle forming an instruction are then applied from the encoder 16 to the control registers 10 in control thereof.

The sequence in which the respective steps of each cycle of a given instruction are applied to the control registers 10 is determined by a machine cycle sequencer 18 under control of a cycle sequencer control 20. The machine cycle sequencer 18 determines the sequence of the outputs enabled from the instruction decoder 14 and effectively steps from one cycle to the next cycle in sequence under control from the cycle sequencer control 20, receiving indication that all of the steps of a given cycle have been completed so that the next cycle may be initiated. The cycle sequencer control 20 also controls a plurality of control sequencers 22 in sequence in response to control signals received from the encoder 16, the control sequencers 22 providing for control operation of the control registers 10 and interface system 12 as required for the various steps of the cycles of a given instruction.

The general control system of FIG. 1 is illustrated in greater detail in connection with FIGS. 2a, 2b and 2c, which together provide a system for effecting control over the operation of a telephone exchange. Looking first to FIG. 2b, which illustrates the control registers 10 associated with the memory 3, it is seen that nine registers are provided for the manipulation and control of data and instructions, and an arithmetic and logic unit ALU is provided for transfer and computation of the data as required by the stored instructions.

The control registers include a memory address register MAR which is primarily used to present an address to the memory 3 indicating the storage position in the memory into which data is written or from which data is derived. There is also provided a memory buffer register MBR which stores the data to be inserted into the memory or extracted therefrom at the memory position determined by the address stored in the memory address register MAR. In order to write into the memory, the address is transferred into the memory address register MAR and the contents to be written into the memory is transferred into the memory buffer register MBR. Then, control from the read/write sequencer forming one of the control sequences 22 effects the necessary transfer of data into the memory at the proper memory location. To read data from the memory, a similar operation occurs with the data being extracted from the memory at the location determined by the address in the memory address register MAR, the data being transferred to the memory buffer register MBR upon application of control to the memory from the read/write sequencer, also forming one of the control sequences 22.

The control registers also include an instruction address register IAR which contains the address of the instruction to be executed or the address of the instruction which has just been executed. This register is provided in association with the instruction register ISR which contains the instruction being executed, which instruction is derived from the series of instructions forming the plurality of programs stored in the memory 3.

A hardware register HWR performs a plurality of functions including the storage of instructions received in parallel from the instruction register ISR for various operations and the storage of the address of peripheral equipment and certain information relating to interrupts, as will be described in detail hereinafter.

As indicated above, when the contents at an address position in the memory is desired, a read command is given. Similarly, when the status of a peripheral device is desired, a scan command is given by a control sequencer. The address of the desired peripheral device is first placed into the hardware register HWR and then gated through a peripheral address interface 35 to present the address to the peripheral address decoder in the interface equipment. Upon sending out the scan pulse or command from the peripheral sequencer forming another of the control sequences 22 the status of the peripheral device represented by the stored address appears on the peripheral data bus and is entered through a peripheral data interface 36 into the scan register SNR. On the other hand, when data is to be sent to a peripheral device, the address of the peripheral device is placed in the hardware register HWR and the data to be sent to the peripheral device is placed in a distribute register DTR. Upon generation of a distribute pulse by the peripheral sequencer, the data stored in the distribute register DTR is then outpulsed to the peripheral equipment responding to the stored address.

Finally, the control registers include a pair of programable or addressable registers X and Y, which registers are utilized for the various operations specified in the stored programs, with the execution of instructions not serving to change the contents of these registers unless the instruction explicitly indicates that a change of the contents is required.

The arithmetic and logic unit ALU is a unit which performs the necessary arithmetic and logic functions attendant to the carrying out of the programs stored in the memory. This unit includes two data inputs designated A and B and a single data output designated C. There are two buses 30 and 31 that lead to the unit ALU, with one of the buses 30 connecting the output of various registers to the A input and the other bus 31 connecting various registers to the B input to the unit. Thus, the flow of data generally from and to the various control registers occurs in a clockwise manner via the buses 30 or 31 to the inputs A or B of the unit ALU and out the output C via the bus 32 to the input of the registers. In this regard, it should be noted that the instruction register ISR and the distribute register DTR are not connected to either input of the unit ALU. Data is never transferred serially out of the instruction register ISR but is transferred in parallel to the instruction decoder or to the hardware register HWR. With regard to the distribute register DTR, since this register is used only to distribute information to the peripheral data bus in parallel, no data is transferred serially out of this register. With the exception of the hardware register HWR, the scan register SNR and the memory buffer register MBR, registers can only be loaded by serially transferring data through the arithmetic and logic unit ALU.

There is also included in combination with the control registers a number generator 34 which is connected to the data buses 30 and 31 and is used to gate certain numbers into the inputs A or B of the unit ALU when requested from by the encoder 16.

Figure 2A:
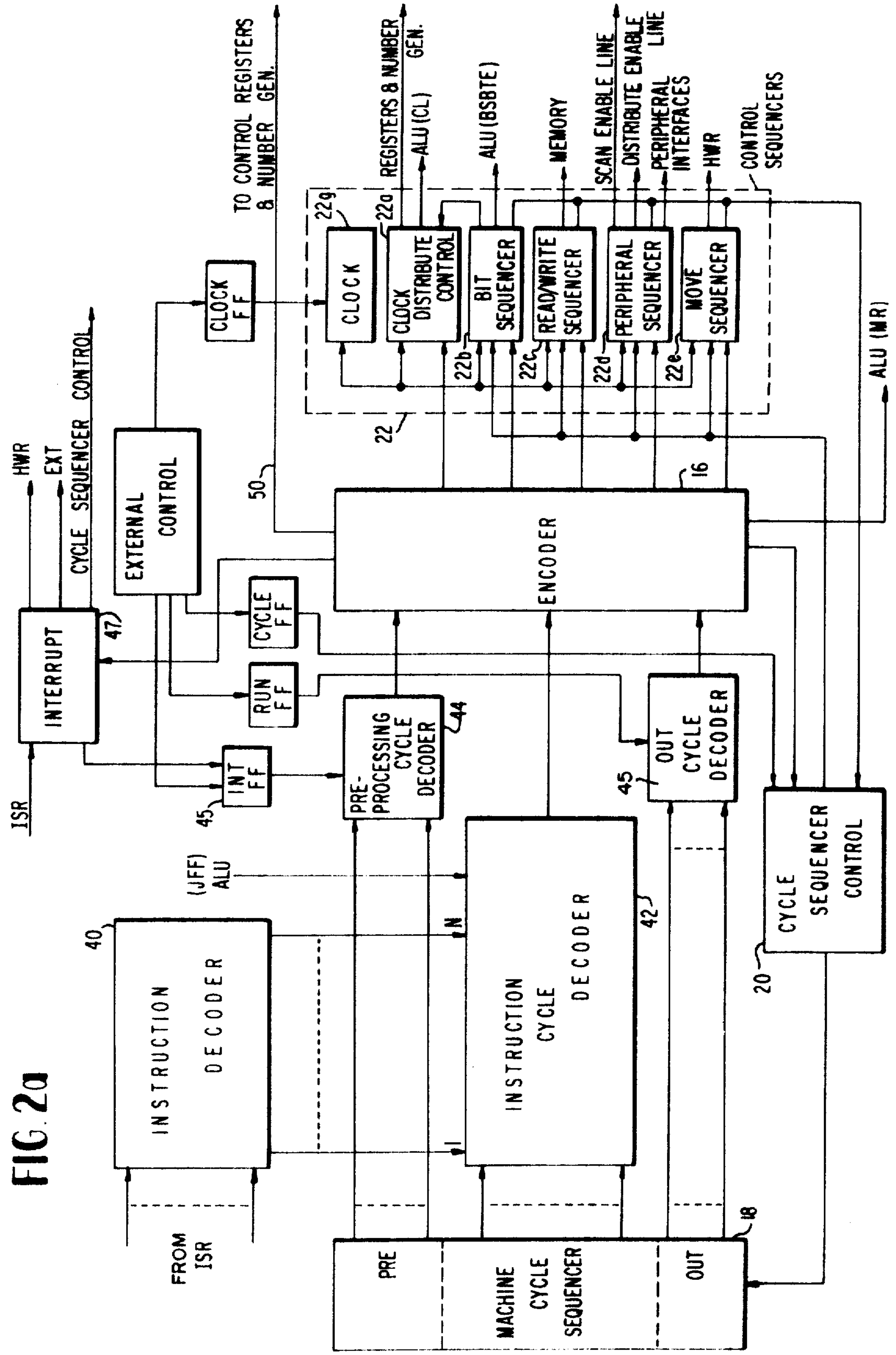
Figure 2B:
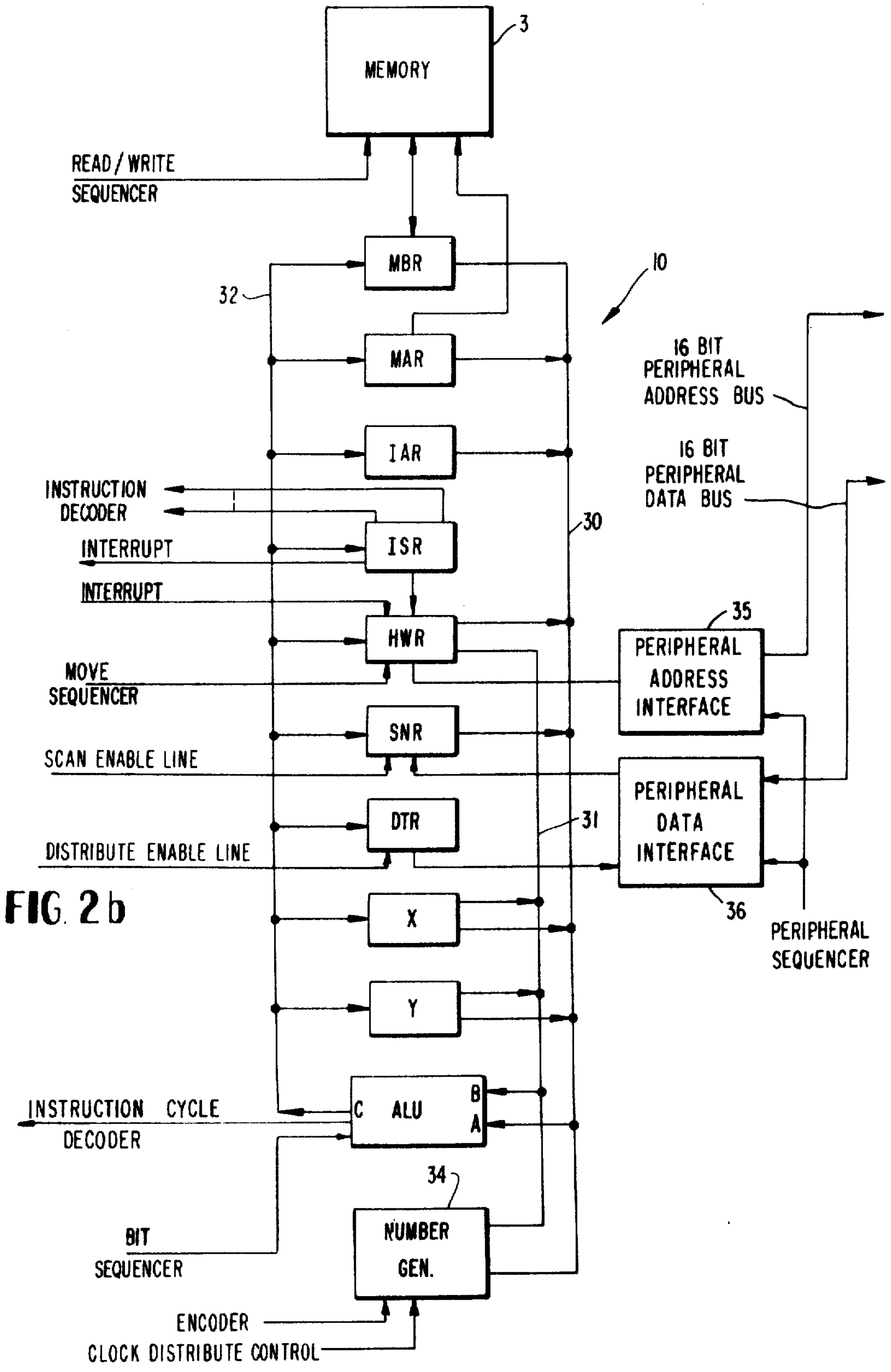

FIG. 2a provides the instructor decoder/encoder and timing arrangement for the processor 1. This section tells the control registers shown in FIG. 2b what they are supposed to do and when they are supposed to do it. The contents of the instruction register which represent an instruction in a binary code are applied to the instruction decoder 40 which decodes the instruction by enabling one out of N leads that goes to the instruction cycle decoder 42. Each of the output leads 1–N of the instruction decoder 40 therefore represents a single unique one of the instructions forming the various programs stored in the memory. As indicated previously, each instruction includes one or more cycles of operating functions with each cycle being broken down into one or more operating steps. Thus, the first step in determining the required operations which must be performed in response to a particular instruction is to determine the sequence of cycles required for the particular instruction. The instruction cycle decoder 42 determines those cycles which make up a particular instruction in response to receipt of an enabling signal on one of the lines 1–N from the instruction decoder 40.

Since each cycle of an instruction must be performed in a particular sequence, the main section of the machine cycle sequencer 18 provides a plurality of outputs to the instruction cycle decoder 42, which output leads are enabled sequentially upon initiation of control from the cycle sequencer control 20 so that the output from the instruction cycle decoder 42 will represent control information as to each cycle of the particular instruction in its particular order or sequence. The encoder 16 connected to the output of the instruction cycle decoder 42 then determines from the information received at its input the particular steps of each cycle which must be performed. Thus, the encoder 16 determines what steps are to be performed (such as enable the X register to the A input of the arithmetic and logic unit ALU, tell the arithmetic and logic unit ALU to transfer, and enable the C output to the Y register) and these instructions are generated by the encoder 16 in the sequence determined by the control sequencers 22 under control of the cycle sequencer control 20.

There is some work at the start of an instruction that is identical for all instructions. As an example, the instruction when read from memory must be transferred from the memory buffer register MBR into the instruction register ISR. This is accomplished by a pre-processing cycle which is performed prior to the actual carrying-out of any instruction. Thus, the machine cycle sequencer 18 contains a section designated PRE which provides the sequence of steps to carry out the pre-processing cycle. The output of this PRE section of the machine cycle sequencer 18 is connected to a pre-processing cycle decoder 44 which determines the various cycles of the pre-processing instruction. The output from the pre-processing cycle decoder 44 is connected to the encoder 16 which then determines the individual steps of each cycle of the pre-processing instruction in the same manner as the other instructions derived through the instruction cycle decoder 42.

In the same manner, certain work is common at the end of every instruction; for example, the next instruction in the stored program must be read. This is accomplished by the OUT instruction, and since this instruction is provided after completion of one of the general instructions, the machine cycle sequencer 18 provides a section designated OUT which is connected through an OUT cycle decoder 45 to the encoder 16 which then determines the individual steps of each cycle of the OUT instruction.

Thus, the machine cycle sequencer is provided in such a way that a pre-processing instruction is always carried out prior to a general instruction and an OUT instruction is always carried out at the conclusion of a general instruction. The machine cycle sequencer 18 therefore steps progressively through the pre-processing instruction, a general instruction and then the OUT instruction with each series of cycles being initiated through control from the cycle sequencer control 20.

The output lead 50 from the encoder 16 represents a plurality of control leads which extend to various gates and control elements in the control registers illustrated in FIG. *2b*. Thus, in accordance with the particular steps of each cycle of a given instruction, the various gates and registers may be enabled to perform the necessary functions required by the instruction. In addition, outputs from the encoder 16 are provided to the control sequencers 22 which include a clock distribute control **22*a*, a bit sequencer 22*b*, a read/write sequencer 22*c*, a peripheral sequencer 22*d* and a move sequencer 22*e*. Each of the control sequencers 22*a*–22*e* are enabled from the cycle sequencer control 20 so that each performs its required function as determined by the outputs from the encoder 16** in a particular sequence or order.

The control sequencers **22*a*–22*e* generally provide for an indexing or outpulsing of data from one register to another or to or from the memory under control of the clock 22*g* which is connected to each of these sequencers. For example, the clock distribute control 22*a* applies clock pulses to all of the registers and the number generator. The bit sequencer 22*b* is connected to the ALU circuit to tell the ALU circuit when to test a required bit and is connected to the clock distribute control 22*a* to control the serial operation of all bits in the registers. The read/write sequencer 22*c*** is connected to the memory and serves to effect a transfer of data or instructions thereto or therefrom.

The peripheral sequencer **22*d* applies the contents of the HWR Register to the peripheral address bus during the entire period data is to be distributed to, or received from, the load 2, by applying a control signal to actuate the peripheral address interface 35. During distribute period, the peripheral sequencer 22*d* applies a control signal to actuate the peripheral data interface 36 to continuously transmit the data stored in the DTR Register to the peripheral data bus. During the middle of the distribute period, the peripheral sequencer 22*d* generates a distribute enable pulse on the distribute enable line that enables the peripheral devices to act on the address and data being transmitted. In the scan period (receiving information from the load), the peripheral sequencer 22*d* generates the scan enable pulse during the middle of the period so that the peripheral unit addressed gates data on the peripheral data bus. At the trailing edge of the scan enable pulse, the peripheral data interface 36 is enabled by the peripheral sequencer 22*d*** to transmit the data from the peripheral data bus to the SNR Register.

A move sequencer **22*e*** generates a reset pulse and enables one clock pulse to the HWR Register that causes the parallel entry of information into the HWR Register.

The interrupt control 47 provides a means through which the processor program can be interrupted at the beginning of the next following instruction after presence of an interrupt signal has been detected. The processor is caused to execute a special program to service the interrupts. Upon completion of the interrupt program, the processor returned to complete the execution of the main program.

Turning now to FIG. **2*c* which schematically provides a telephone switching network in conjunction with the required interface system equipment necessary for applying control signals to the network and deriving supervisory data from the network, the interface system allows very flexible control of the telephone switching network through use of a stored program control system, this flexibility being due to the absence of any logic or decision making in the network or interface, as opposed to normal switching systems which employ "wire logic." The interface system has two functions, that is, it provides for a change in the configuration of the network as commanded by the processor and keeps the processor informed of subscriber initiated network conditions (open/closed loops, dialing, etc.) These tasks are performed by the line scanner and marker 60, a junctor/trunk mark and hold control 62, a junctor/trunk tone control 64 and a junctor/trunk scanner 66**.

The A, B and C network stages are composed of conventional telephone relay matrices, and the general makeup of the network illustrated is provided only by way of example, other known configurations being equally applicable for control in accordance with the present invention. A connection from a subscriber line to a junctor J or trunk T is established by closing a B-C link, marking the line, and marking the junctor or trunk. Note that these three variables determine a unique path through the switching network. A relay is energized at each matrix crosspoint of the path which is marked and holding relays in the junctors and trunks provide a holding current, so that the marked connection is maintained after removal of the mark signals.

The connection which links the interface system 12 with the processor consists of a 16-line peripheral address bus, a 16-line peripheral data bus, a scan enable line and a distribute enable line. These lines and buses are connected to the respective markers and scanners in the interface system equipment for purposes of applying control pulses and data to the switching network and for deriving supervisory information from the network for application to the processor.

As instructed by the line/trunk scan program stored in the memory, the processor interrogates the line scanner and marker 60 (at time intervals dependent upon traffic) by scanning the address assigned to the sequencer. The processor places this binary number onto the 16 address leads of the peripheral address bus, then pulses the scan lead. Since each unit of the interface is assigned a unique address, only the line scanner and marker 60 will respond to the scan pulse. If the sequencer is stopped (has found an off-hook line), the line number on which it stopped is gated onto the data portion of the peripheral bus. As will be indicated in more detail hereinafter, this data is applied to the scan register where it is stored for further processing or transfer to the memory.

Having been apprised that a subscriber has requested service and having the address of the calling subscriber, the processor seeks a free junctor circuit for connection to the calling line circuit from data stored within the memory 3. All of the junctors and trunks are scanned periodically via the scanner 66 so that a constant record of the busy-free condition of each of these elements is recorded and stored in the memory. Thus, when it is necessary to obtain a junctor or trunk circuit an examination of the appropriate data area in the memory will indicate which junctor or trunk is available for service.

A free junctor is seized by the mark and hold control 62 in accordance with the data as to the busY-free condition of the junctors from the memory. The processor will instruct circuit 62 which of the B-C links $B_1$ through $B_n$ to close to provide a unique path between the subscriber and the selected junctor circuit. Once the path between the subscriber and junctor is complete, as determined by the condition of the supervisory relay in the junctor circuit, dial tone is applied from the tone control circuit 64 through the junctor back to the subscriber indicating that the system is prepared to accept dial pulse information. Constant scanning of the supervisory relay in the junctor circuits then provides the indication of dial impulses received in the junctor circuit, which impulses are analyzed by the processor to determine the destination of the requested call.

If it is determined that an outgoing trunk circuit is required, the necessary switching of the subscriber line to an available trunk circuit is effected much in the same way as the junctor circuit is obtained, and this operation is carried out during an interdigit pause in the dialing. The connection from a junctor circuit back through the switching network to a terminating subscriber line circuit occurs much in the same way with the address of the subscriber being applied to the line scanner and marker 60 so that the line circuit is marked. The mark and hold control 62 then provides for connection of a path from the terminating line circuit through to the junctor circuit thereby establishing a connection between the calling subscriber and the terminating subscriber through the switching network. A more detailed description of the operation and control provided by the individual elements of the interface system including the line scanner and marker 60, the junctor/trunk mark and hold control 62, the junctor/trunk tone control 64 and the junctor/trunk scanner 66 will be provided hereinafter. With regard to the general operation of these elements, it should be noted that a distribute pulse addressed to one of these elements always means that the processor is telling the element to alter the state of the network. Similarly, a scan pulse addressed to an element always means that the processor requests data about the network. The address of the various elements is provided to and from the interface system on the peripheral address bus and the data applied to and derived from the system is carried by the peripheral data bus.

MACHINE CYCLE SEQUENCER

As indicated in connection with FIG. *2a*, the machine cycle sequencer serves to sequentially enable the respective leads representing the successive cycles of a given instruction under control of the cycle sequencer control 20. An example of a sequencer system of this type which may serve to provide the sequence of enabling signals applied to the instruction cycle decoder 42 is illustrated in FIGS. *3a* and *3b*. For purposes of example, it is assumed that no instruction includes more than 15 cycles so that the machine cycle sequencer is required to provide no more than 15 successive enabling outputs to the instruction cycle decoder 42. However, as will be apparent, sequencers providing more or less cycles are easily obtained in accordance with the invention.

As already indicated, instructions are generally broken down into several simple steps called cycles. Cycle 1 of an instruction may call for one type of operation while cycle 2 of the same instruction may call for an altogether different type of operation. Different instructions may have a different number of cycles and these cycles are to be executed one at a time in a given sequence. Therefore, the cycle 1 lead in the instruction cycle decoder 42 should never be enabled when the cycle 2 lead is enabled, or while any other cycle lead is enabled.

An end-around shift register with a "1" in only one bit position (or a "0" in only one bit position) could define a cycle to be executed. To define the next consecutive cycle, this shift register could be clocked so that the contents of the shift register were shifted one bit position. This type of machine cycle sequencer has major disadvantages however in that one bit position is required for each cycle. If the position of the single one bit in the shift register defines the cycle, the presence of an additional one bit would define another cycle. This could cause an attempted execution of two cycles at once. This problem is alleviated in accordance with the present invention of providing a binary counter decoded to a one-out-of N function.

One type of cycle or series of cycles between every instruction calls for the bringing of the new instructions to the position where it can be decoded. While this is occurring, it is not desirable to look at the decoded instruction leads because their output may be undefined. A way to accomplish this is to look at only one set of cycle leads where one set of cycle leads are used for instructions and another set of cycle leads are concerned with the housekeeping chores, such as getting the new instruction into position. If a machine cycle sequencer has an off position, two sets of cycles could easily be obtained by having two separate machine cycle sequencers. If a third set of cycles are desired, a third sequencer can easily be added.

The combined circuits of FIGS. *3a* and *3b* contain three sequencer units A, B, and C. Sequencer unit A includes a pair of flip-flops $Q_1$ and $Q_2$, sequencer B provides three flip-flops $Q_3$, $Q_4$ and $Q_5$, and sequencer unit C uses flip-flops $Q_6$ and $Q_7$. In this circuit a "1" applied to the Set-A input to sequencer unit A enables the set input S of flip-flop $Q_1$ while simultaneously enabling the reset input $R_2$ of flip-flop $Q_2$ thereby setting the A sequencer unit to cycle. At the same time the flip-flops in the other sequencer units are reset via OR gates 101 and 102. In the same manner, a "1" applied to the SET B input to sequencer unit B sets the B sequencer to cycle 1 by enabling the input S to the flop-flop $Q_3$ while also simultaneously enabling the reset inputs $R_2$ to the flip-flops $Q_4$ and $Q_5$. Additionally, sequencer unit A and sequencer unit C are also reset via OR gates 100 and 102 which enable the reset inputs $R_1$ to the flip-flops $Q_1$ and $Q_2$ in sequencer unit A and $Q_6$ and $Q_7$ in sequencer unit C. A "1" applied to the SET C input to sequencer unit C sets this unit to cycle 1 while the other sequencers are reset to zero via the OR gates 100 and 101. Thus, only a single sequencer unit is enabled at a given time, with the enabling input re-setting the other units automatically.

It should be noted in accordance with the present invention that any one of the sequencers can be set to any cycle desired and this is not limited only to cycle 1. All that is necessary to set a sequencer to a particular cycle is to tie the SET line of the sequencer unit to the respective set and reset inputs of the associated flip-flops to provide the combination representing the desired cycle.

In operation of the sequencer illustrated in FIGS. *3a* and *3b*, when all of the sequencers are off, that is, all flip-flops $Q_1$ through $Q_7$ are reset, an increment cycle complemented pulse received from the cycle sequencer control via line 105 and applied to the C inputs to each of the flip-flops $Q_1 - Q_7$ will not change the state of the flip-flops so long as a zero appears at each of the $AN_1$ and $AN_2$ inputs to the flip-flops at this time. Thus, the outputs $A_0$, $B_0$ and $C_0$ will be enabled indicating that sequencer units A, B and C are not on. For example, this can be seen in connection with sequencer unit A wherein the $\overline{Q}$ outputs from flip-flops $Q_1$ and $Q_2$ being enabled due to the reset condition of the flip-flops will enable AND gate 120. In the same manner, the $\overline{Q}$ outputs from flip-flops $Q_3$, $Q_4$ and $Q_5$ being enabled due to the reset condition of these flip-flops will enable AND gate 130 providing an output at $B_0$. In the sequencer unit C the outputs $\overline{Q}$ from flip-flops $Q_6$ and $Q_7$ will enable AND gate 140 to provide an output at $C_0$. With each of the outputs $A_0$, $B_0$ and $C_0$ enabled, the AND gate $A_1$ providing an output indicating that none of the sequencer units is on will be enabled by the output from AND gates 120, 130 and 140.

When a "1" appears at the SET A input to the sequencer unit A, the flip-flop $Q_1$ will be switched due to the enabling of the set input S, while the flip-flop $Q_2$ will be maintained in the reset condition by application of the input to the reset input $R_2$. Thus, a "1" will appear at the Q output of the flip-flop $Q_1$ and a one will again appear at the $\overline{Q}$ output of the flip-flop $Q_2$ thereby enabling the AND gate 121 and the output $A_1$ of the sequencer A. At the same time, a "1" at the Q output of the flip-flop $Q_1$ will be applied via EXCLUSIVE OR gate 124 to the $AN_1$ input of the flip-flop $Q_2$. Thus, when the next increment complemented pulse appears at line 105, the flip-flop $Q_2$ will be switched due to the simultaneous enabling of the inputs C and $AN_1$. The Q output of the flip-flop therefore provides a " 1." At the same time, with the flip-flop $Q_1$ in the set state, the application of the increment complemented pulse to the input C thereof while the input $AN_1$ is a zero will result in a resetting of the flip-flop $Q_1$. Accordingly, a "1" appears at the $\overline{Q}$ output of the flip-flop $Q_1$. Under these conditions, the AND gate 122 is enabled providing a "1" at the output $A_2$ of the sequencer unit A. At this time with the output $\overline{Q}$ of the flip-flop $Q_1$ enabled and the output Q of the flip-flop $Q_2$ enabled, and AND gate 125 will be enabled providing a one to the input $AN_1$ of the flip-flop $Q_1$. At the same time with the Q output of the $Q_2$ enabled, the EXCLUSIVE OR gate 124 will again provide a "1" to the input $AN_1$ of the flip-flop $Q_2$. Thus, upon receipt of the next increment complemented pulse via line 105, both the flip-flops $Q_1$ and $Q_2$ will be either switched or retained in their set condition, as required, so that the AND gate 123 will be enabled indicating the $A_3$ cycle of the sequencer unit A. With flip-flops $Q_1$ and $Q_2$ both in this set condition, the EXCLUSIVE OR gate 124 is no longer enabled thereby removing the "1" from the input $AN_1$ of the flip-flop $Q_2$. With setting of the flip-flop $Q_1$, the AND gate 125 is also no longer enabled thereby again removing the one from the input $AN_1$ of this flip-flop. When the next increment complemented pulse is received via line 105, both flip-flops will be reset thereby shutting off the sequencer unit A.

The operation of the sequencer units B and C are identical to that described above in connection with sequencer unit A. An input to the sequencer unit at its SET terminal automatically resets the other sequencer units while switching the first flip-flop of the particular sequencer unit to which the impulse is applied and resetting the other flip-flops of the sequencer unit. From then on, the increment complemented pulses received on line 105 steps the sequencer along from the first cycle to the last cycle and automatically shuts the sequencer unit off.

The NOR gates $A_2$, $A_3$ and $A_4$ determine if more than one sequencer is on at a given time, which would indicate a malfunction in the sequencer. The NOR gate $A_2$ is connected to the outputs $A_0$ and $B_0$, the NOR gate $A_3$ is connected to the outputs $A_0$ and $C_0$, and the NOR gate $A_4$ is connected to the outputs $B_0$ and $C_0$. Thus, if there is no output at at least two of the three outputs $A_0$, $B_0$ and $C_0$, indicating that more than one sequencer unit is cycling, one of the NOR gates associated with the two sequencers in operation will be actuated enabling the OR gate $A_5$ to provide an output indicating the malfunction. In this way, the processor can take appropriate action if a malfunction occurs, which action may be the energization of an indicator light or other alarm to request supervisory action.

The above-described sequencer arrangement provides for numerous advantages over the sequencers provided heretofore. For example, advantages are derived merely from the use of separate sequencer units. To decode the one out of N leads, one input per bit is needed. By using several sequencer units, the number of bits per sequencer unit is decreased and this makes decoding simpler by allowing gates with fewer inputs to be used.

In addition, while noise spikes can conceivably cause misoperation of almost any equipment, circuitry can be included in the sequencer arrangement in accordance with the present invention to allow for these noise spikes and eliminate the disadvantageous operation which may result therefrom. Instructions have different numbers of cycles and the machine cycle sequencer must have as many valid cycles as the number of cycles contained in the longest instruction. If a noise spike places one of the sequencer units into a higher cycle than the instruction decodes, the processor will not know what operation to perform. A noise spike may also affect the circuitry that decodes the cycle and instruction so that once again the processor does not know what operation to perform. A one-shot triggered by the increment cycle pulse could time out the allotted time for the processor to start performing an operation. If no operation is performed in the allotted time another increment cycle pulse could be produced. This could keep the processor from ceasing to operate.

As indicated by the above description of the operation of the sequence arrangement, sequencer A counts to three and then shuts off. Sequencer B is wired to count to six and then shut off. Sequencer C is wired to count to three before shutting off. Sequences of any given length can be designed capable of using the principles in accordance with the present invention. The fact that the sequencers shut themselves off is a great advantage. If no instruction appeared and a sequencer started to cycle, the processor would never know what to do. The sequencer could operate constantly but the processor would be doing no useful work. The fact that the sequencer units shut themselves off prevents this.

CYCLE SEQUENCER CONTROL

Figure 4:
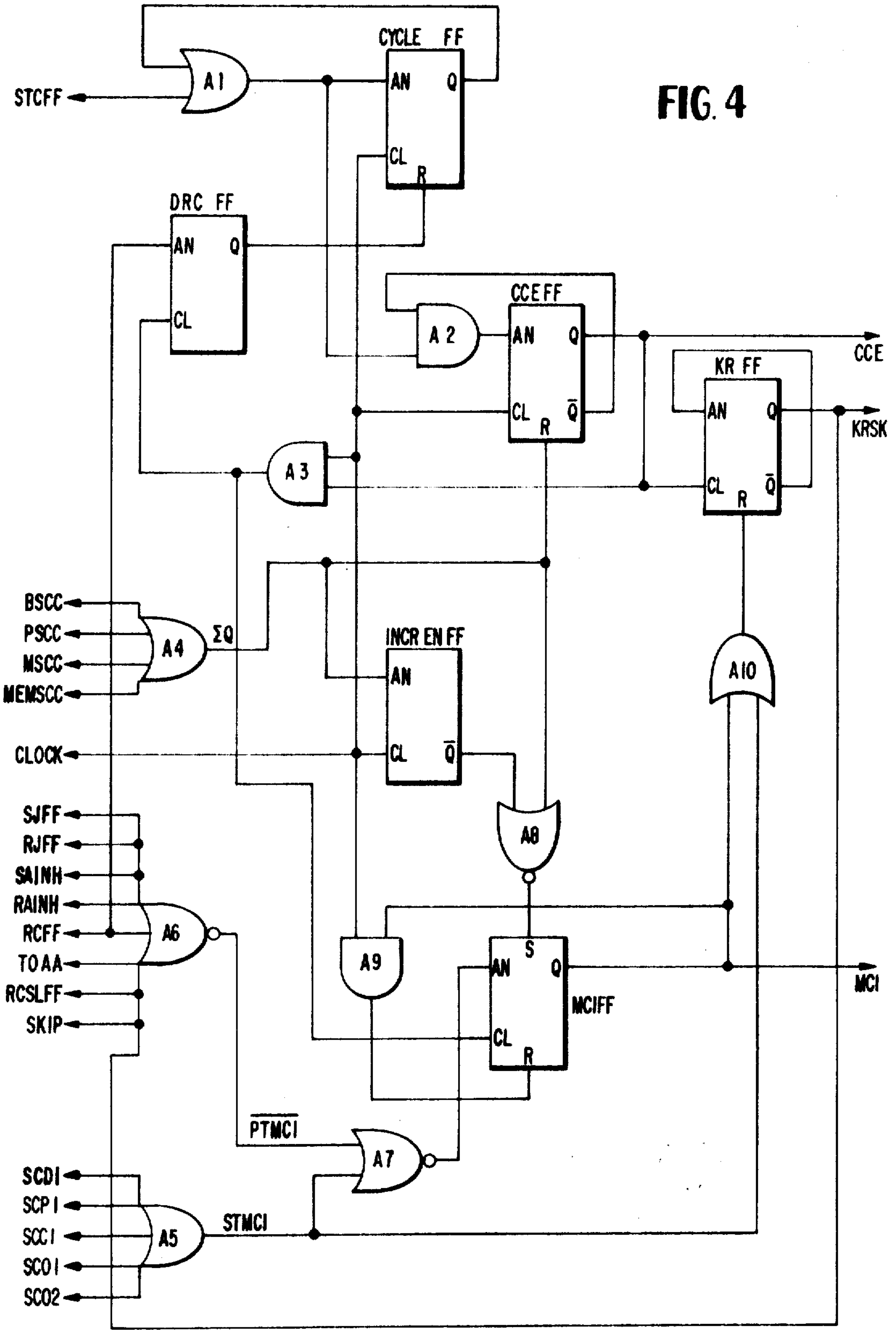
FIG. 4 is a schematic diagram of the cycle sequencer control forming part of the processor in the system of FIG. 1.

The machine cycle sequencer along with the control sequencers 22 are operated in response to control from the cycle sequencer or central control 20. Whereas the machine cycle sequencer produces the timed sequencing of cycles in an instruction, the cycle sequencer control 20 provides the timing for the individual steps of each cycle insuring the completion of each step before the machine cycle sequencer is indexed to the next cycle. A more detailed schematic diagram of the cycle sequencer control is illustrated in FIG. 4.

The cycle sequencer control circuit includes six flip-flops; a cycle flip-flop (CFF), a do reset cycle flip-flop (DR CFF), a central control enable flip-flop (CCEFF), and increment enable flip-flop (INCR EN FF), a machine cycle increment flip-flop (MCIFF), and a keep-running flip-flop (KRFF). The circuit additionally includes OR gates $A_1$, $A_4$, $A_5$, $A_6$, $A_7$, $A_8$, $A_{10}$ and AND gates $A_2$, $A_3$ and $A_9$. The cycle sequencer control has two main outputs: a central control enable CCE output which initiates the start of a new cycle by enabling one of the control sequencers **22*b* – 22*e* (FIG. 2*a*) in combination with a selected output from the encoder 16 and a machine cycle increment MCI output which increments the machine cycle sequencer 18. The operating conditions of the bit sequencer 22*b*, the memory sequencer 22*c*, the peripheral sequencer 22*d* and the move sequencer 22*e* are monitored by the cycle sequencer control 20** via "ON" leads extending to the control circuit and connected to OR gate $A_4$. A bit sequencer control lead BSCC, a peripheral sequencer to central control lead PSCC, a move sequencer to central control lead MSCC, and a memory sequencer to central control lead MEMSCC extend an enable signal to the OR gate $A_4$ in the control system when the associated sequences is actuated. The logic OR of these signals, when equal to zero, thus indicates that no sequencer is on. On the other hand, an input on one of the leads to the OR gate $A_4$ will indicate that a sequencer has indeed been selected and enabled.

In addition to normal cycles of the various instructions which make up the stored programs, there are a number of operations which are called "SETS" and "PRESETS." There are five SETS:

1. SCD1—set machine cycle sequencer to display (*d*1).
2. SCP1—set machine cycle sequencer to preprocesssing (P1).
3. SCC1—set machine cycle sequencer to CYCLE 1 (*c*1).
4. SC01—set machine cycle sequencer to OUT 1 (01).
5. SC02—set machine cycle sequencer to OUT 2(02).

There are also nine presets which are listed as follows:

1. SJFF—set jump flip-flop
2. RJFF—reset jump flip-flop
3. SAINH—set appropriate inhibit
4. RAINH—reset appropriate inhibit
5. RCFF—reset cycle flip-flop
6. TOAA—turn off appropriate acknowledge
7. RCSLFF—reset cold start load flip-flop
8. SKIP—skip this cycle
9. KRSK—keep running to sequence control Some of these SETS and PRESETS have already been described and the remaining will be described hereinafter. The cycle sequencer control is concerned with SETS and PRESETS because they require special commands to be given to the machine cycle sequencer and other control circuits. For example, if SCC1 is present, the machine cycle sequencer must be prevented from incrementing to cycle $C_2$ since only execution of cycle $C_1$ is called for. The input leads to the cycle sequencer control indicating the various SETS and PRESETS required at a given time are derived from the encoder 16.

As seen in FIG. 4, the OR gate $A_6$ receives the preset commands from encoder 16 and provides an output PTMCI which is a logic OR of the nine PRESETS and enables the flip-flop MCIFF to provide an MCI pulse out from the system. The OR gate $A_5$ receives the set commands from encoder 16 and provides an output STMCI which is a logic OR of the five SETS and prevents an MC1 pulse from being generated. If a SET and a PRESET are both present, STMC1 takes precedence and inhibits MCI, allowing execution of the cycle called for by the SET before incrementing to the next cycle.

The operation of the cycle sequencer control as illustrated in FIG. 4 will now be set forth. When the input STCFF is enabled with a "1" (the START button having been depressed), the cycle flip-flop CFF is clocked on and remains on until intentionally reset. The flip-flop CFF is reset via the input RCFF to the system via the flip-flop DRCFF. Note that if the reset input is applied to the system at RCFF (the STOP button having been depressed), the reset line to the cycle flip-flop CFF is delayed by the AND gate $A_3$ and the flip-flop DRCFF until the next output pulse CCE, thus assuring that the machine never stops in the middle of a cycle. The cycle flip-flop CFF maintains itself through the Q output to the OR gate $A_1$ which is connected to the input AN thereof.

The input to the cycle flip-flop CFF also enables the AND gate $A_2$ placing the flip-flop CCEFF in a toggle mode (one clock period up, one clock period down) until the sequencer starts. The clock impulses are received in the system and applied to each of the CL inputs to the flip-flops either directly or through appropriate AND gates. The logic AND of the clock and the output CCE turns on the appropriate control sequencer 22*b* – 22*e*, the proper sequencer is decoded by the instruction decoders and control signals representing a selected control sequencer is applied via the encoder 16. When a selected sequencer is turned on, the output of OR gate $A_4$ is equal to "1" and serves to reset the flip-flop CCEFF by enabling the reset input R thereof. This output of the OR gate $A_4$ is also applied to the AN input of the flip-flop INCR EN FF, which is clocked on one clock period latter by the applied clock pulse to the input CL thereof, enabling the $\overline{Q}$ output of the flip-flop. This enables the EXCLUSIVE OR gate $A_8$ resulting in a setting of the flip-flop MC1FF by the set input S thereof. Thus, while the selected sequencer is on, the $\overline{Q}$ output of the flip-flop INCR EN FF equals zero so that the flip-flop MCIFF is not set at that time. The cycle sequencer control system remains in the state until the sequencer is finished.

When the output of OR gate $A_4$ goes to zero the flip-flop MCIFF is set generating an output pulse MCI and resetting the flip-flop INCR EN FF. The next clock pulse is gated through AND gate $A_9$, resetting the flip-flop MCIFF and ending the MCI pulse, which has incremented the machine cycle sequencer calling for a new cycle. Note that the flip-flop CCEFF was set by the same clock pulse which has reset the flip-flop MCIFF. With the output CCE now a "1," the next clock pulse starts another one of the four sequencers initiating the start of a new cycle.

The preceding description sets forth the normal cycling operation. However, suppose that no sequencer starts so that the output from the OR gate $A_4$ remains equal to zero. This could occur due to an electrical noise causing a non-existant cycle to be decoded. If the processor remained in this state, it would be effectively stopped, not executing any instruction. This of course is an intolerable situation which cannot be permitted, and therefore, the present invention provides for a circuit arrangement which automatically increments the machine cycle sequencer to the next cycle upon detection of this undesirable condition. This novel control circuitry includes the keep running flip-flop KRFF.

The flip-flop KRFF is connected in a toggle mode with the $\overline{Q}$ output connected to the AN input thereof and this flip-flop is clocked by the CCE output signal from the system. The first CCE pulse (which enabled the start of a cycle) toggles KRFF on making the KRSK output a "1." Suppose that no sequencer starts and the output of the OR gate $A_4$ remains a zero. In this case, the flip-flop INCR EN FF will remain off disabling the EXCLUSIVE OR gate $A_8$, which normally enables the start of an MCI output pulse. However, the output KRSK is a PRESET, as indicated above; thus, the output from the EXCLUSIVE OR gate $A_8$ will equal "1" making the AN input of the flip-flop MCI FF a "1." The next output pulse CCE, as previously stated, enables the clock through AND gate $A_3$ to the input CL of the flip-flop MCIFF. Since the AN input to this flip-flop is a "1," the flip-flop will be clocked on, starting a MCI pulse and resetting KRFF. One clock period later the flip-flop MCIFF turns itself off via AND gate $A_9$ connected to the reset input R of the flip-flop. This ends the MCI pulse. This should increment the machine cycle sequencer to a valid cycle, returning the machine to normal operation.

Since SETS define a particular cycle to be executed, the output pulse KRSK (hence an MC1 pulse) is unwanted. The output of OR gate $A_5$ is therefore applied via OR gate $A_{10}$ maintaining the output KRSK at zero by keeping the KRFF flip-flop reset. In the same way, the output of OR gate $A_5$ applied via NOR gate $A_7$ maintains the AN input of the flip-flop MCIFF at a zero level preventing a MCI pulse from being generated therefrom. Thus, with the unique control circuitry provided in accordance with the present invention, the cycle sequencer control refuses to remain in a non-valid state as a result of failure to select a control sequencer, but automatically increments to the next cycle when an invalid condition is detected.

INTERFACE SYSTEM

Figure 5:
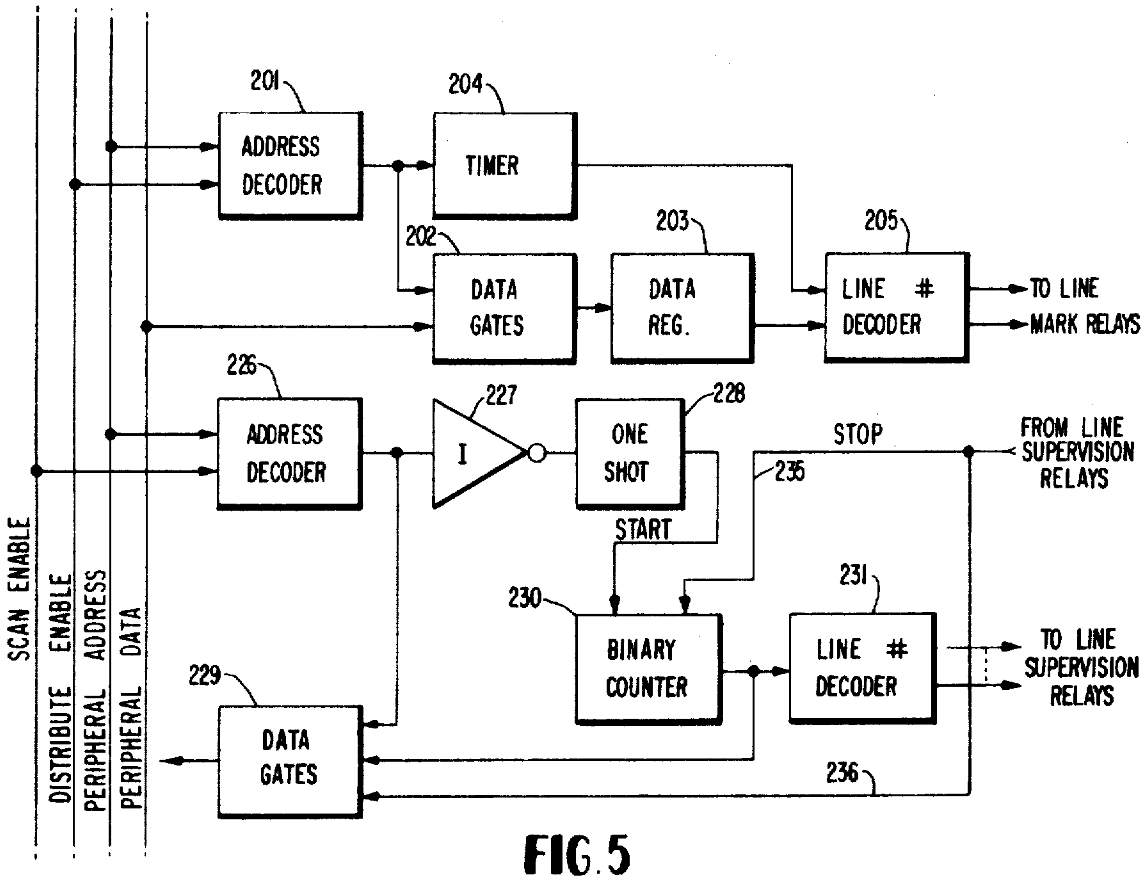
FIG. 5 is a schematic block diagram of the line scanner and marker arrangement forming part of the interface system.
Figure 7:
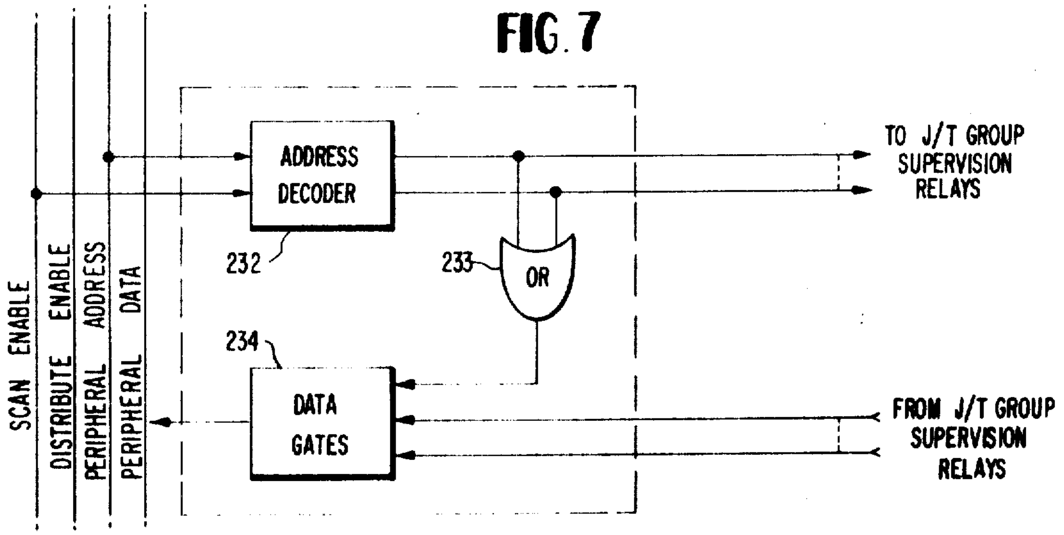
FIG. 7 is a schematic diagram of the junctor/trunk scan circuit forming part of the interface system.
Figure 6:
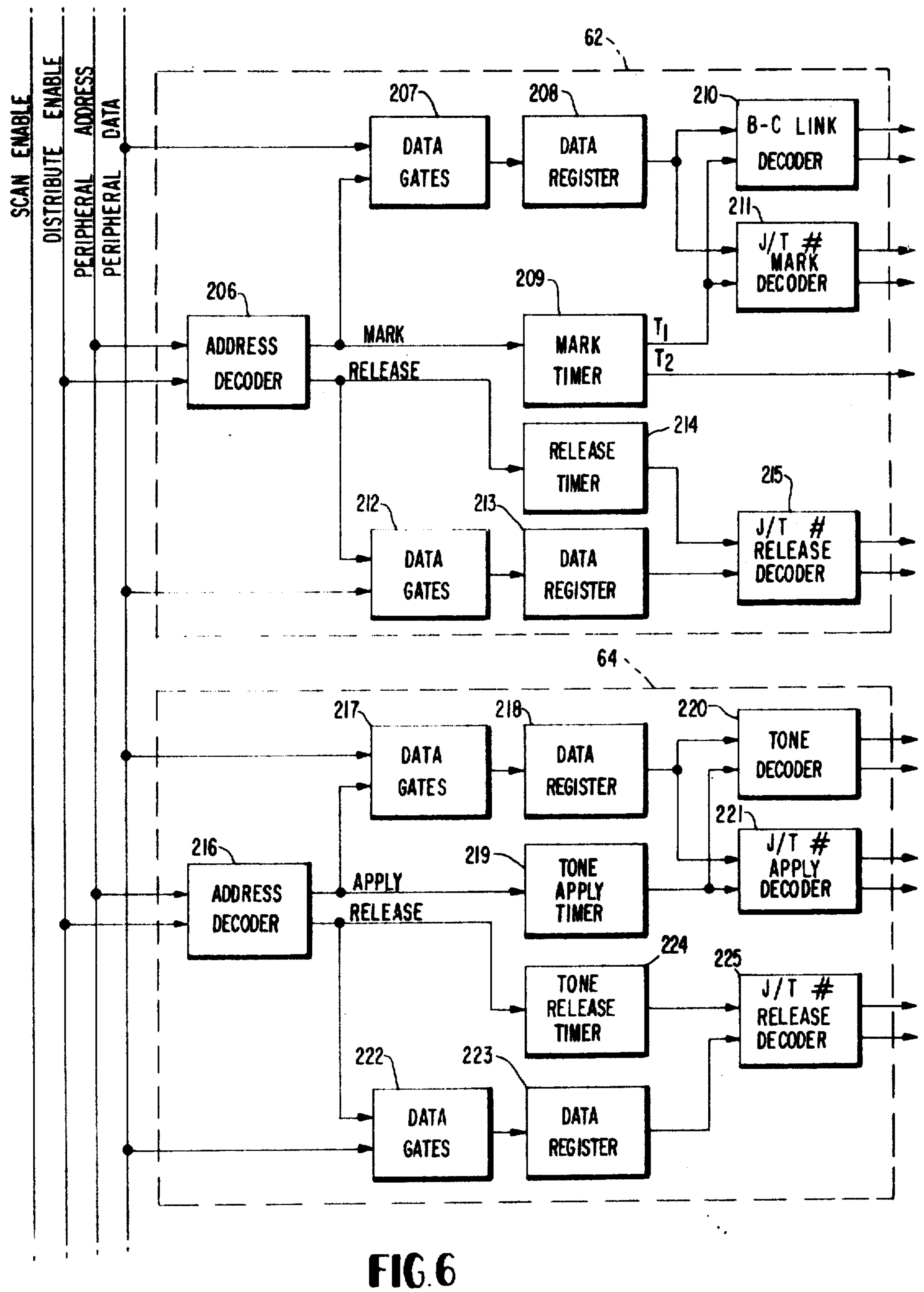
FIG. 6 is a schematic block diagram of the junctor/trunk mark and hold control and tone control systems forming part of the interface system.

FIGS. 5, 6 and 7 illustrate in greater detail the configuration of the various sequencer elements of the interface system. As indicated previously, these sequencer elements serve to extract on request data from the telephone exchange as to the operating condition thereof and apply thereto supervisory control signals from the processor for effecting controlled operation of the exchange. Address and data information are carried to and from the telephone exchange by way of 16 line buses, and scan and distribute signals from the control sequencers associated with the cycle sequencer control in the processor are provided by way of scan enable and distribute enable lines. Access to the various sequencers in this interface system is obtained only by application of the address of that sequencer via the peripheral address bus. In other words, the various sequencers will not respond until they detect their particular address on the bus.

The line scanner and marker sequencer 60 is disclosed in detail in connection with FIG. 5. The scanner portion of this sequencer arrangement employs a binary counter 230 which sequentially signals each of the line supervision relays in the line circuits via line number decoder 231. If a supervision relay is closed indicating that the line is off-hook, the signal is returned to the input 235 to the binary counter 230 from the line supervision relay stopping the counter. The output of the address decoder 226 is enabled during the next scan command addressed to the sequencer, gating the state of the counter 230, that is, the line number, through the data gates 229 to the data bus. Due to the connection of the line 236 from the line supervision relays to the data gates 229, if the lead 235 provides a "O" indicating that no lines are off-hook, data is blocked from reaching the data bus by way of the data gates 229.

An inverter 227 provides a positive slope signal to the one shot multivibrator 228 at the end of the scan command. In response, the one shot 228, a slope-triggered monostable multivibrator, supplies a "start" pulse to the binary counter 230, restarting the counter.

The line marker portion of this circuit decodes the data distributed to it by the processor and marks the specified line. Since the processor operates at a high speed, the peripheral bus signals are of very short duration, approximately 3 microseconds. Therefore, this sequencer includes a storage register 203 and a timer 204 which keep the line marked for a certain number of milliseconds, sufficient for the processor to mark a junctor or trunk. In this regard, it should be recalled that the marking at both ends of the network must be coincident if a connection is to be established.

An address decoder 201 has an output only when data is distributed along the required line mark sequencer address. This gates the data, through the data gates 202 to the data register 203 and starts the timer 204. The line number decoder 205 decodes the binary output of the data register 203, energizing one of the output leads to the line circuits, and this lead remains energized until the timer 204 disenables the line decoder 205.

FIG. 6 illustrates the circuit arrangement of the junctor trunk mark and hold control 62 and the junctor trunk tone control 64. The mark and hold control 62 decodes the B-C link which is to be closed, which junctor or trunk to mark, whether calling or terminating side is being operated on, and the times for these operations. The "mark" output of the address decoder 206 is energized only when a junctor trunk mark command is distributed to the sequencer address. This gates the data through the data gates 207 to the data register 208. In addition, the mark timer 209 is also started, which generates pulses $T_1$ and $T_2$. The output pulse $T_1$ is initiated immediately, enabling the link decoder 210 and the junctor truck number decoder 211 to decode the binary output of the data register 208 and mark one of the B-C links in the switching arrangement and one of the junctor-truck terminals. The output pulses $T_1$ and $T_2$ each have a duration of a few milliseconds; however, the pulse $T_2$ starts slightly later than the pulse $T_1$. This timing assures that the mark enable relay is always the last to close, precluding burnout of the matrix crosspoint contact.

A second address is assigned to this sequencer, which is the release address. The "release" output of the address decoder 206 is energized only when a release command is distributed to the sequencer. This gates the data through the data gates 212 to the data register 213 and starts the release timer 214, which enables the junctor/trunk number decoder 215 to decode the binary data from the data register 213. One of the junctor/trunk release output leads of the decoder 215 will be energized until disabled by the timer 214.

The junctor/trunk tone control 64 is illustrated in greater detail in FIG. 6, this circuit serves to apply tones to the lines as directed by the processor. Ringing, dial tone, ring back, etc. are each assigned data codes which the sequencer decodes along with the desired point of application. A release address is also assigned to the sequencer to effect a release of the applied tones. A tone is "marked" and remains applied until the sequencer receives a command to release that particular tone. Notice that the sequencer is identical to the junctor/trunk mark and hold control except for the omission of the output providing the pulse $T_2$ serving as the mark enable lead. The "apply" output of the address decoder 216 is energized only when the tone mark command is distributed to the sequencer address. This gates the data through data gates 217 to the data register 218. At the same time, the tone apply timer 219 is started, which generates an output pulse enabling the tone decoder 220 and the junctor/trunk number decoder 221 to decode the binary output of the register 218 and mark one of the junctor/trunk terminals. The release address is also received at the address decoder 216 which provides a release command enabling the data gates 222 to pass data to the data register 223 and initiates operation of the tone release timer 224, which enables the junctor/trunk number decoder 225 to decode the binary data from the register 223. One of the junctor/trunk release output leads of the decoder 225 will be energized until disabled by the timer 224.

The junctor/trunk scan sequencer illustrated in FIG. 7 is scanned at intervals by the processor to determine the status of the supervision relays. For an established connection, the supervision relays respond to open/closed loop conditions of the line to which they are connected via the network. By scanning the address of this sequencer, the processor obtains the necessary data to execute the loop analysis (dial digit) program. This data can also inform the processor that a subscriber has hung up, by noting that a closed loop indication is obtained on several excessive scan cycles. This process will be described in greater detail hereinafter.

The supervision relays in the junctors and trunks are divided into groups with each group assigned a separate address. When a scan command is sent to one of the group addresses, the appropriate output of the address decoder 232 supplies a signal to all supervision relays of the specified group. If any of the relays within the group are closed, a signal appears as a data input to the data gates 234. All inputs are gated to the bus through the gates 234; however, the OR gate 233, insures that data is gated onto the bus only when one of the junctor/trunk scan sequencer addresses is scanned.

ARITHMETIC AND LOGIC UNIT

One of the basic elements of the processor is the arithmetic and logic unit ALU, which is illustrated more particularly in connection with FIGS. 8*a* and 8*b*. As indicated previously, all data circulation in the control registers associated with the memory is in the clockwise direction through the arithmetic and logic unit ALU with data being applied to either of two inputs A and B, and being derived from an output C. Overall, the arithmetic and logic unit ALU can perform 17 major arithmetic and logic functions. The following description will provide an indication of the various arithmetic and logic functions which can be performed by this unit so that the subsequently provided description of the various operations performed by the processor can be more readily understood.

Data is applied serially to the input A and, if necessary, to the input B. When data output is required it appears at the output labeled C. The result of tests appears at the output labeled JFF indicating application of a jump signal to the instruction cycle decoder 42. A master reset line MR when equal to a "1," sets the ALU to its initial state. A clockline CL derived from the clock distribute control 22*a* in the control sequencers 22 keeps the ALU in pace with the rest of the processor. The bit-sequencer-to-bit-test-enable BSBTE lead derived from the bit sequencer 22*b* in the control sequencers 22 acts as a strobe, telling the ALU which bit to test during the bit tests. The remaining leads are enable leads that determine which operation is to be performed, these leads being derived from the encoder 16. Only when complementing is desired are more than one of the remaining leads enabled at a time.

The arithmetic and logic unit includes three flip-flops $A_1$ through $A_3$, a full subtractor $A_4$, a full adder $A_5$, 10 NOR gates $A_6$–$A_{12}A_{20}$, $A_{25}$, $A_{29}$ and $A_{30}$, an EXCLUSIVE OR gate 13, NAND gates $A_{28}$ and $A_{31}$ AND gates $A_{14}$, $A_{17}$, $A_{18}$, $A_{22}$ and $A_{23}$, and OR gates $A_{15}$, $A_{16}$, $A_{19}$, $A_{21}$, $A_{24}$, $A_{26}$, and $A_{27}$. The operation of this circuit will be described in connection with the major arithmetic/logic functions performed by the ALU.

One of the basic functions of the ALU is the transfer function wherein data is simply transferred from an input to the output of the device. In the transfer operation, the data applied at input A is to be transferred to the output C without alteration. The carry flip-flop $A_3$ is initially reset by enabling of the R input thereto. With a "1" applied to the T input ordering a transfer operation, a "1" will be applied to the B input of both the full adder $A_5$ and the full subtractor $A_4$ through the OR gate $A_{26}$. At the same time, a "1" will be applied via line 302 to the OR gate $A_{27}$ with the result that the signal will be applied to one input of the inverting NAND gate $A_{28}$ and the inverting NAND gate $A_{31}$. Since the operation performed is a straight transfer operation, the complement input C of the ALU will not be enabled so that a "O" will exist on line 303 to the inverting NAND gate $A_{28}$ and on the line 304 to the inverter $A_{30}$, which then applies a "1" to the other input of the inverting NAND gate $A_{31}$. With the inputs to the inverting NAND gate $A_{28}$ being a "1" and a "O," the output thereof will be a "1," and with the two inputs of the inverting NAND gate 31 being "1," the output thereof will be "O." A "1" applied to the A input to the ALU will be applied to the A inputs to the full adder $A_5$ and the full subtractor $A_4$ via lines 300 and 301. Since the carry flip-flop $A_3$ is reset, the Q output thereof will be a "O" so that the CI input of the full adder $A_5$ and the BI input of the full subtractor $A_4$ will be "O." Under these conditions, the CO output of the full adder $A_5$ will apply a "1" to the data input of the NOE gate $A_7$ and the BO output of the full subtractor $A_4$ will apply a "O" to the data input of the NOR gate $A_6$. However, only the NOR gate $A_7$ will be enabled by a "O" applied to its enable input from the gate $A_{31}$ since an inhibiting "1" will be applied to the enable input of the gate $A_6$ from the gate $A_{28}$. A "0" output will appear from the gate $A_7$ which will be passed and inverted by the gate $A_{12}$ to a "1" at the output terminal C. Thus, a transfer of a "1" at the input A to the output C has been effected.

The transfer complement operation is substantially identical to the transfer operation with the exception that a "1" is applied to the C input of the ALU providing a different control for the gates $A_{28}$, $A_{30}$ and $A_{31}$. With a "1" applied via line 303 the inputs to the gate $A_{28}$ will both be "1" so that the output thereof will be a "0." The "0" applied from the gate $A_2$ to the enable input of the gate $A_6$ will enable that gate passing the "0" from the BO output of the full substractor $A_4$. The output of the gate $A_6$ will be a "1" which is inverted by the gate $A_{12}$ to "0" thereby providing a complement output at the C output of the ALU. Meanwhile, the "1" on line 304 is inverted by the inverter $A_{30}$ to a "0" thereby providing at the inputs of the inverter NAND gate 31 a "0" and a "1," resulting in a "1" output from that gate. Thus, the enable input to the gate $A_7$ is an inhibiting "1" which prevents the gate from being enabled. Therefore, the CO output of the full adder $A_5$ is prevented from being applied to the gate $A_{12}$.

The ALU will also logically OR the data that is applied to the A and B inputs by enabling of the OR input to the unit. A "1" applied via line 305 and OR gate $A_{24}$ to the set S input of the carry flip-flop $A_3$ will produce a "1" at the Q output thereof, which is applied to the CI input of the full adder $A_5$ and the BI input of the full subtractor $A_4$. At the same time a "1" is applied via line 306 to the OR gate 27 resulting in a "0" at the output of the gate $A_{31}$ enabling the gate $A_7$ and a "1" at the output of the gate $A_{28}$ inhibiting the gate $A_6$, as provided in connection with the transfer operation when the C input is not enabled. The B input to the ALU is applied via OR gate $A_{26}$ to the B input of the full adder $A_5$ and the A input of the ALU is applied via line 300 and 301 to the A input of the full adder $A_5$ so that the data on the CO output of the full adder is passed through the gates $A_7$ and $A_{12}$ to the C output. The full adder $A_5$ operates such that with a "1" applied to the CI input thereof if A and B are both "1," CO is a "1"; if A and B are both "0," CO is a "0"; if A is a "0" and B is a "1," CO is a "1"; and, if A is a "1" and B is a "0," CO is a "1." Thus, the data applied to inputs A and B is OR'ed.

The ALU will also produce an OR-complement operation wherein the complement of the data applied at the A input is OR'ed with the data applied at the B input. As in the OR operation described above, the carry flip-flop $A_3$ is set via gate $A_{24}$ applying a "1" to the CI input of the full adder $A_5$ and the BI input of the full subtractor $A_4$. However, in addition to the OR input to the unit, the C input is also enabled applying a "1" on lines 303 and 304 so that the output of the gates $A_{28}$ and $A_{31}$ are "0" and "1," respectively. Thus, the gate $A_6$ is enabled and the gate $A_7$ is inhibited. Data applied from the A input of the unit via lines 300 and 301 is applied to the A input to the full subtractor $A_4$ and the data applied from the B input of the unit via OR gate 26 is applied to the B input of the full subtractor $A_4$. The BO output of the full subtractor will then be passed through gates $A_6$ and $A_{12}$ to the C output of the unit. With a "1" applied to the BI input of the full subtractor $A_4$, if both the A and B inputs to the full subtractor are "1," the BO output will be a "1"; if both the A and B inputs are "0," the BO output will be a "1"; and if the A input is a "1" and the B input is a "0," the BO output will be a "0." Thus, the unit will produce at the output terminal C the operation $\overline{A} + B$.

The ALU will also produce an EXCLUSIVE OR operation wherein data applied to the A input is exclusively OR'ed with the data applied to the B input. In this operation, the enabling input is applied to the EOR input to the unit which enables the NOR gate $A_{29}$ via line 307 producing a zero on line 38 to the enable input of the NOR gate $A_{11}$ providing an open gate for data appearing at the sum output S of the full adder $A_5$. With the carry flip-flop $A_3$ reset during this operation, a "O" is applied to the C input of the full adder $A_5$ so that if the A and B inputs to the full adder are both "O," the sum output S will be a "O"; if the A and B inputs are both "1," the output S will be a "O"; if the A input is a "O" and the B input is a "1," the S output will be a "1"; and, if the A input is a "1" and the B input is a "O," the S output will be a "1."

The ALU will also provide the logical product of data applied to the A input and B input. During this operation, the carry flip-flop $A_3$ remains reset so that a "O" is applied to the CI input of the full adder $A_5$. A "1" applied to the P input to the unit is applied through the OR gate $A_{27}$ resulting in an enabling of the gate $A_7$ and inhibiting of the gate $A_6$ similar to the transfer operation. Data inputs A and B are applied respectively to the A and B inputs of the full adder and the logical product is produced at the CO output connected to the data input of the gate $A_7$.

In the product complement operation the output C of the unit is the logical product of the complement of the data applied to the A input with the data applied to the B input. The carry flip-flop $A_3$ is reset and enabling of the C input to the unit will produce an enabling of the gate $A_6$ and inhibiting of the gate $A_7$ so that the BO output of the full subtractor is passed to the C output of the unit. With a "O" applied to the BI input of the full subtractor $A_4$, the full subtractor will produce the logical product of the complement of the data applied to the A input with the data applied to the B input thereof at the BO output.

In the addition operation, a "1" is applied to the ADD input to the unit which is transferred to the NOR gate $A_{29}$ via line 309 producing a "O" at the line 308 to the enable input of the gate $A_{11}$ thereby providing an open gate to data received at the sum output S of the full adder $A_5$. In addition, the CO output of the full adder is applied via the AND gate $A_{23}$, which is enabled via the OR gate $A_{21}$ from the ADD input to the unit to the AN input of the carry flip-flop $A_3$. The full adder $A_5$ thereby carries on a full addition operation in the well-known manner.

The subtraction operation provides for subtraction of the data applied at the input B from the data applied at the input A of the unit. A "1" applied at the S input is transferred via line 310 to the inverting NOR gate $A_{20}$ thereby applying a "O" to the enable input of the gate $A_8$, making available an open gate to the D output of the full subtractor $A_4$. At the same time, the BO output of the full subtractor is applied via the AND gate $A_{17}$, which is enabled from the S input to the other AN input to the carry flip-flop $A_3$, which is actually functioning as a borrow flip-flop in this operation. The difference output D of the subtractor is gated through the gates $A_8$ and $A_{12}$ to the C output.

The ALU also performs a zero bit test wherein the unit looks for a zero bit at the time the bit-sequencer-to-bit-test-enable lead BSBTE is equal to "1." This operation is useful for many functions, including the check to see if equipment is busy or free from the stored data in the memory relating to the particular equipment, the presence of onhook and offhook conditions in a line circuit from data stored in the memory, and other similar functions wherein it is necessary to determine whether a particular bit in a data format is a "O" or a "1."

With application of a "1" to the ZB input of the unit which is applied via the line 311 through the OR gate $A_{19}$ to the AN input of the flip-flop $A_1$, the next clock pulse will set the flip-flop $A_1$ to a one at the Q output thereof. This will result in a "1" being applied through the EXCLUSIVE OR gate $A_{13}$ to the output JFF. Data is applied to the A input of the ALU; however, there is no C output from the unit. When the bit to be tested gets to the ALU, the bit-sequencer-to-bit-test-enable lead BSBTE will receive a "1" from the cycle sequencer control. If a "1" is received at the same time at the A input of the unit, the AND gate 14 will be enabled applying a "1" through the OR gate $A_{16}$ to the AN input of the flip-flop $A_2$. The flip-flop $A_2$ will be enabled by the next clock pulse applied to the C input thereof setting the flip-flop so as to provide a "1" at the Q output thereof. However, with a "1" also being provided at the Q output of the flip-flop $A_1$, the AN input thereof remaining enabled, the output of the EXCLUSIVE OR gate $A_{13}$ will become a "O." This will indicate that the test is a failure and the bit received at the A input was a "1" rather than a "O ." However, if the bit received at the input at the time that a "1" is applied to the input BSBTE is a "O" the AND gate $A_{14}$ will not be enabled and the flip-flop $A_2$ will therefore not be set. Thus, a "1" will be received only at the Q output of the flip-flop $A_1$ providing a "1" at the output of the EXCLUSIVE OR gate $A_{13}$. This will indicate that the test is a success, that is, that the tested bit received on the A input was a "O."

The ALU will also perform an unzero bit test wherein a particular bit received at the A input at the time the lead BSBTE is a "1" will be tested. Flip-flops $A_1$ and $A_2$ are initially reset so that a "O" is provided at the Q outputs thereof. This means that JFF output is initially a "O" also. The appropriate bit received at the A input gets tested in the manner identical to that of the zero bit test set forth above. If a "1" received at the A output at the time that a "1" is received at the input BSBTE, the AND gate $A_{14}$ will be enabled and the flip-flop $A_2$ will be set providing a "1" at the Q output thereof. As a result, the output of the EXCLUSIVE OR gate $A_{13}$ will be "1" indicating that the test is a success, that is, the bit received at input A is a "1."

On the other hand, if the bit received at the A input is a "0" at the time that a "1" appears at the BSBTE lead, the AND gate $A_{14}$ will not be enabled and the flip-flop $A_2$ will not be set. Thus, the "0" will appear at the output of the EXCLUSIVE OR gate $A_{13}$, indicating that a "0" has been received at the input A of the unit. Note that there is no particular enabling lead at the input of the unit for the unzero bit test contrary to the zero bit test. If no leads are enabled and data is presented at the A input to the unit, the ALU will know than an unzero bit test is to be performed when the BSBTE lead becomes a "1."

A zero test can be performed indicating whether all of the bits presented at the A input are zeros. The flip-flop $A_2$ is initially set by application of a clock pulse to the C input thereof along with the application of a "1" from the Z input through OR gate $A_{16}$ to the AN input of the flip-flop. Thus, the JFF output is initially a "1." Data which is applied to the A input is shifted through AND gate $A_{18}$, which is enabled from the output of OR gate $A_{15}$, and the OR gate $A_{19}$ to the AN input of the flip-flop $A_1$. So long as zeros are applied to the flip-flop $A_1$ no output will be derived fro the EXCLUSIVE OR gate $A_{13}$; however, as soon as a "1" is received at the A input, the flip-flop $A_1$ will be set by the next clock pulse applied to the C input thereof providing a "1" at the Q output of the flip-flop. With a "1" applied to the EXCLUSIVE OR gate $A_{13}$ from both the flip-flops $A_1$ and $A_2$, the output of the gate $A_{13}$ will be a "0." This will indicate failure of the test, that is, that all of the bits obtained via the A input are not zeros. On the other hand, if the JFF output remains "1" throughout the entire operation, this will indicate that only zeros have been received.

An unzero test operation may also be performed, which is similar to the zero test except that during this operation it is desired to determine if the data applied to the A input ever contains a "1," the data then being defined as being unzero. The operation of the ALU is identical to the zero test except that flip-flop $A_2$ is never set.

The ALU also performs a greater-than-zero test, in which operation it is desired to see if the sign bit (the highest order bit of the data) is a "O" and at least one of the other bits is a "1."Both flip-flops $A_1$ and $A_2$ are initially reset so that the Q output thereof is "O." If any data bit applied to the A input is a "1," the flip-flop $A_1$ will be set as a result of the enabled AND gate $A_{18}$ receiving an enabling pulse from the G input via the OR gate $A_{15}$. As a result, the JFF output of the unit will become a "1." At the time the sign bit is presented at the A input, the bit-sequencer-to-bit-test-enable lead BSBTE will be enabled, enabling the AND gate $A_{14}$. If the sign bit is a "O," the flip-flop $A_2$ will remain reset, and if a "1" has been previously received at the input A, the flip-flop $A_1$ will remain set so that the output JFF will equal "1" and the test will be considered a success. However, if the sign bit received at the A input is a "1," the flip-flop $A_2$ will be set via the AND gate $A_{14}$ and OR gate $A_{16}$ producing a "1" at the Q output of the flip-flop $A_2$. In view of the EXCLUSIVE OR gate $A_{13}$, the output JFF will be a "O" indicating that the test is a failure. On the other hand, if all received data bits including the sign bit are "O,"both flip-flops $A_1$ and $A_2$ will remain reset so that the output JFF will equal "O" indicating the test is a failure.

A less than zero test performed by the ALU determines whether the highest order bit of the data supplied to the A input is a "1," the data then being defined as being less than zero. Initially the flip-flops $A_1$ and $A_2$ are reset so that the outputs therefrom are "O." When the highest order bit of the data is presented to the A input of the ALU, a "1" is provided on the bit-sequencer-to-bit-test enable BSBTE enabling the AND gate $A_{14}$ so that if the bit applied to the A input is a "1," the flip-flop $A_2$ will be enabled via OR gate $A_{16}$ while flip-flop $A_1$ will remain reset. Consequently, the JFF output of the unit will be set to a "1." On the other hand, if the highest order bit of data applied to the A input is a "O," both flip-flops $A_1$ and $A_2$ will remain reset providing a "O" at the output JFF. Note that there is no special enable lead for this operation, since if data is applied to the A input and the BSBTE lead becomes a "1" when the highest order bit of the data is present, the ALU will perform the less than zero test.

The final operation of the ALU is the detect and erase right-most one operation which is initiated on enabling the E input to the unit. The purpose of the operation is to find the first "1" presented to the A input of the ALU and *zero* it leaving the rest of the data unchanged. If no right-most one is found, the output JFF should equal "1." Initially, the flip-flop $A_2$ is set via OR gate $A_{16}$ and the AN input thereof upon receipt of a clock pulse at the C input of the flip-flop. The B input of the full adder $A_5$ receives a "1" via lines 312 and 313, through OR gate 26. At the same time this enabling pulse is applied from line 312 through the NOR gate $A_{25}$ to the enable input of the NOR gate $A_9$. The data received at the A input is applied via lines 300 and 301 to the A input of the full adder $A_5$. Thus, as long as a "O" is received on the A input of the ALU, the A input of the full adder $A_5$ will be a "O" and the B input thereof will be a "1" producing a "O" at the CO output of the adder. The CO output of the adder is connected through AND gate $A_{23}$, which is enabled via the OR gate $A_{21}$ from line 312 to a AN input to carry flip-flop $A_3$. Initially, $A_3$ will be in the reset state. As soon as a one is received on the input A, the full adder produces a "1" at the CO output allowing the carry flip-flop to be set by the clock pulse. The data applied to the A input is also passed through AND gate $A_{18}$ which is enabled by the output of the OR gate $A_{15}$ from the input E, so that the flip-flop $A_1$ also is set upon receipt of a "1" at the A input of the unit.

When flip-flops $A_1$ and $A_2$ are both set to provide "1" in the output thereof, the output JFF will equal "O." Now, as long as the carry flip-flop $A_3$ is reset providing the "O" to the CI input of the full adder $A_5$ and also providing a "O" to the enable input of the NOR gate $A_{10}$, the "O" derived from the inverter $A_{25}$ enabling the gate $A_{10}$ will provide a "O" at the C output of the system. At the time the first "1" bit is received at the input A of the unit, the carry flip-flop is not yet set so that a "O" will still appear at the C output of the unit. However, the carry flip-flop will equal "1" by the next clock pulse. This disenables gate $A_{10}$ and allows all following data to be gated through $A_9$. The JFF line changing from a "1" to a "O" will then indicate the external circuitry which of the bits of the data received is the first "1" bit.

It can thus be seen that the foregoing operations are performed in a relatively simple and efficient manner by a system which is extremely simple in configuration, therefore highly dependable in operation. In addition the numerous tests of data applied to the system are carried out by relatively few additional circuit components.

GENERAL OPERATIONAL DESCRIPTION

As indicated previously, there are certain operations at the start of each instruction that are identical for all instructions. As an example, the instruction when read from the memory must be transferred from the memory buffer register MBR into the instruction register ISR, before being transferred to the instruction decoder 40 for further control over the operation of the processor. These preliminary operations are accomplished by the pre-processing (P) cycles. In a like manner, there are certain operations at the end of each of the instructions which are identical for all instructions. As an example, the next instruction must be read. This is accomplished by the OUT (O) cycles. The machine cycle sequencers also include the general or main body of instructions which in various combinations perform the steps of the programs stored in the memory. There are also a group of instructions which provide for displaying of contents of the memory and initial starting of a program with the instructions being defined by the position of a selector switch on the front panel of the processor.

For purposes of providing a clear understanding of the operation of the processor in accordance with the present invention, a description of various instructions stored in the memory and forming the component parts of the various programs of operation also stored in the memory will be provided. First, a description of the alphabetical listing of the abbreviations (mnemonics) used in connection with the various machine's cycle sequences or instructions will be provided. The mnemonics that begin with a register designation and end with the letter A (YA, XA, SNRA, HWRA, IARA, and MBRA) are enables that direct data out of the respective register and into the A input of the arithmetic and logic unit ALU. The mnemonic GENA designates the gating of a generated number from the number generator into the A input of the ALU. Similarly, the mnemonics that begin with a register designation and end with the letter B indicate the enabling of leads which allow data to be gated from the respective register into the B input of the ALU. The mnemonics that begin with the letter C and end with a register designation, provide for the enabling of leads that allow data to be gated from the C output of the ALU into the respective register.

The mnemonics that begin with the letter M and are not the beginning letter of a register designation (MA1, MA2, MB, MG, MISR, ML1, ML2, MN1, and MN2) designate the enabling of leads that allow certain fields of an instruction to be transferred in parallel from the instruction register into the hardward register. The data is right hand justified so that the least significant bit of the field will be in the least significant bit of the hardware register. The mnemonic MISR designates the movement of the entire contents of the instruction register in parallel into the hardware register.

Most of the mnemonics that begin with the letter G represent the generation of certain numbers by the number generator. The mnemonics beginning with the letter S and ending with a register designation select which register is to be loaded when the processor is in the register load mode. The mnemonics beginning with the letter R generally represent a reset operation. Some mnemonics that begin with the letter S stand for a set operation. For example, the mnemonic SCC1 causes the machine cycle sequencers to be set to cycle one and the mnemonic SCD1 causes the machine cycle sequencers to be set to the cycle D1. Mnemonics which begin with the letter T (TUC, TZ, TU, TL, TG, TR, TK and TE) generally designate test operations. Thus, TU indicates a test to see if the register is unzero.

Beginning with the preprocessing cycles by which the processor transfers the next instruction from the memory buffer register into the instruction register, table 1 indicates the three cycles of this instruction. As indicated previously, the pre-processing instruction is wired into the preprocessing cycle decoder 44 so that performance of this preliminary operation is carried out without use of the instruction decoder 40 or the instruction cycle decoder 42.

| P1 | P2 | P3 |
|---|---|---|
| MISR :INFF | GINT :INFF | SCCI |
| MBRA :INFF | GENA:INFF | |
| T :INFF | T :INFF | |
| CISR :INFF | CISR :INFF | |
| | SCCI :INFF | |

TABLE 1

During the first cycle P1 of the preprocessing instruction, a test is made of the interrupt flip-flop 45 (FIG. 2*a*) to determine whether an interrupt of the next instruction for purposes of performing another more important operation is effected. If the interrupt flip-flop is a one, the cycle P1 instructs that the data in the instruction register ISR be moved to the hardware register HWR. If the interrupt is a zero, the memory buffer register MBR will be connected to the A input of the ALU and the instruction register will be connected to the C output of the ALU come on. which will then perform a transfer operation T under control of the encoder so that the data in the memory buffer register MBR will be transferred to the instruction register ISR.

If the interrupt flip-flop was found to be "1" in cycle P1 of the instruction, the processor will advance to cycle P2. During this cycle, the interrupt instruction is generated by the number generator (GINT) and the output of the number generator is connected to the A input of the ALU which effects a transfer operation of the generated member to the instruction register via the C output thereof (CISR). On the other hand, if the interrupt flip-flop was found to be zero in cycle P1 of the instruction, the data in the memory buffer register will have been transferred to the instruction register during that cycle so that during cycle P2 the processor is set to the main cycle C1 of the machine cycle so that the instruction stored in the instruction register can be carried out. Cycle P3 of the preprocessing instruction merely transfers the processor to the main cycle C1 after an interrupt has been determined and the required instruction is gated into the instruction register.

| 01 | 02 | 03 | 04 |
|---|---|---|---|
| IARA | READ | SKIP :RFF | SCPI |
| G(I) | | RCFF :RFF | RJFF |
| GENB | | | |
| A | | | |
| CIAR | | | |
| CMAR | | | |

TABLE 2

At the conclusion of a main instruction the processor performs the instruction OUT necessary to determine the next main instruction to be performed and to read this instruction from the memory. In the first cycle 01 the output of the instruction address register IAR is connected to the A input of the ALU. The number generator is connected to the B input of the ALU, which then adds a single bit to the number advancing it to the next number in sequence. The output of ALU is then connected to the instruction address register IAR and the memory address register MAR. During the cycle 02, the data in the memory position designated by the address stored in the memory address register is read into the memory buffer register in preparation for the pre-processing instruction. During cycle 03, if the run flip-flop is a one the cycle is omitted; whereas, if the run flip-flop is a zero, the cycle flip-flop is reset. During the cycle 04, the processor is set to the cycle P1 of the pre-processing instruction. Also, the jump flip-flop is reset so as to enable it for tests during the next instruction sequence.

| 1 | 2 |
|---|---|
| XA : BI | SCOI |
| YA : BI | |
| XB : AX | |
| YB : AY | |
| A : BO | |
| S : BO | |
| CX : BI | |
| CY : BI | |

TABLE 3

Suppose that the instruction now residing in the instruction register is an add or subtract ASR, which is designated above in Table 3. In this instruction, the contents of a specified work register (X or Y) is added or subtracted to the contents of a destination register (X or Y). The resultant answer appears in the destination register provided in the instruction. The first or zero bit of the instruction indicates whether the instruction requests an addition or subtraction operation. In the first cycle of the instruction, the X register is connected to the A input of the ALU if the first bit of the instruction is a "1"; whereas, the Y register is connected to the A input of the ALU if the first bit of the instruction is a "0." At the same time, the X register will be connected to the B input of the ALU if the instruction indicates that the destination register is the X register; whereas, the Y register will be connected to the B input of the ALU, if the destination register specified in the instruction is the Y register. Next, the ALU is made to perform an addition or subtraction operation depending upon whether the zero bit of the instruction is a "1" or a "0," respectively. The C output of the ALU is connected to the X register or the Y register depending upon whether the one bit of the instruction is a "1" or a "0," respectively. In cycle 2 of the instruction, the processor is advanced to cycle 01 of the OUT instruction.

DTX

| 1 | 2 | 3 | 4 | 5 |
|---|---|---|---|---|
| XA | MG | MWRA :BO | DIST | SCOI |
| T | | YB :BO | | |
| CDTR | | A :BO | | |
| | | CHWR :BO | | |
| | | SKIP :BO | | |

TABLE 4

The processor also performs a distribute X register instruction DTX. This instruction enables a peripheral unit, which is addressed by the sum of the peripheral unit addresses designated in the instruction in the contents of the index register Y, and transfers the contents of the X register to the peripheral unit designated. The peripheral unit is enabled by means of the peripheral address bus (FIG. 2c) and a suitable time delay is introduced during the execution of the instruction to allow for the transfer of information. Execution of the transferred information by the peripheral unit is dependent on the operating speed of the unit addressed, as indicated previously.

Table 4 designates the various steps in the cycles of this instruction. In cycle 1, the X register is connected to the A input of the ALU and the C output thereof is connected to the data register. The contents of the X register are then transferred through the ALU to the data register. In cycle 2 of the instruction, the peripheral address provided in the instructions stored in the instruction register is transferred in parallel to the hardware register. In cycle 3 the output of the hardware register is connected to the A input of the ALU provided the zero bit is a one. The Y register is connected to the B input of the ALU, with the C output thereof connected to the hardware register. The ALU is then caused to perform an addition of the data in the hardware register and the Y register transferring the resultant output to the hardware register. If the zero bit of the instruction is a "O," the third cycle of the instruction is skipped altogether. The fourth cycle of the instruction effects a distribution of the address in the hardware register and the data in the distribute register to the designated peripheral unit. The processor is then transferred in the fifth cycle to the 01 cycle of the OUT instruction.

JB

| | | | | |
|---|---|---|---|---|
| MB | XA :BI | MNI :J | IARA :BO | SCO2 |
| | XA :BI | SCOL :J | IARA :BO | |
| | UB :BI | | | |
| | ZB :BI | | HWRB :BO | |
| | | | HWRB :BO | |
| | | | A :BO | |
| | | | S :BO | |
| | | | CIAR :BO | |
| | | | CIAR :BO | |
| | | | CMAR :BO | |
| | | | CMAR :BO | |

TABLE 5

The processor also performs a jump on bit test (JB—) the steps of which are set forth above in Table 5. This instruction will cause the existing program to deviate from its fixed sequence if a designated bit in the data in X register meets a certain test condition (zero or unzero), the bit position and the condition of the test being specified in the instructions stored in the instruction register. The instruction also specifies the number of instruction addresses that will be jumped over from the current instruction address while the sign of the numbers specifies the direction of the jump.

In cycle 1 of the instruction, the designation of the bit to be tested is moved in parallel from the instruction register to the hardware register. In cycle 2, if the bit one of the instruction register is a "1," the contents of the X register will be connected to the A input of the ALU. Then an unzero bit test (UB) will be performed on the bit specified by the contents of the hardware register. If the specified bit is a "1," that is if it is unzero, the jump flip-flop JFF will be set, as described above in connection with the arithmetic and logic unit ALU. If it is not one, the jump flip-flop will not be set. If bit one of the instruction register is a "O," the contents of the X register will be presented to the A input of the arithmetic and logic unit and a zero bit test will be performed on the bit specified by the contents of the hardware register. If that bit is a "O," the jump flip-flop JFF will be set. If it is a "1," the jump flip-flop will not be set. In cycle 3 two steps are performed. If the jump flip-flop was equal to "O," that is if it was not set, the instruction is completed. The machine cycle sequencers will be set to a cycle OUT (01). If the jump flip-flop was set, the designated number of instruction addresses to be jumped over and the sign thereof are moved in parallel into the hardware register. Bit zero of the instruction register determines whether we are to jump positive or negative. If bit zero is a "1," a positive jump is effected; while, if bit zero is a "O" a negative jump is effected. In both cases the content of the instruction address register is connected to the A input of the ALU. The content of the hardware register is presented to the B input of the ALU and the C output of this unit is connected to both the instruction address register and the memory address register. If bit zero is a "1," the content of the hardware register is added to the instruction address register and then transferred to the instruction address register and the memory address register. If bit zero is a "0" the contents of the hardware register are subtracted from the contents of the instruction address register. The result is placed in the instruction address register and the memory address register. In cycle 5, since we indexed the instruction address register we do not want to increment it. Therefore, the machine sequencer is set to cycle OUT (02). Thus, a bit of the data in the X register was tested as specified by the instruction and if the test was a success we jumped from the normal sequence of instructions to a designated instruction. If the test was a failure, we began execution of the next consecutive instruction.

The foregoing discussion merely provides a description of certain basic instructions to provide an understanding of the operation of the data processing system in accordance with the present invention. Obviously, many other instructions may be carried out by the system of an arithmetic and logic nature.

INTERRUPT CIRCUIT

In order to cause the processor to interrupt a program in the process of execution, at the beginning of the following instruction, an interrupt signal is generated within the system which is detected at the beginning of the next instruction and serves to transfer operation of the processor to an interrupt program stored in the memory. There are N levels of interrupt built into the system, with two memory locations being reserved for each interrupt level. One memory location is in the program area and is called ISA (interrupt starting address) and the other is in the data area and is called IRA (interrupt return address). The ISA contents are defined initially by the assembler and are as permanent and as fixed as the program stored in the memory.

Before the execution of each command, the processor tests for interrupts. Thus, at the beginning of each instruction performed by the processor, a determination is first made as to whether an interrupt is present before the instruction is begun. If no interrupt is present, the instruction can be executed. Conversely, if an interrupt request of level N is found, the present program address is stored in the IRA location of the memory corresponding to the level N of interrupt, and the program control is transferred to the locations specified in the ISA of the same level. The saving of the contents of the X and Y registers is also performed automatically in connection with the interrupt program.

At the end of the interrupt program, the instruction GBN (go-back-to-normal) will complete the interrupt, returning program control to the location specified in the IRA location of the corresponding level in the memory. However, interrupts can also be inhibited by the particular program being executed. In this case, interrupt requests of the inhibited level are not honored by the processor until the program has removed the inhibit.

The basic principles of the invention will first be explained by way of example, and then more specific descriptions of the process and hardware in accordance with the present invention will be presented. For purposes of example, it is assumed that four levels of interrupt are provided in the system and the contents of the ISA and IRA memory locations for each interrupt level and the inhibit condition thereof are set forth in the following chart A.

| Interrupt Level | IRA | ISA | Inhibit |
|---|---|---|---|
| 1 | 1001 | 90 | No |
| 2 | | 150 | No |
| 3 | | 45 | YES |
| 4 | | 280 | No |

CHART A

As indicated in the above chart, it is presumed initially that interrupt level 3 is inhibited and also that a level 1 interrupt is on by the beginning of the execution of the instruction in location 1001. The instructions starting at location 90 in the memory are then executed.

Suppose that a level 2 interrupt now occurs during execution of the instruction relating to interrupt level 1 in location 95. At the beginning of the instruction in location 96, the interrupt is recognized and 96 is stored in IRA at level 2 as indicated in the following chart:

| Interrupt Level | IRA | ISA | Inhibit |
|---|---|---|---|
| 1 | 1001 | 90 | No |
| 2 | 96 | 150 | No |
| 3 | | 45 | Yes |
| 4 | | 280 | No |

CHART B

The instructions starting at location 150 are then executed. Suppose, however, that a level 3 interrupt occurs during execution of the level 2 interrupt program at location 154 in the memory. The processor does not see this interrupt since it is inhibited, and therefore it continues execution of the program at the level 2 interrupt.

Suppose now that the level 2 program is completed and a go-back-to-normal GBN instruction has been executed. The processor branches to the instruction in location 96, where it left off in the interrupt level 1 program so that the condition of the two memory areas is once again as indicated in connection with chart A. During the execution of the instruction in location 98 A level 4 interrupt occurs. At the beginning of the next instruction, the interrupt is recognized and 99 is stored in IRA at level 4, as indicated in the following chart C:

| Interrupt Level | IRA | ISA | Inhibit |
|---|---|---|---|
| 1 | 1001 | 90 | No |
| 2 | | 150 | No |
| 3 | | 45 | Yes |
| 4 | 99 | 280 | No |

CHART C

The instructions starting at location 280 are executed at this time. If it is now presumed that the instruction at location 281 of the memory turns off the level 3 inhibit, execution of the level 4 program will continue since level 3 is of lower priority than level 4. At the completion of the level 4 program, a go-back-to-normal GBN instruction is executed which turns off the level 4 interrupt and branches to the instruction in location 99. The condition of the memory locations is now as indicated in the chart D.

| Interrupt Level | IRA | ISA | Inhibit |
|---|---|---|---|
| 1 | 1001 | 90 | No |
| 2 | | 150 | No |
| 3 | | 45 | No |
| 4 | | 280 | No |

CHART D

At the beginning of the instruction in location 99 where the program at interrupt level 1 left off, the level 3 interrupt, that occurred before the level 3 inhibit, is recognized. Thus, 99 is stored in IRA at level 3 at this time and the processor shifts to program location 45 at this time in level 3. Chart E now indicates the condition of the memory locations.

| Interrupt Level | IRA | ISA | Inhibit |
|---|---|---|---|
| 1 | 1001 | 90 | No |
| 2 | | 150 | No |
| 3 | 99 | 45 | No |
| 4 | | 280 | No |

CHART E

At the completion of the level 3 interrupt program, a go-back-to-normal GBN instruction is executed and the processor shifts back to location 99 in the interrupt level 1, so that the condition of the memory locations is that indicated in chart A. At the completion of the level 1 interrupt program, control is at last transferred back to the main line program at location 1001, which memory location is then erased from the IRA data area.

The aforegoing example illustrates the various interrupt operations which can be performed in accordance with the present invention. The description provides in general the manner in which the various priorities are observed and the way in which various interrupt levels may be inhibited and subsequently observed in response to removal of the inhibit. A more specific description of the process in accordance with the present invention will now be provided.

FIG. 9 presents the format of the interrupt instruction in accordance with the present invention. At the beginning of the interrupt instruction the instruction address register IAR contains the address of the instruction that was to be executed but has been interrupted. The instruction register ISR contains the interrupt instruction and the memory address register MAR contains the same data that is in the instruction address register. The memory buffer register MBR contains the instruction that was to be executed, and the hardware register HWR as a result of the pre-processing instruction contains the instruction that was just executed.

The highest order interrupt is called the trace interrupt T. If the trace interrupt is not on, T will equal zero and the first three cycles of the interrupt instruction will be skipped. If T equals 1 the contents of the hardware register (the old instruction) will be transferred into the memory buffer register in cycle 1. In cycle 2, the trace instruction storage location (a 16 bit designation) is generated by the number generator and transferred into the memory address register MAR. In cycle 3 a write pulse is sent to the memory so that the contents of the memory buffer register MBR will be stored in the memory in the location designated by the address in the memory address register MAR. This series of cycles causes the old instruction to be stored in a dedicated position in the memory, the address of this dedicated position being called the trace instruction storage location.

In cycle 4 of the instruction the L2 field is moved into the hardware register HWR, this field indicating to the processor what level the highest order interrupt is. It is generated by interrupt hardware which will be described in greater detail hereinafter. In cycle 5 of the instruction, the interrupt return address base location will be generated by the number generator and added to the hardware register and placed in the memory address register. Note that the hardware register contained the level of the highest order interrupt at this time, so that the addition of the interrupt level to the base address will provide the address of the particular interrupt level in the memory. After cycle 5, the memory address register MAR contains the interrupt return address IRA storage location for the interrupt it is servicing, as shown in the previous description of interrupts.

In cycle 6 of the instruction the contents of the instruction address register IAR (the address of the instruction that was to be executed) is transferred into the memory buffer register MBR. During cycle 7, the contents of the memory buffer register is written into the interrupt return address IRA storage location. Now that the return address is safely stored away, the interrupt instruction has to get the starting address of the interrupt program written for that specific level.

In cycle 8 the interrupt start address ISA base location is added to the data in the hardware register and is transferred to the instruction address register and the memory address register. At this point it should be recalled that the contents of the hardware register is the level of the interrupt being serviced. In cycle 9 of the instruction a read pulse is sent to the memory so that the memory buffer register MBR now contains the starting address of the interrupt program corresponding to the level shown in the hardware register HWR.

In cycle 10 of the instruction the starting address is transferred into the instruction address register IAR and the memory address register MAR. The interrupt instruction is then finished. Cycle 11 sets the sequencer to OUT 2 instead of OUT 1, since it is desirable to not increment the instruction address register. Upon completion of the interrupt program it is desirable to return to the program that was being executed before the interruption. The go-back-to-normal GBN instruction accomplishes this.

Looking now to FIG. 10 which illustrates the format of the GBN instruction, in cycle 1 the L1 field is moved into the hardware register HWR, and this field, which is in the go-back-to-normal instruction, is equal to the level of the interrupt that caused the processor to branch into the interrupt program. Cycle 2 is skipped over to cycle 3 during which the appropriate acknowledge (the acknowledge of the interrupt just serviced) is turned off. This allows lower order interrupts to come in.

During the cycle 4 of the instruction, the level of interrupt (contained in the hardware register HWR) is added to the interrupt return address base location and transferred to the memory address register. In cycle 5 of the instruction a read pulse is sent to the memory so that the memory buffer register now contains the address of the instruction that was interrupted. In cycle 6, this address is transferred to the instruction address register and the memory address register. Cycle 7 sets the sequencers to OUT 2 so that execution of the program that was interrupted can continue.

As indicated above, it is sometimes desirable to inhibit an interrupt from occurring. In this case, the processor acts as if that level of interrupt did not occur. However, in accordance with the present invention, if the level interrupt occurred during the time it was inhibited, it will come in as soon as the inhibit is removed.

The set inhibit instruction SINH, the format of which is set forth in FIG. 11, provides the appropriate inhibit during cycle 1 and exits to out 1 during cycle 2. The removed inhibit instruction RINH, the format of which is illustrated in FIG. 12, removes the appropriate inhibits during cycle 1 and exits to out 1 during cycle 2. Notice that any combination of the interrupts can be inhibited during a single set inhibit instruction execution. Also, any or all inhibits can be removed during a single remove inhibit instruction execution.

FIGS. 13*a* and 13*b* when combined provide a two level interrupt circuit in accordance with the present invention, which is directly expandable to N levels. Each interrupt level in the circuit includes an inhibit flip-flop INH, an interrupt flip-flop INT and an acknowledge flip-flop ACK.

The FLAG output from the gate D15 corresponds to the interrupt flip-flop INFF referred to in the foregoing description of the invention. When this output FLAG equals 1, there is an indication that at least one new (not acknowledged or inhibited) interrupt exists. The INT outputs on the other hand denote an acknowledged interrupt request. As is apparent, if the number of interrupt levels is not equal to 2, the INT outputs must be encoded to binary; however, if only two levels of interrupt are provided, the outputs will already appear in binary and no encoding will be necessary.

In operation of the circuit in accordance with the present invention initially all flip-flops are reset and will remain reset until an interrupt request is present, i.e., until INTR1 = 1 or INTR2 = 1 at the inputs to the circuit. If a level 2 interrupt is requested, a 1 will appear at the INTR2 input to the circuit which is connected to the input of AND gate D6. This gate is enabled by the $\overline{Q}$ output of the reset acknowledge flip-flop ACK2 and thereby sets the interrupt flip-flop INT2. The Q output of the interrupt flip-flop INT2 is applied on the one hand to AND gate D14 which is enabled from the $\overline{Q}$ output of the reset acknowledge flip-flop ACK2 via AND gate D13 and the $\overline{Q}$ output of the reset inhibit flip-flop INH2. The output of AND gate D14 is applied through OR gate D15 to provide a FLAG output from the circuit indicating that an interrupt is requested. The Q output of the interrupt flip-flop INT2 is also applied to AND gates D10 and D12; however, since the acknowledge flip-flop ACK2 is reset, the AND gate D12 is inhibited by the zero in the Q output of the flip-flop.

During the P1 cycle of the pre-processing instruction, a signal P1 RHWR=1 is applied to the input of AND gate D10 enabling the gate and thereby setting the acknowledge flip-flop ACK2. The 1 at the Q output of ACK2 then enables AND gate D12 to make the INT2 output a 1, thereby acknowledging the interrupt.

Suppose for purposes of example that both the INTR1 and INTR2 inputs to the system come up simultaneously. The interrupt flip-flop INT2 will be enabled in the same manner as indicated above and the INT1 flip-flop will also be enabled via AND gate D21. The Q outputs of the interrupt flip-flops INT2 and INT1 are then gated through the AND gates D14 and D29 respectively, and OR gate D15 making the output FLAG equal to 1. However, at this point no output is provided either at INT2 or INT1 since the acknowledge flip-flops ACK2 and ACK1 are both reset.

During the P1 cycle of the pre-processing instruction, the input P1. RHWR will enable the AND gate D10 to set acknowledge flip-flop ACK2 as indicated above; however, as a result of the set condition of interrupt flip-flop INT2, the output of OR gate D7 connected to the Q output of the inhibit flip-flop INH2 and the $\overline{Q}$ output of the interrupt flip-flop INT2 will be zero. Hence, the output of AND gate $D_9$ will be a zero preventing enabling of the AND gate $D_{25}$ and therefore preventing the enabling of the acknowledge flip-flop ACK1 from the Q output of the interrupt flip-flop INT1. Therefore, the INT1 output will remain zero providing for execution of the level 2 interrupt but not execution of the level 1 interrupt which is of lower priority. Although the output of AND gate D14 is now zero as a result of the setting of acknowledge flip-flop ACK2, the output FLAG remains a 1 since the OR gate D15 still receives a 1 from the enabled AND gate D29 associated with the set interrupt flip-flop INT1. The output FLAG informs the processor that a lower order interrupt is awaiting service.

The last cycle of the interrupt program which is serving the second level interrupt is the cycle OUT 2. In setting the machine cycle sequencer to the OUT 2 cycle, an input is received at DSCO2 in the interrupt circuit applying the Q output of the acknowledge flip-flop ACK2 through the AND gate $D_5$ and OR gate $D_8$ to reset the interrupt flip-flop INT2. In this regard, it should be noted that as a result of the AND gate $D_5$, the input at DSCO2 will not reset the interrupt flip-flop unless the acknowledge flip of that interrupt level is also set. Thus, the input at DSCO2 will not reset the interrupt flip-flop INT1 because the acknowledge flip-flop ACK1 is reset and the Q output thereof to the gate $D_{20}$ is a zero. Therefore, the input DSCO2 resets only the interrupt level which was just serviced. The go-back-to-normal instruction GBN issues a TOAA (turn off appropriate acknowledge) command, and at the same time applies a 1 to the ISR2 input to the system. This results in an enabling of the AND gate $D_3$, the output of which is applied through OR gate $D_{11}$ to reset the acknowledge flip-flop ACK2.

The level 2 interrupt is now reset, but the FLAG output is still provided from the system. Although the interrupt program has just been completed, this FLAG output is interrogated again as the first step of the main program execution (during the pre-processing instruction). On finding a 1, control is once more branched to the interrupt program. Assuming that the level 1 interrupt is not inhibited, the P1 cycle of the interrupt program now enables AND gate $D_{25}$ as a result of the 1 received from the output of AND gate $D_9$, the second level interrupt having now been completed and the inhibit and interrupt flip-flops of this level being reset. Thus, the acknowledge flip-flop ACK1 will be set from the Q output of the interrupt flip-flop INT1 thereby enabling the AND gate $D_{27}$ to provide a 1 at the output INT1. With the setting of the acknowledge flip-flop ACK 1, the AND gate D29 is no longer enabled so that no FLAG output is provided by the OR gate D15. On completion of the program the input DSCO2 resets the interrupt flip-flop INT1 and simultaneous inputs at TOAA and ISR1 reset the acknowledge flip-flop ACK1. The outputs INT1, INT2 and FLAG are each now zero, therefore, main program execution continues until a new interrupt request comes in.

Suppose, however, that at completion of the program relating to the interrupt two level the level 1 interrupt had been inhibited, the inhibit flip-flop INH1 having been set via the AND gate $D_{16}$ from the input ISR1 enabled by the input SINH. The output $\overline{Q}$ of the inhibit flip-flop INH1 would have blocked AND gates $D_{29}$ and $D_{25}$. As a result, the output FLAG would have been zero and the processor would have continued to execute the main program. However, the interrupt flip-flop INT1 would still have been set so that upon removal of the inhibit, i.e., upon resetting of the inhibit flip-flop INH1 via AND gate $D_{17}$ upon receipt of an input RINH, the output FLAG would immediately become 1 indicating that a lower level interrupt is awaiting execution.

LINE SCAN, CONTROL AND INTERCONNECTION

A basic requirement for any telephone system is the analysis of the loops or wires that connect telephones or trunks to the equipment which switches the call to its proper destination. The opened or closed states of a loop along with the time interval that the loop is opened or closed all have a special meaning in the overall analysis. The multiplicity of time intervals involved in loop analysis will not be specifically set forth herein since this information is well documented in telephony literature.

The control over the telephone exchange by the stored program system can be basically broken down into three main operations, i.e., line/trunk scan, loop analysis, and network connection. These three operations detect a request for service, determine the substance of the request including the destination of a requested call, and effect the necessary control and interconnection to establish or satisfy the subscriber request.

The line/trunk scan process consists of two input scanning routines, one for trunks and the other for lines, and one common queue accessing routine, as shown schematically in FIG. 14. The process is so arranged that the trunk scan routine 405 is executed first thus giving trunks a higher priority in acquiring service. Trunk scanning involves the use of various memory storage areas, such as the loop supervision current look table 406, the junctor/truck busy/free table 404 and the service request queue 403. The busy/free table 404 contains the status of each junctor and trunk, the current look table 406 contains the current loop condition of the junctors and trunks, and the service request queue provides the identity of lines and trunks requesting service in the order the requests are received.

Line scanning involves the line scanner associated with the line circuits controlled by a line scan routine 401 which utilizes the data areas in the memory, including the service request queue 403 and a line busy/free table 402. As indicated previously in connection with the peripheral equipment, the line scanner 400 is a non-homing line scanner which continuously scans all lines looking for a request for service. On detection of a request the scanner stops and sets a flag indicating a request is present. The line scan routine 401 interrogates the line scanner to see if a flag is set. If the flag is set, the line identity contained in the line scanner is transferred to the processor via the peripheral bus. The line number is checked for validity and if valid its busy/free status is stored in the table 402. The line number is also entered in the service request queue 403 for further processing. If invalid, the line number is rejected.

FIG. **15*a* shows the data format of the service request queue 403 including its pointers SIP (service request queue inpointer) and SOP (service request queue outpointer). Each entry shown in the memory layout is a 16 bit word with SIP pointing to the next entry location. The leftmost bit (bit 15) in SIP is a flag bit which if set to 1 indicates the queue is full. The pointer SOP points to the next exit location, the leftmost bit (bit 15**) thereof serving as a flag bit which if set to 1 indicates that the queue is empty.

Figure 15A:
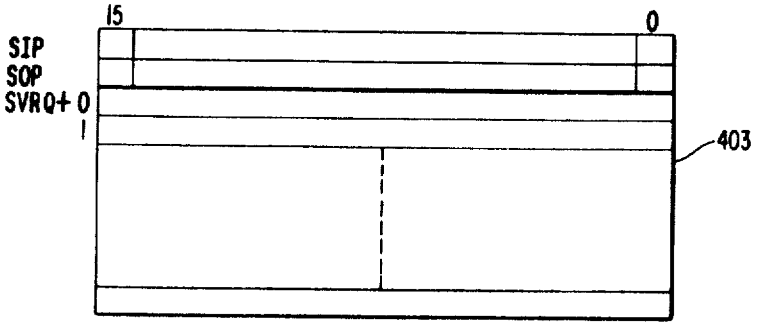
Figure 15B:
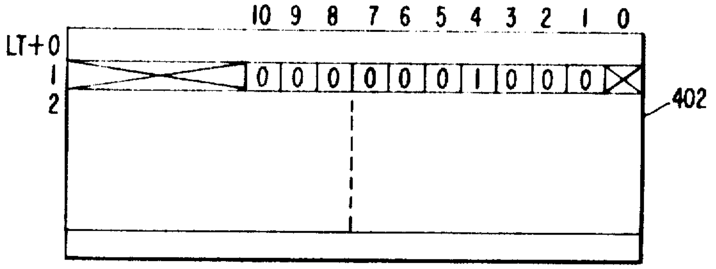
Figure 15C:
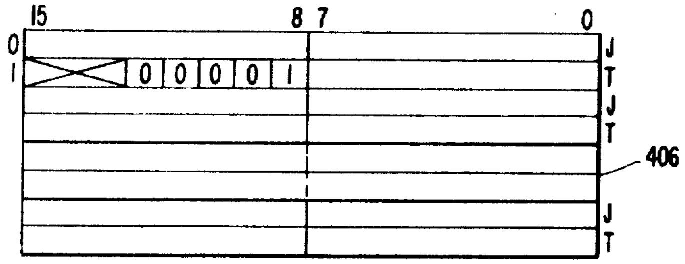
Figure 15D:
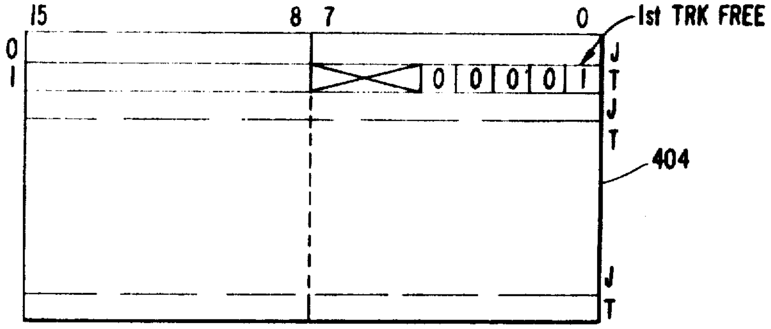

FIG. **15*b* shows the data format of the line busy/free table 402. The busy/free status of lines are stored on a bit basis, that is a 1 indicates a busy status and a 0 indicates a free status. Each entry in the table corresponds to a line group of a first stage switching matrix. Each bit within an entry corresponds to a specific line within the line group. Thus, the table as illustrated in FIG. 15*b* is set up to accommodate a switching arrangement wherein each matrix provides for connection to 10 lines. It is also noted from the Figure that the LT+1 entry reflecting the status of every line assigned to the first switching stage indicates that line 014** is busy.

FIG. **15*c* shows the data format of the loop supervision current look table 406. Status information is also provided on a bit basis in connection with this table with a "1" indicating off hook and a "0" indicating on hook. A typical entry shown in FIG. 15*c*** indicates one trunk is off hook, i.e., the first trunk in the first trunk group. The current look is arranged such that even and odd number entries are assigned to junctors and trunks, respectively.

FIG. **15*d* shows the data format for the junctor/trunk, busy/free table 404. The same format is used in this table as in the current look table 406** with the exception that the information is contained in the right half of the entry.

The line/trunk scan portion of the process will be described in detail in connection with the flow diagram of FIG. 16. This flow diagram is subdivided into three routines, the trunk and line scan routines and the queue access routine. The first routine to be executed in the process is the trunk scan routine. At the start of the process a check is made to determine if the service request queue SVRQ is full (step 501). The primary object of this portion of the operation is to enter requests for service into the service request queue. If the queue is full, the routine exits at step 501. In the event the service request queue is not full, the trunk scan routine is initiated. Step 510 provides the table size and negative index to permit the busy/free table 404 and current look table 406 to be interrogated. The first trunk entry from the busy/free table and the current look table are obtained at steps 511 and 512. A check is now made to determine if a free trunk is requesting service. The busy/free status of trunks is indicated in the busy/free table. A trunk request for service will be so indicated in the current look table as an off hook condition or "1" in the bit position assigned to the trunk (for example as previously described in connection with FIG. **4*c*** ).

If a trunk request is noted at steps 513 and 514, i.e., a free trunk with a current look status of "off hook" is found, the busy/free table 404 is updated to reflect the new busy status of the trunk at step 515. The process now enters the queue access routine via X1. Note, if no trunk request is detected, the program loops through steps 517, 518, 511, 512, 513 and 514 until all entries in the tables have been interrogated. When all of the entries have been interrogated, the trunk scan routine exists to the line scan routine via X2 at step 517.

The primary purpose of the queue access routine is to enter the line or trunk numbers requesting service into the service request queue, which is accomplished at step 530. After the number is entered, the standard in and out pointer housekeeping is performed. The inpointer SIP is incremented and the queue empty flag (bit 15 in SOP) is reset at step 531. At step 532 a comparison is made between SIP and SOP to determine if the queue is full. If SIP and SOP are equal, the queue is full and the queue full flag (bit 15 in SIP) is set at step 535, and the process then exists. If the comparison between SIP and SOP indicates that the queue is not full, then a check is made to determine if the line scan unit is linked at step 533. If the line scan unit is not linked, the queue access routine transfers to the trunk scan routine at step 534. A check is then made to determine if any other trunks within the existing entry are requesting service. The trunk scan routine now functions as previously described. If the line scan unit is linked at step 533, then the link is dismantled at step 536 and the program exits. When all trunk entries have been checked, the routine exits via X2 to the line scan routine.

The primary function of the line scan routine is to determine if any lines are requesting service, and if so to enter the line number in the service request queue. Entry to the line scan routine is via X2. The first function of the line scan routine is to interrogate the line scanner to determine if a line is requesting service, which is performed at steps 520 and 521. If a line is requesting service, a check is made to determine if the line number is valid at step 522. If the line number is not valid, the line scanner is again interrogated via X2 and step 520. If the line number is valid, a check is made to determine the busy or free status of the line at step 523, and if interrogation of the line busy/free table indicates that the line is busy, the program exits. If the line is free, then the line busy/free table is updated to indicate the new busy status thereof at step 524, and at the same time the link bit is set to 1 at step 524. The line scan routine now transfers control to the queue access routine at X1. The line number is entered into the service request queue at step 530, and the inpointer and outpointer housekeeping is performed as previously described. The queue access routine finally checks to determine if the line scan unit is linked at step 533. Since the link was set to equal 1 in step 524, the line scan unit is linked. The link is now dismantled at step 536 and the process exits.

Once the lines or trunks which request service are detected through the line/trunk scan routine and control is initiated by the central processor to interconnect the lines through the switching network to available junctors so that dial tone can be returned to the subscriber, the system is ready to monitor the line conditions so as to provide dial impulse detection. The loop analysis to be described in connection with the present invention has the capability of functioning with loop pulsing speeds in the range of 8 pulses per second to 12 pulses per second. A nominal loop impulse is defined as 100 milliseconds during which the loop is opened for 60 milliseconds and closed for 40 milliseconds.

FIG. 17 provides a general schematic diagram of the various units that are required to perform the analysis for a multiplicity of loops using a stored program system. Since loop analysis deals with the measurement of time intervals, a time base is provided by a clock 600 through the interrupt control so that a 10 millisecond time period and a 100 millisecond time period via counter 106 are available. Every 10 milliseconds the functions provided by the loop scan/table update routine and the dial impulse detection A-section routine are executed in the sequence shown. If 100 milliseconds has not passed the go back to normal routine is executed. Every 100 milliseconds the functions provided by routines 602,603 and the dial impulse detection B-section 604 are executed in the sequence shown. Upon completion of the B-section a go back to normal routine is executed.

The loop supervision control 601 is an interface unit such as the junctor/trunk scanner 66(FIG. 2c) that receives information from some form of detection device located in the loop (usually a supervision relay) on command of the processor during the loop scan/table update routine 602. The information received by the loop supervision control 601 is converted to the digital form required by the processor and passed into the processor. The routine 602 also provides the necessary logic decisions that create a current look and a change look table for future use during dial impulse detection.

The dial impulse detection A-section 603 provides the logical sequences necessary to determine if the changes which occur in a loop are or are not a dial impulse. Impulses detected are accumulated in a dedicated area of the memory forming a plurality of processing registers 605 the format of which is set forth in FIG. 18a. Impulses of too short a duration are rejected while the dial impulse detection B-section caters to time intervals that are longer than an impulse, such as the interdigital time period and the release time period. The dial impulse detection B-section also performs the task of arrangeing the accumulated data contained in the processing registers into the final format required for future processing. A special data area of the memory serves as a scratch pad area or store 607, which is utilized during various portions of the process to retain temporary data that occurred during the course of process execution.

The format employed for storing loop information in the current and change look tables is shown in FIG. 18b. Each loop that is to be analyzed in the system is assigned a dedicated bit position in the current look table. The bit position assigned to a given loop in this table will be the same bit position assigned to the loop in the change look table. Likewise, loops assigned to the first entry in the current look table will also appear as the first entry in the change look table. A basic requirement for the dial impulse detection A-section portion of the process is to provide storage that can retain control and data information until a decision can be reached that the area in question is no longer needed. To accomplish this need a processing register is employed along with a dial pulse indicator DPIND having a format as indicated in FIG. 18b. The indicator serves the purpose of determining which processing registers are engaged in loop analysis.

A processing register is made available for loop analysis by marking the dial pulse indicator DPIND and storing in the junctor work JTR (FIG. 18a) the identity of the loop (J/T No.) to be analyzed. Since the loop analysis being discussed deals with a telephone system, the loop identities in question will be junctors or trunks. The dial pulse indicator DPIND is arranged such that each bit position within the indicator corresponds to a given processing register.

The various process loops that make up the loop supervision analysis process are shown in the flow diagram formed by FIGS. 19a, 19b and 19c. Data areas (processing register, loop supervision tables) necessary to understand the functions of the loop supervision analysis process are shown in FIGS. 18a and 18b.

As described previously, the execution of the loop supervision program starts each time a 10 millisecond time mark occurs from the clock 600. The total time required to execute the loop supervision program therefore must not exceed 10 milliseconds. This restriction can be met by limiting the number of loops supervised to the maximum number that can be safely handled in a 10 millisecond time period.

A loop analysis program begins at the start point shown in FIG. 19a. Steps 810 through 815 make up a loop that performs the following sequential tasks. The table size or number of entries in the current look table, for example 16, expressed as a negative number, is loaded into a work register. The table size will be used as an index number and is added to the base memory address for the position in the memory occupied by the current look table to obtain the first entry in the table. The first entry is saved in the store or scratch pad 607 and the loop status points associated with the first entry are scanned during step 811. The current status of the points scanned is stored in the first entry of the current look table at step 812. The current status is now compared with the entry saved during the prior scan interval and the results are stored in the change look table at step 813. The index number is incremented and tested to determine if the index number is still negative at steps 814 and 815. If the index number is still negative, the new index number is added to the current look table base address and the program continues as before, except that the second entry is obtained from the current look table. The process continues until the index number is no longer negative (it is 0) at which time the dial impulse detection A-section of the process is initiated.

The execution of the DIDA routine indicated by the flow diagram of FIG. 19b begins at step 820 where the dial pulse indicator DPIND is loaded into a work register. The indicator is inspected at step 822 to determine if any processing register requires dial impulse detection. If there is no request, the timer is checked at step 852 to determine if sufficient time has elapsed to execute the DIDB portion of the process. If the timer indicates that 100 milliseconds has not elapsed since the last time the DIDB process was executed, the loop analysis process ends until a new 10 millisecond time mark is generated by the clock.

If the dial pulse indicator DPIND contained processing registers that required loop analysis, the first rightmost bit in the DPIND is selected. The processing register associated with the bit position selected will now be operated upon by the DIDA portion of the process. The loop that is assigned to the processing register is contained in the JTR word of the register (see FIG. 18a) in the form of the junctor/trunk number. The number contained in the JTR portion of the register performs a threefold job. Its first function is to define the physical location of the loop being analyzed. Its second function is to provide an index number to access the change table, which is provided by the foremost significant bits of the number. Its third function is to locate the bit position within the change table that corresponds to the loop being analyzed, which is accomplished by the four least significant bits of the number. Step 823 of the process serves to breakdown the junctor/trunk number into its component parts such that the proper change bit in the change table corresponding to the loop in question can be interrogated at step 824.

If the change bit in question is a "1," the loop that consists of steps 830, 831 and 832 is entered. The ACR work of the processing register, which was made "0" when the register was assigned, is updated by setting the CHT and RLL bits to "1" and the RIT bit to "0." The CHT bit is the loop change bit, the RLL bit is the register last-look-of-the-loop-since-a-change-occurred bit and the RIT bit is the register interdigital time bit. Once the ACR work has been updated, the program returns to step 822 via X, to look for the next rightmost one in the dial pulse indicator DPIND. For any change that occurs in the loop being analyzed, the change loop which consists of steps 830, 831 and 832 will be executed.

If the change bit interrogated at step 824 is not a "1," the loop consisting of steps 840 and 841 is executed. The ACR word of the processing register is inspected to see if the change bit CHT is a "1." If the change bit is not a "1," a jump is made to step 832 via X2 which in turn returns the program to step 822. The next processing register, if any, is now handled. The loop consisting of steps 840 and 841 is the most often used loop in the process since the majority of the time a loop is in a no-change state.

If the change bit CHT tested at step 841 is a "1," step 842 is undertaken which resets the CHT bit to "0," and the RLL bit is then tested at step 843 to determine the state of the loop since the last change occurred. If the RLL bit is not zero, the pulse bit P is tested at step 850 to determine if it also is "0." If the P bit is "0" the conditions existing on the loop are interpreted as an impulse that is too short a duration and is rejected. The basic function, therefore, of the tests performed by steps 843 and 850 is to screen out all loop changes that do not achieve a steady state in one 10 millisecond period.

If the RLL bit is "0" at step 843, the P bit is set to 1 at step 845 and the dial tone DT bit in the ACR portion of the register is checked for "0 "at step 846. If the DP bit is "0," indicating that no dial tone is being applied, a jump is made via X2 to step 832 which returns the process to step 822. A new processing register, if any, can now be handled. The conditions described form the impulse loop in that the condition existing on the loop is an impulse that has achieved a stable state for 10 milliseconds. If the DT bit test at step 846 is not "0," the work indicator for the tone condition routine (step 847) is marked to indicate that a job exists for the routine to execute. The specific job that will be executed is to remove dial tone from the loop. Step 847 is entered only once during the course of analyzing a loop.

Once the P bit has been set to "1," the DIDA routine will idle in the loop consisting of steps 840 and 841. It is obvious that the logical sequence which leads up to the idle loop must also be performed. The routine will always enter the idle loop or any loop that is in a stable state each time it is executed. Since the P bit has been marked, a change in a loop must occur within 100 milliseconds if the action being described by the loop is to be an impulse. When the change occurs, the change loop is entered at steps 830, 831 and 832 and performs the functions described earlier. The major logical sequence for this loop is set forth at step 831. During the next 10 millisecond time period, the loop consisting of steps 840, 841, 843, 850 and 851 will come into play. Once again, no decision can be reached unless the loop has achieved a stable state for a minimum of 10 milliseconds.

Since the P bit is a "1," step 851 will be entered which sets the P bit to "0" and adds 1 to the accumulator ACC in the ACR portion of the processing register. Once this task has been performed, a jump is made via X2 to step 832 which in turn returns the routine to step 822. All of the various sequences described are repeated, (except for step 847) until all of the necessary dialed information has been received by the processing register or the call is abandoned.

The execution of the DIDB portion of the process begins at point B in FIG. 19*c* and is executed every 100 milliseconds. Step 860 performs the same function that step 822 accomplished in connection with the DIDA portion of the process. If there is a processing register or registers engaged in loop analysis, the ACR work is loaded into a work register at step 861 and the RIT bit is inspected to determine if it is a "0" at step 862. If RIT is a "0," the bit is set to "1" at step 863 and the dial pulse indicator DPIND is interrogated to determine if any other processing register must be serviced. The setting of the RIT bit to "1" signals the start of a 100 millisecond time interval. If no changes occur in the loop assigned to a processing register, in which the RIT bit is "1," the RIT bit will remain 1. If an change occurs, the DIDA routine will set the RIT bit back to "0" and a new 100 millisecond time interval must be started by DIDB.

If the RIT bit is not "0" at step 862, the RLL bit is interrogated to determine if it is "0." If the RLL bit is "0" the condition which exists on the loop is such that the loop has been opened for 100 milliseconds or longer. Since the loop in question has been opened for this time period, the condition is judged a release. The information required to release the equipment that was being used (links, junctor, trunk) is entered into a release queue at steps 872 through 876. The operation of the queue will not be discussed since it is not of major importance to the DIDB function.

Once the release queue operation is complete, all work indicators that may have been affected by loop analysis are reset at steps 877 and 899. The digit analysis indicator DAIND, busy/free indicator BFIND and the dial pulse indicator DPIND are the indicators that are under control of the DIDB routine. The indicators DAIND and BFIND employ the same format as DPIND. The resetting of the DPIND indicates that no further loop analysis is required and hence the DIDA and DIDB routines will no longer be executed for the processing register involved. In a like manner, the BFIND frees the processing register so that it can now be assigned to another loop. The DAIND is reset so that time is not wasted in performing an analysis on the first dialed digit.

If the RLL bit is not "0" at step 870, then the condition that exists on the loop is such that the loop has been closed for 100 milliseconds or longer. If the loop in question has been closed for this time period, the condition is judged an interdigital period provided the accumulator in the processing register is not "0" at step 880. If the accumulator is "0," then the loop is only in a prolonged off hook period and the routine will loop back to look for another processing register. If the accumulator is not "0," the IDC bit is tested for "0" at step 881. If the test is "0," the data contained in the accumulator is the first dialed digit and it is moved to the first digit store in the ACR portion of the processing register at step 882. A "1" is placed in DAIND corresponding to the processing register being serviced at step 883. The ACC is set to "0" and IDC is incremented in the ACR at step 894. The routine loops then back to look for another processing register.

All the sequences described are repeated every 100 milliseconds except when step 881 is reached. Since the IDC has been incremented, the routine will now enter step 890. If the IDC is equal to 1, steps 892 and 893 are executed. Since information received from a telephone dial is not in true binary form, the data contained in ACC is converted to its binary equivalent and stored in the DGR word of the processing register. Step 899 is then undertaken and the sequence described above for this step is carried out.

The routine will now follow the path from step 881 to 890 to 895 where the next dialed digit is handled. The third dialed digit is added to the contents of DGR at step 896 (DGR contains the binary equivalent of the second dialed digit) and step 899 is undertaken to complete the loop.

The last loop in the DIDB routine can now be undertaken when step 895 is tested to determine if it is equal to two. Since the IDC is now equal to three, step 897 is undertaken. The fourth dialed digit is concatenated to the data contained in DGR to complete the terminating line number. The network connection indicator is marked NCIND in the bit position corresponding to the register being serviced at step 898. The marking of the NCIND turns control of the processing register over to the network connection terminating routine. The functions performed by this routine will be described below. Step 899 is undertaken and the DPIND is reset indicating that no further loop analysis is required by the DIDA and DIDB routines. The routine now looks for another processing register to service.

The translation performed in DIDB is not an essential part of the DIDB routine and is included only from the standpoint of its influence on the overall configuration of a stored program system. The translation described is only one of many that could be used and in some instances no translation at all may be required. The DIDB routine possesses the flexibility to cater to no one or any translation scheme.

A fundamental requirement for any communication system is the switching of a known inlet to a free outlet. The network connection routine described herein is based on a three-stage switching network wherein the number of inlets exceeds the number of outlets by a factor of approximately 5 to 1. Such a system is described and illustrated, for example, in connection with FIG. 2*c*.

Figure 2C:
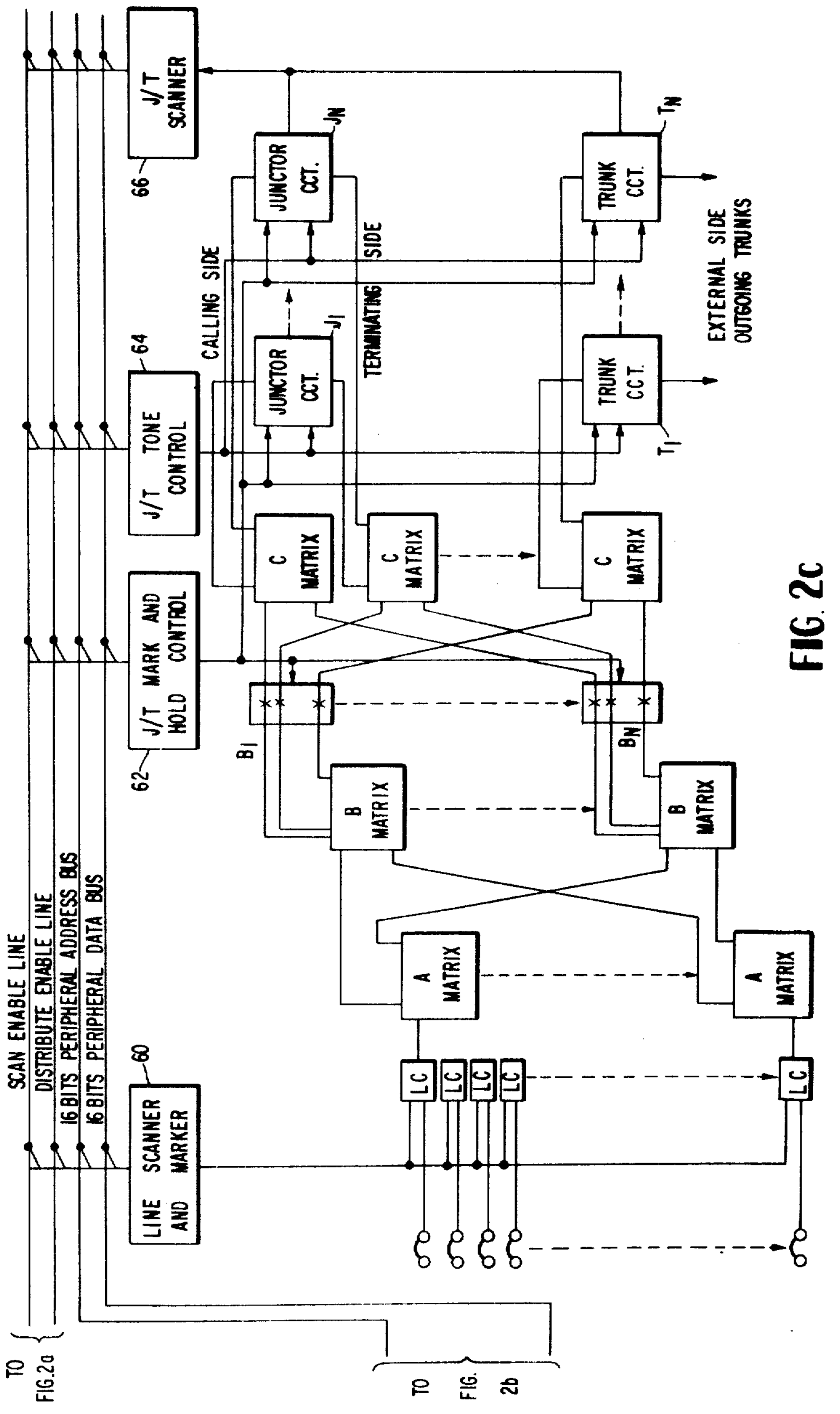
Figure 3A:
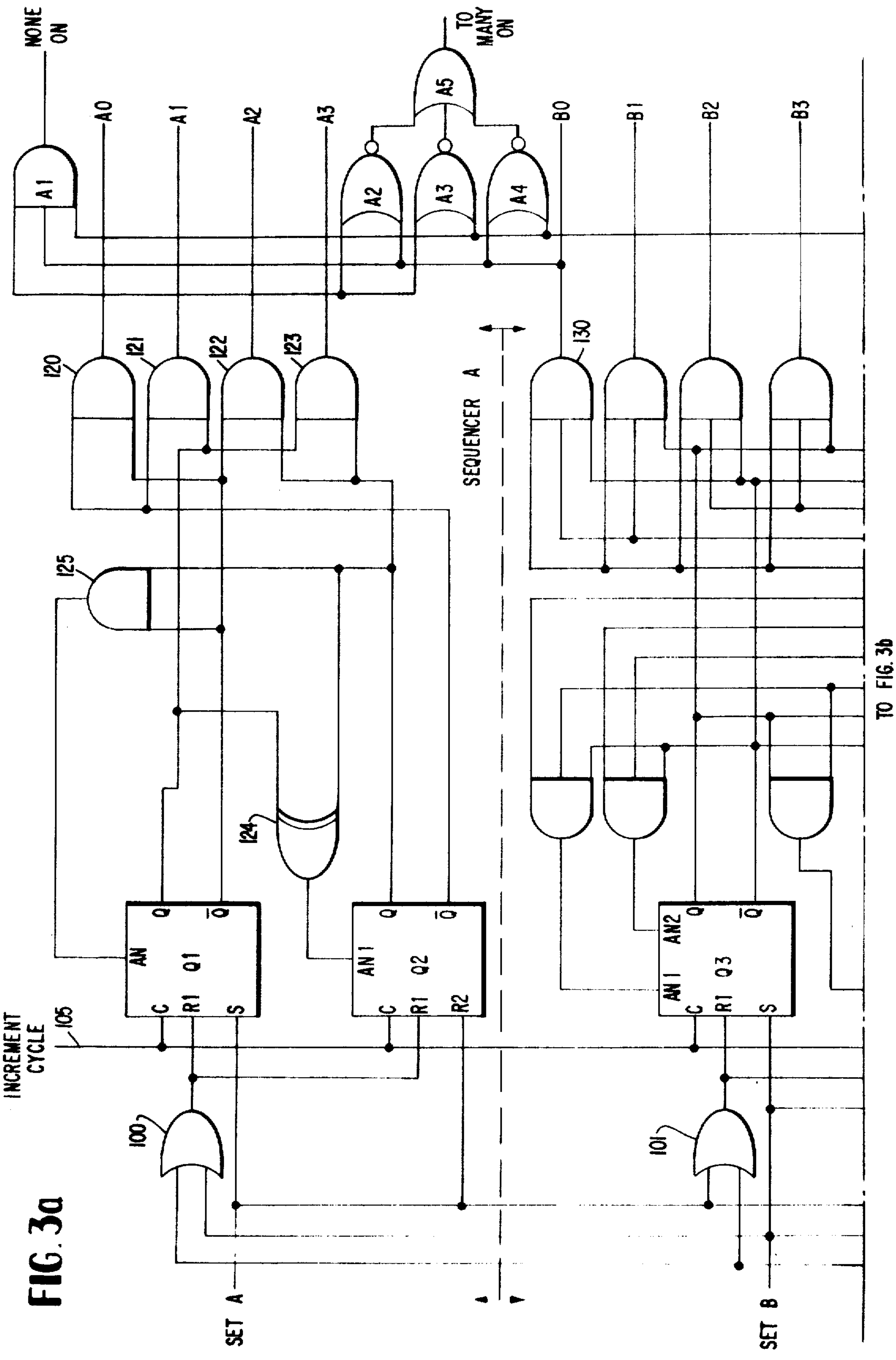
Figure 3B:
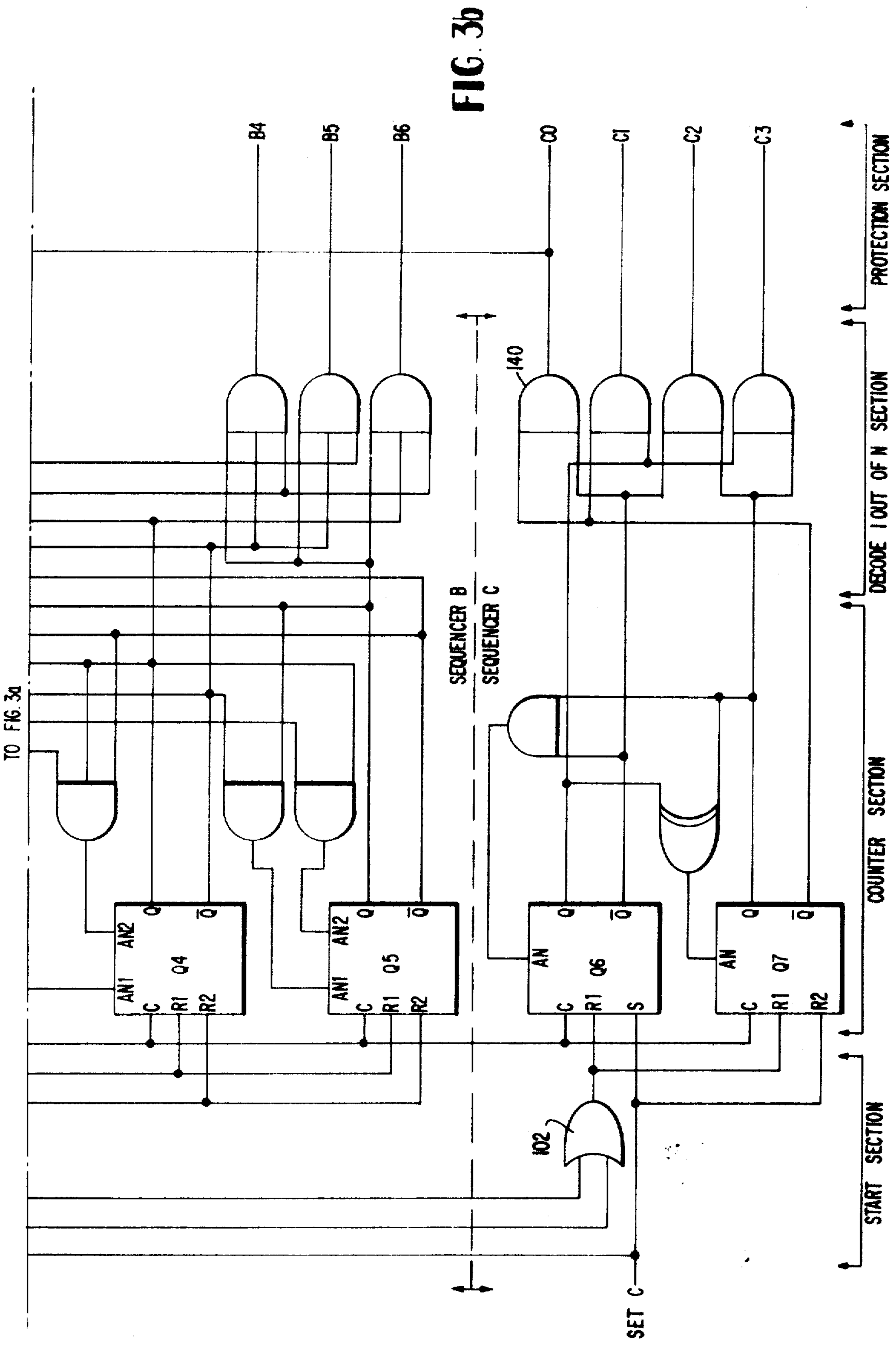

The mark and hold control 62 of FIG. 2*c* receives coded information from the network connection routines via the peripheral bus. The information received by the mark and hold control 62 contains the inlet required in a given first stage, the outlet required at a given final stage and the BC link switch required to close a path between these two points. The function of the mark and hold control, as already described, is one of applying the proper electrical signals to the points indicated.

The network connection routine in accordance with the present invention is divided into two parts. The calling routine is primarily concerned with finding a path in the switching network between a free outlet and an inlet requesting service. The terminating routine is primarily concerned with finding a path between a known outlet and a known inlet. The memory contains a mask table providing the busy-free status of every AB and BC link in the switching network while the busy-free state of each outlet is contained in the junctor/trunk table, also provided in the memory. The equipment in use table, as indicated previously, contains the record of which equipment is in use including the AB or BC link which may be presently in use. The indicators employed by the network connection routine provide the location of the processing registers which contain information required in establishing a path through the switching network. The memory also provides a service queue from which may be obtained inlet line numbers that require service. The busy-free state of all lines in this system is interrogated by the network connection terminating routine to determine if a line is busy or free before a path is set up. The memory also provides a release queue employed by the network connection terminating routine to release a path that will not be required in a final connection. In addition, as indicated previously, a store or common scratch area is also provided which may be used by the routine to contain temporary data that may occur during the execution of the process.

FIGS. 20a and 20b are flow diagrams for the network connection calling routine. The execution of this routine begins at the point labeled start A in FIG. 20a. Steps 900 to 904 perform a screening function that tends to eliminate as much unnecessary work as possible in this routine. This is an important consideration in a real time system since time not used in one routine can be gainfully employed by some other routine. To achieve this goal, the service request queue outpointer is accessed at step 900 and is checked at step 901 to determine if any entry is available in the service request queue. If there is no entry in the queue, the routine will exist since there is no originating traffic being generated. If an entry is obtained from the queue it is saved in the scratch pad area of the memory at step 902 and the register busy-free indicator BFIND is interrogated to determine if a free processing register is available at step 903. If the processing register is available, it is assigned to the entry obtained from the queue and the new status of the BFIND is saved for updating at a later time in the routine.

The processing register selected is initially set to "0" at step 904 and the entry obtained from the queue is tested to determine if the entry is a line or trunk number at step 905. A line number is characterized by having a zero mark in bit position 15 of the queue entry word while a trunk number has a one marked in the bit position. If the entry obtained from the queue is a trunk number, a trunk label is stripped off and the trunk number stored in the junctors/trunk register JTR word of the processing register involved at step 910, the BFIND is updated and the bit position assigned to the processing register involved is set to a "1" in the dial pulse indicator DPIND at step 915.

The in and out pointers associated with the service queue are adjusted to reflect the new status of the queue at step 916. While the detailed operation required to update the pointers is considered a housekeeping task, the end result of the task is interrogated at step 917. If the queue is not empty, which implies another entry resides in the queue, the routine will loop back to start A and will now attempt to handle the next entry in the service queue. If the queue is empty, the appropriate inhibit flag is set in the outpointer at step 918 and the execution of the routine ends.

If the entry obtained from the queue is judged to be a line number at step 905, a scan order is issued to the timer in the mark and hold control 62 at step 919. If the mark and hold control is busy, the routine will exit at step 920, the basic reason for checking the status of this control element is to insure that the control can execute only one command every 30 milliseconds. In contrast the network connection routines can generate, on the average, new commands for the mark and hold control 62 every one millisecond. To insure an orderly execution of commands by this control unit, the control timer must be checked. If the hold control is busy, it is needless to proceed any further since the generation of a new command by the routine will not be carried out.

If the mark and hold control is free, the AB mask that pertains to the line number in question is obtained from the mask table in the memory and saved in the scratch area at step 921. The location of the proper AB mask within the mask table is a function of the line number. The six most significant bits of the line number are placed in a work register and the least significant bit of the number is forced to "0." The resulting number is the index number or the location of the entry in the AB mask table that contains the desired mask. Since each entry in the AB mask table contains two masks for two separate first stages, bit position 4 of the line number is interrogated to determine if it is odd or even (0 or 1). If the bit in question is a "0," the AB mask required occupies the right half of the entry while a "1" means the mask required occupies the left half of the entry.

A search is now made of the busy-free junctor/trunk table BFT to determine if a free junctor exists in the system. The search loop is comprised of steps 922 through 924. The table size or number of entries in the BFT, expressed as a negative number, is loaded into a work register. The table size serves as an index number and is added to the base address of the BFT to obtain the first entry and all subsequent entries therein at step 922. As each entry is obtained from the BFT, it is inspected to determine if a free junctor exists in the entry at step 923. If a free junctor cannot be found, the current index number is advanced by two at step 924 and a test is made to determine if it is negative at step 925. If the index number is negative, the sequence described is repeated until a free junctor is found at step 923 or the index number is no longer negative as determined at step 925. The adding of 2 to the current index results from the arrangement of junctors and trunks in the BFT. Junctors occupy all even numbered entries while trunks occupy odd numbered entries.

If all junctors are busy, the routine will exit since no new connections can be established until one or more junctors become free. If a free junctor is found, the routine continues to the link matching loop labeled by the steps 930 through 933 in FIG. 20b. The number of the free junctors found is saved in the scratch area of the memory at step 930 and the BC mask associated with the junctor is obtained from the mask table at step 931. The foremost significant bits of the junctor number (junctor numbers are 8 bits) are used as an index number to access the proper entry in the BC mask table. Since this portion os the routine deals only with calling or originating connections, the BC mask desired will always occupy the right half of the BC mask table entry. A match is now performed between the AB mask obtained at step 932 and the BC mask at step 931. The match performed at step 932 is to determine which bit positions in the AB and BC masks both have a "1" (free state) in the same bit positions. Step 933 performs the function of detecting the first such match.

If a match cannot be found, there is no free link between the calling line and the junctor selected. The current index number will be advanced by 2 at step 935 and if the index number is still negative at step 936, the search for another free junctor will be initiated by the junctor search loop at steps 922 through 925 (FIG. 9). If the index number is not negative when tested at step 936, a blocking condition exists within the switching network. The term blocking as used in a switching network describes the condition where free junctors or trunks are available, but no free path (AB or BC link) exists that can connect a free junctor or trunk to the line in question.

If a match is found and a free link is available, the update loop formed by the steps 940 through 945 is executed. Step 940 updates the AB and BC masks to reflect that the bit position where the first match was detected is now busy (set bit position to 0). Step 941 updates the BFT to reflect that the free junctor chosen is now busy while step 942 packs the line number involved in the connection and the free link found (B matrix) into the equipment in use table EIU. The junctor number involved in the connection is used as an index number to locate the proper entry in the equipment in use table in which the line number and link number are stored. Step 943 collects the data necessary to set up a path through the switching network and distribute the data to the mark and hold control 62. The data required to set up a connection is the line number, junctor number and link switch number. Step 944 stores the junctor number being used and the tone code for dial tone in the junctor word of the processing register found at step 903 and also marks the dial tone DT bit in the ACR word. The tone connection indicator TOINT is marked in the bit position corresponding to the processing register being used at step 945 so that dial tone will be applied to the connection. The remainder of the loop is now executed at steps 915 through 918 wherein the functions described earlier are performed in connection with these steps.

FIGS. 21*a* and 21*b*, when combined, provide a flow diagram of the terminating portion of the network routine. The execution of the routine starts at point TX. The number of processing registers containing information that must be processed by the routine is contained in the network connection indicator NCIND. Any processing register requiring the use of the process is detected at step 950. If there are no registers requiring the use of the process, the routine will exit. If a processing register is found that requires the use of the routine, the DGR work contained in the register is obtained at step 951. The contents of DGR is checked to determine if a line number or a trunk number is contained in DGR at step 952.

If a line number resides in DGR, the line-to-line loop of the routine will be executed. The line-to-line loop consists of steps designated 955 through 958 and 975 through 977. The line number contained in DGR is checked at steps 955 and 956 to determine if it is a valid number. A valid line number is defined as any number within the bounds of the system. If the line number is not a valid number, step 971 is entered and the tone code for fast busy tone is stored in the JTR word of the processing register. The NCIND is updated at step 973 which removes the processing register in question from the indicator and loops back to step 950 to look for more work.

If the line number is a valid number, the busy-free line table is checked to determine if the line number is free or busy. If the line number is busy, the tone code for busy tone is stored in the JTR word of the processing register at step 971. Step 973 is then entered and the sequence described for this step is repeated. If the line number is free, the line to trunk mark LTM control word is set to "0" at step 958. The LTM control word will be used later in the routine to determine what tables, tone conde and indicators should be updated. The line number in DGR is checked at step 975 to determine if the line number has a listed class of service. If the line number in question is not listed, a call will not be permitted at step 976 and the sequence described for step 973 applies. If the call is permitted, the junctor number contained in JTR is modified at step 977 to reflect the terminating or called side of a junctor.

The BC mask associated with the modified junctor number is obtained at step 980 along with the AB mask associated with the line number obtained at step 981 (FIG. 21*b*) and a match is obtained between the two masks at step 982. If a match cannot be found (indicating no available link) at step 983, the sequence described for step 973 is executed. The matching sequence employed by the routine is the same as the sequence use in the calling portion of the routine. If a link is available, the mark and hold control 62 is checked to determine if it is busy or free. If the control is busy, the routine will exit and the set up of the call involved will be delayed until the control is free. If the control is free, the AB and BC masks are updated at step 990 (FIG. 12) in the same manner as performed in connection with the terminating routine.

Continuing in FIG. 12, the LTM control word is checked at step 991 to determine if it is a "1." Since the content of DGR was a line number, the LTM control word will be "0" and steps 997, 998 and 999 will be executed. Step 997 will update the busy-free line table to reflect the fact that the line number in question is busy to all other callers. Step 998 will set the tone code for the ringing/ringback into the JTR word of the processing register while step 999 will mark the tone indicator TOIND in the bit position that applies to the processing register involved. Steps 993 and 994 perform the same function described in the calling routine and step 995 removes the processing register involved from the NCIND and the NCT routine exits.

The calling sequence just described assumes a line-to-line or locally generated call. A line-to-line call is characterized by a line number in DGR and a junctor number in JTR. A call that originates from other than a local line is handled via a trunk circuit and is termed a trunk-to-line call. A trunk-to-line call is processed in a similar manner as a line-to-line call except that the trunk number involved is modified at step 977 (FIG. 21*a*) to reflect the internal or incoming side of the trunk.

If it is determined that the contents of DGR is not a line number at step 952, the routine interprets the data as being a request for a trunk. The routine recognizes a trunk request by checking bit position 15 in the DGR word. If the position is a "1," the data contained in DGR pertains to a trunk.

The request of a trunk requires that the existing connection between a line and a junctor be released and a new connection be set up between the line and the trunk desired. Since an existing connection must be released, the release queue RELQ is interrogated at steps 960 and 961 to determine if the queue is full. If the queue is full, fast busy tone will be returned at step 971 and the NCIND will be updated at step 973. Under these conditions, the line requesting a trunk is denied service due to the unavailability of equipment at the time of the request.

If the queue is not full, bit position 14 is checked at step 962 to determine if the trunk requested is a dedicated trunk (single trunk number) or if the trunk is a member of a group (two or more trunk numbers) which requires a search or hunting for a free trunk. If trunk hunting is not required, the 8 bit dedicated trunk number is obtained from DGR at step 964 and the LTM control word is marked at step 966. The line number requesting the trunk is retrieved from the equipment in use table at step 968 and the identity of the line number is stored in an entry of the equipment in use table that is located by the junctor that is presently connected to the line. Using the line number retrieved from this table and the trunk number obtained from DGR, a free link is found by matching the proper AB and BC masks. The matching and detecting of a free link is accomplished at steps 980 through 983.

The availability of the mark and hold control 62 is checked at step 984 and if available, the AB/BC masks are updated at step 990 (FIG. 21*c*). The LTM control word is checked for a "1" and since the trunk number is being processed by the terminating routine, step 991 will produce a YES. Step 992 is entered and the junctor number of the junctor that is presently connected to the line requesting the trunk is placed in the release queue. The in and out pointers are updated for the release queue and the BFT table is updated to reflect the busy state of the trunk to be used and the processing register is released by placing a "1" in the processing register busy-free indicator BFIND. The line number requesting the trunk is now placed in the equipment in use table along with the free link of the second stage matrix found at step 993. The entry in the equipment in use table is the entry associated with the trunk number. It should be noted that the line number occupies two entries in the equipment in use table, first is an entry associated with a junctor and second is an entry associated with a trunk.

The data required to set up a connection between the trunk and line number is assembled (line number, trunk number, line switch number ) and distributed to the mark and hold control 62 at step 994. The NCIND is updated at step 995 and the routine will then exit.

If trunk hunting is required as determined at step 962 to find a free trunk within a group of trunks, the trunk hunting steps designated 963 – 965 are executed. The data contained in DGR for this case is a special code that contains the first trunk number in the group and the last trunk number in the group. Due to the number of bits in a word, the data received by the terminating routine is in a condensed form. To set up the start and stop trunk numbers, the condensed data is divided into its component parts and expanded to produce two 8 bit trunk numbers, one for the start point and one for the end or stop point. Since a sequential trunk hunting scheme is employed, the first trunk in the group (start point) is checked to determined if it is busy or free by testing its bit position in the BFT. If it is determined at step 965 that the trunk is free, the routine proceeds in the same manner as described for a dedicated trunk number. If the first trunk is not free, the next trunk in the group is tested until a free trunk is found or the stop point (last trunk in the group) is reached. If a trunk cannot be found, a fast busy tone is returned at step 971 and the NCIND is updated at step 973. The routine will now look for more work.

It is claimed:

1. A stored program data processing system for use in control of the operation of load equipment, such as a telephone system, comprising a memory providing a plurality of data storage areas for storing data including programs of instruction made up of plural cycles of steps, logic control means operatively connected to said memory for manipulating and logically operating upon data necessary to control of said load equipment in response to said programs of instructions stored in said memory, peripheral control means connected between said logic control means and said load equipment for providing to said logic control means electrical indications relating to the instantaneous operating condition of said load equipment and for providing from said logic control means to said load equipment control signals capable of effecting the required control of said equipment, instruction translating means operatively connected to said logic control means for providing actuation of said logic control means in accordance with the cycles of steps of respective instructions derived from the programs stored in said memory, and cycle control means connected to said instruction translating means and said logic control means for effecting sequential actuation thereof to provide control for each respective cycle on an instruction in a prescribed order.

2. A stored program data processing system as defined in claim 1 wherein said logic control means includes a plurality of data storage registers, an arithmetic and logic unit selectively connected in parallel with said storage registers for effecting transfer and arithmetic manipulation of data, and switch means for permitting flow of data from a given one of said storage registers to another one of said storage registers through said arithmetic and logic unit.

3. A stored program data processing system as defined in claim 2 wherein said plurality of data storage registers include address and data storage registers connected to said memory and an instruction register connected at its output to said instruction translating means, said address and data storage registers having outputs connected to an input of said arithmetic and logic unit for transferring data therethrough to an input of said instruction register.

4. A stored program data processing system as defined in claim 3 wherein said plurality of data storage registers further includes a pair of addressable registers connected in parallel with each other and with said arithmetic and logic unit.

5. A stored program data processing system as defined in claim 3 wherein said plurality of data storage registers further includes an instruction address register connected in parallel with said arithmetic and logic unit for storing the address of the storage location of an instruction being performed by the system.

6. A stored program data processing system as defined in claim 3 wherein said plurality of data storage registers further includes address scan and data transfer registers for transferring addresses and data to said peripheral control means and for receiving data from said peripheral control means.

7. A stored program data processing system as defined in claim 2 wherein said logic control means further includes a controlled number generator connected to the input of said arithmetic and logic unit.

8. A stored program data processing system as defined in claim 2 wherein said arithmetic and logic unit has first and second inputs, a data output and a test output, a full adder and a full subtracter connected between said first and second inputs and said data output, and control inputs for selective application of data to said full adder or said full subtractor for processing.

9. A stored program data processing system as defined in claim 8 wherein said arithmetic and logic unit further includes a carry flip-flop having outputs connected to said full adder and said full subtracter and inputs connected to said control inputs and to outputs of said full adder and said full subtracter for providing products and complements of products of applied data.

10. A stored program data processing system as defined in claim 9 wherein said arithmetic and logic unit further includes first gating means for selectively effecting a direct transfer of data from said first or second input to said data output and second gating means for effecting a complementing of said data on a selective basis.

11. A stored program data processing system as defined in claim 2 wherein said arithmetic and logic unit includes at least one input and a test output, first and second test flip-flops, an exclusive OR gate having a pair of inputs connected to the outputs of said test flip-flops and an output connected to said test output, and gating means for selectively applying data and control signals to control the operation of said test flip-flops.

12. A stored program data processing system as defined in claim 11 wherein said gating means includes a first gate for setting said one test flip-flop and a second gate for selectively connecting said first input to said second test flip-flop upon receipt of a predetermined data impulse, which if a "1" will set said second test flip-flop and block the output of said exclusive OR gate. impulse 13. A stored program data processing system as defined in claim 11 wherein said gating means includes a first gate connecting said first input to the input of said first test flip-flop to set said flip-flop upon receipt of a "1," and a second gate for selectively connecting said first input to said second test flip-flop upon receipt of a pre-determined data impulse, such that if said first flip-flop is set and said predetermined data impulse is a "1" said second test flip-flop will be set and the output of said exclusive OR gate will be blocked.

14. A stored program data processing system as defined in claim 1 wherein said instruction translating means includes instruction decoder means connected to said logic control means for providing an instruction enable output in response to receipt of an instruction signal stored in said memory and instruction cycle decoder means connected to said instruction decoder means for providing a cycle enable output for each cycle of the instruction represented by a received instruction enable output, and encoder means responsive to each cycle enable output for controlling actuation of said logic control means.

15. A stored program data processing system as defined in claim 14 wherein said instruction decoder means includes a plurality of inputs each receiving a respective bit of a bit combination representing an instruction and a plurality of outputs each representing a respective individual instruction forming said stored programs.

16. A stored program data processing system as defined in claim 14 wherein said cycle control means includes machine cycle sequencer means connected to said instruction cycle decoder means for sequentially connecting said cycle enable outputs to said encoder means in said prescribed order.

17. A stored program data processing system as defined in claim 16 wherein said instruction cycle decoder means includes an instruction decoder matrix having first coordinate lines connected to the outputs of said instruction decoder means and second coordinate lines connected to said machine cycle sequencer means such that respective cross-points of the matrix relating to a given first coordinate are sequentially enabled.

18. A stored program data processing system as defined in claim 16 wherein said machine cycle sequencer means includes at least two sequencer sections, one of said sequencer sections being connected to said instruction cycle decoder means and the other sequencer section being connected to said encoder means.

19. A stored program data processing system as defined in claim 18, wherein said instruction translation means further includes pre-processing cycle decoder means providing fixed pre-processing cycle control signals, said machine cycle sequencer means including a third sequencer section connected to said pre-processing cycle decoder for sequentially, enabling application of said pre-processing cycle control signals to said encoder means.

20. A stored program data processing system as defined in claim 19 wherein said third sequencer section and said two sequencer sections are operated in sequence.

21. A stored program data processing system as defined in claim 16 wherein said machine cycle sequencer means includes at least one sequencer section comprising at least first and second flip-flops each having a set input, a reset input, a clock input, and an enable input, a source of clock pulses connected to said clock input of each flip-flop, and gating means connected to said first and second flip-flops for actuating said first flip-flop, then said second flip-flop, the both flip-flops in response to successively received clock pulses.

22. A stored program data processing system as defined in claim 21 wherein said sequencer section has a single input connected to the set input of said first flip-flop, said reset input of said second flip-flop being connected to said set input of said first flip-flop.

23. A stored program data processing system as defined in claim 22 wherein said first and second flip-flops each include a set output and a reset output, and said gating means includes an AND gate having a first input connected to the reset output of said first flip-flop, a second input connected to the set input of said second flip-flop and an output connected to the enable input of said first flip-flop.

24. A stored program data processing system as defined in claim 23 wherein said gating means further includes an exclusive OR gate having a first input connected to the set output of said first flip-flop, a second input connected to the set input of said second flip-flop and an output connected to the enable input of said second flip-flop.

25. A stored program data processing system as defined in claim 21 wherein said gating means includes means for automatically shutting off said sequencer section after completion of a sequence of operation.

26. A stored program data processing system as defined in claim 21 wherein said sequencer section includes at least three flip-flops, said gating means being connected to said three flip-flops for actuation thereof in sequential order, each flip-flop having two enable inputs.

27. A stored program data processing system as defined in claim 26 wherein said gating means includes a first AND gate and a second AND gate for each flip-flop, the outputs of said AND gates being connected to the respective enable inputs of the associated flip-flop and the inputs thereof being connected respectively to the set output of one of the other two flip-flops and to the reset output of the remaining two flip-flops.

28. A stored program data processing system as defined in claim 21 wherein said machine cycle sequencer means includes at least two of said sequencer sections, each sequencer section including an individual input connected to the set input of the first flip-flop of the section, and further including additional gating means for connecting the input of each sequencer section to the reset inputs of all of the flip-flops in the other sequencer section.

29. A stored program data processing system as defined in claim 28 wherein said machine cycle sequencer means further includes first indicator means connected to an output of each sequencer section to provide an indication that no sequencer section is actuated.

30. A stored program data processing system as defined in claim 28 wherein said machine cycle sequencer means further includes second indicator means connected to an output of each of said sequencer sections to provide an indication that more than one sequencer section is actuated at the same time.

31. A stored program data processing system as defined in claim 1 wherein said cycle control means includes a plurality of sequencers for controlling the transfer of data within the system.

32. A stored program data processing system as defined in claim 31 wherein said cycle control means includes a bit sequencer connected to said logic control means for effecting the bit-by-bit transfer of data therein.

33. A stored program data processing system as defined in claim 32 wherein said cycle control means includes a peripheral sequencer connected to said peripheral control means for effecting transfer of data between said load equipment and said logic control means via said peripheral control means.

34. A stored program data processing system as defined in claim 33 wherein said cycle control means includes a memory sequencer connected to said memory for effecting transfer of data to and from said memory.

35. A stored program data processing system as defined in claim 34 wherein said cycle control means includes central control means for sequentially enabling said plurality of sequencers in a prescribed order of operation.

36. A stored program data processing system as defined in claim 16 wherein said cycle control means further includes central control means for controlling operation of said machine cycle sequencer means to reset and increment said machine cycle.

37. A stored program data processing system as defined in claim 36 wherein said central control means includes a central control enable flip-flop providing an enable output to said machine cycle sequencer means to start a new cycle and a machine cycle increment flip-flop providing an increment output to said machine cycle sequencer means.

38. A stored program data processing system as defined in claim 37 wherein said central control means further includes a cycle flip-flop and a reset cycle flip-flop, said central control means having a reset input connected to said reset cycle flip-flop which is connected to said cycle flip-flop and said central control enable flip-flop so that said cycle flip-flop is not reset until the end of a cycle of operation, said cycle flip-flop providing for operation of said central control means.

39. A stored program data processing system as defined in claim 38 wherein said cycle control means includes a plurality of sequencers for controlling the transfer of data within the system.

40. A stored program data processing system as defined in claim 39 wherein said central control means includes an input from said plurality of sequencers connected to reset said central control enable flip-flop.

41. A stored program data processing system as defined in claim 40 wherein said central control means includes an increment enable flip-flop enabled upon actuation of one of said plurality of sequencers, said increment enable flip-flop being connected to said machine cycle increment flip-flop so as to set the latter flip-flop upon being reset by de-actuation of said one sequencer.

42. A stored program data processing system as defined in claim 41 wherein said central control means includes a keep running flipnflop connected to said central control enable flip-flop for setting said machine cycle increment flip-flop in absence of actuation of one of said plurality of sequencers.

43. A stored program data processing system as defined in claim 1 wherein said load equipment includes a telephone system comprising a plurality of subscriber circuits, a plurality of terminating circuits in the form of junctors and trunks, and a multi-stage switching network for interconnecting said subscriber circuits and said terminating circuits in accordance with subscriber requests.

44. A stored program data processing system as defined in claim 43 wherein said peripheral control means includes line scanner and marker means connected to said subscriber circuits for scanning said subscriber circuits for requests for service and marking those subscriber circuits in which requests are detected.

45. A stored program data processing system as defined in claim 44 wherein said line scanner and marker means includes a binary counter having a start input, a stop input connected to each line circuit and an output, line number decoder means connected to the output of said binary counter for sequentially applying a signal to each line circuit those line circuits requesting service connecting said signal to the stop input of said binary counter.

46. A stored program data processing system as defined in claim 45 wherein the line from said line circuits to the stop input of said binary counter is also connected to the input of a data gate connected to said logic control means.

47. A stored program data processing system as defined in claim 43 wherein said peripheral control means includes a terminating circuit mark and release means connected to said terminating circuits for marking and releasing thereof.

48. A stored program data processing system as defined in claim 47 wherein said terminating circuit mark and release means includes mark register means for receiving and storing the identity of a terminating circuit including a switching link from said logic control means, first decoder means for decoding the identity of the terminating circuit and second decoding means for decoding the identity of the switching link, and mark timing means for enabling the output of said second decoding means prior to enabling the output of said first decoding means.

49. A stored program data processing system as defined in claim 48 wherein said terminating circuit mark and release means further includes release register means for storing the identity of a terminating circuit to be released, a release decoder connected between said release register and said terminating circuit for releasing a given terminating circuit and release timing means for de-actuating said release decoder after a prescribed time period sufficient to release a terminating circuit.

50. A stored program data processing system as defined in claim 43 wherein said peripheral control means includes a tone sequencer means connected to said terminating circuits for applying dial tone thereto.

51. A stored program data processing system as defined in claim 50 wherein said tone sequencer means includes register means for receiving and storing the identity of a terminating circuit including a tone code from said logic control means, first decoder means for decoding the identity of the terminating circuit and second decoding means for decoding the identity of the tone code, and timing means for enabling the output of said first and second decoding means.

52. A stored program data processing system as defined in claim 51 wherein said tone sequencer means further includes release register means for storing the identity of a terminating circuit from which dial tone is to be released, a release decoder connected between said release register and said terminating circuit for releasing a given terminating circuit and release timing means for de-actuating said release decoder after a prescribed time period sufficient to release dial tone from a terminating circuit.

53. A stored program data processing system for use in control of the operation of load equipment including a telephone system providing a plurality of subscriber circuits, a plurality of terminating circuits in the form of junctors and trunks, and a multi-stage switching network for interconnecting said subscriber circuits and said terminating circuits in accordance with subscriber requests, comprising a memory providing a plurality of data storage areas for storing data including programs of instruction made up of plural cycles of steps, logic control means operatively connected to said memory for manipulating and logically operating upon data necessary to control of said load equipment in response to said programs of instructions stored in said memory, peripheral control means connected between said logic control means and said load equipment for providing to said logic control means electrical indications relating to the instantaneous operating condition of said load equipment and for providing from said logic control means to said load equipment control signals capable of effecting the required control of said equipment, instruction translating means operatively connected to said logic control means for providing actuation of said logic control means in accordance with the cycles of steps of respective instructions derived from the programs stored in said memory, and cycle control means connected to said instruction translating means and said logic control means for effecting sequential actuation thereof to provide control for each respective cycle on an instruction in a prescribed order, said logic control means including a plurality of data storage registers, an arithmetic and logic unit selectively connected in parallel with said storage registers for effecting transfer and arithmetic manipulation of data, and switch means for permitting flow of data from a given one of said storage registers to another one of said storage registers through said arithmetic and logic unit.

54. A stored program data processing system as defined in claim 53 wherein said peripheral control means includes line scanner and marker means connected to said subscriber circuits for scanning said line circuits for requests for service and marking those subscriber circuits in which requests are detected.

55. A stored program data processing system as defined in claim 53 wherein said peripheral control means includes a terminating circuit mark and release means connected to said terminating circuits for marking and releasing thereof.

56. A stored program data processing system as defined in claim 53 wherein said peripheral control means includes a tone sequencer means connected to said terminating circuits for applying dial tone thereto.

57. A stored program data processing system as defined in claim 53 wherein said plurality of data storage registers include address and data storage registers connected to said memory and an instruction register connected at its output to said instruction translating means, said address and data storage registers having outputs connected to an input of said arithmetic and logic unit for transferring data therethrough to an input of said instruction register.

58. A stored program data processing system as defined in claim 57 wherein said plurality of data storage registers further includes an instruction address register connected in parallel with said arithmetic and logic unit for storing the address of the storage location of an instruction being performed by the system.

59. A stored program data processing system as defined in claim 57 wherein said plurality of data storage registers further includes address, scan and data transfer registers for transferring addresses and data to said peripheral control means and for receiving data from said peripheral control means.

60. A stored program data processing system as defined in claim 53 wherein said arithmetic and logic unit includes at least one input and a test output, first and second test flip-flops, an exclusive OR gate having a pair of inputs connected to the outputs of said test flip-flops and an output connected to said test output, and gating means for selectively applying data and control signals to control the operation of said test flip-flops.

61. A stored program data processing system as defined in claim 60 wherein said gating means includes a first gate for setting said first test flip-flop and a second gate for selectively connecting said one input to said second test flip-flop upon receipt of a predetermined data impulse, which if a "1" will set said second test flip-flop and block the output of said exclusive OR gate.

62. A stored program data processing system as defined in claim 60 wherein said gating means includes a first gate connecting said one input to the input of said first test flip-flop to set said flip-flop upon receipt of a "1," and a second gate for selectively connecting said one input to said second test flip-flop upon receipt of a predetermined data impulse, such that if said first flip-flop is set and said predetermined data impulse is a "1" said second test flip-flop will be set and the output of said exclusive OR gate will be blocked.

63. A stored program data processing system as defined in claim 53 wherein said cycle control means includes a plurality of sequencers for controlling the transfer of data within the system and central control means for sequentially enabling said plurality of sequencers in a prescribed order of operation.

64. A stored program data processing system as defined in claim 63 wherein said instruction translating means includes instruction decoder means connected to said logic control means for providing an instruction enable output in response to receipt of an instruction signal stored in said memory and instruction cycle decoder means connected to said instruction decoder means for providing a cycle enable output for each cycle of the instruction represented by a received instruction enable output, and encoder means responsive to each cycle enable output for controlling actuation of said logic control means.

65. A stored program data processing system as defined in claim 64 wherein said instruction decoder means includes a plurality of inputs each receiving a respective bit of a bit combination representing an instruction and a plurality of outputs each representing a respective individual instruction forming said stored programs.

66. A stored program data processing system as defined in claim 65 wherein said cycle control means includes machine cycle sequencer means connected to said instruction cycle decoder means for sequentially connecting said cycle enable outputs to said encoder means in said prescribed order.

67. A stored program data processing system as defined in claim 66 wherein said cycle control means further includes central control means for controlling operation of said machine cycle sequencer means to reset and increment said machine cycle sequencer means.

68. A stored program data processing system as defined in claim 67 wherein said central control means includes a central control enable flip-flop providing an enable output to said machine cycle sequencer means to start a new cycle and a machine cycle increment flip-flop providing an increment output to said machine cycle sequencer means.

69. A stored program data processing system as defined in claim 66 wherein said instruction cycle decoder means includes an instruction decoder matrix having first coordinate lines connected to the outputs of said instruction decoder means and second coordinate lines connected to said machine cycle sequencer means such that respective cross-points of the matrix relating to a given first coordinate are sequentially enabled.

70. A stored program data processing system as defined in claim 69 wherein said machine cycle sequencer means includes at least two sequencer sections, one of said sequencer sections being connected to said instruction cycle decoder means and the other sequencer section being connected to said encoder means.

71. A stored program data processing system as defined in claim 70, wherein said instruction translation means further includes pre-processing cycle decoder means providing fixed pre-processing cycle control signals, said machine cycle sequencer means including a third sequencer section connected to said pre-processing cycle decoder for sequentially enabling application of said pre-processing cycle control signals to said encoder means.

72. A stored program data processing system as defined in claim 71 wherein said third sequencer section and said two sequencer sections are operated in sequence.

73. A stored program data processing system as defined in claim 66 wherein said machine cycle sequencer means includes at least one sequencer section comprising at least first and second flip-flops each having a set input, a reset input, a clock input and an enable input, a source of clock pulses connected to said clock input of each flip-flop, and gating means connected to said first and second flip-flops for actuating said first flip-flop, then said second flip-flop, then both flip-flops in response to successively received clock pulses.

74. A stored program data processing system as defined in claim 73 wherein said sequencer section has a single input connected to the set input of said first flip-flop, said reset input of said second flip-flop being connected to said set input of said first flip-flop.

75. A stored program data processing system as defined in claim 74 wherein said first and second flip-flops each include a set output and a reset output, and said gating means includes an AND gate having a first input connected to the reset output of said first flip-flop, a second input connected to the set input of said second flip-flop and an output connected to the enable input of said first flip-flop.

76. A stored program data processing system as defined in claim 75 wherein said gating means further includes an exclusive OR gate having a first input connected to the set output of said first flip-flop, a second input connected to the set input of said second flip-flop and an output connected to the enable input of said second flip-flop.

77. A stored program data processing system as defined in claim 75 wherein said gating means includes means for automatically shutting off said sequencer section after completion of a sequence of operation.

78. A stored program data processing system as defined in claim 73 wherein said sequencer section includes at least three flip-flops, said gating means being connected to said three flip-flops for actuation thereof in sequential order, each flip-flop having two enable inputs.

79. A stored program data processing system as defined in claim 78 wherein said gating means includes a first AND gate and a second AND gate for each flip-flop, the outputs of said AND gates being connected to the respective enable inputs of the associated flip-flop and the inputs thereof being connected respectively to the set output of one of the other two flip-flops and to the reset output of the remaining two flip-flops.

80. A stored program data processing system as defined in claim 73 wherein said machine cycle sequencer means includes at least two of said sequencer sections, each sequencer section including an individual input connected to the set input of the first flip-flop of the section, and further including additional gating means for connecting the input of each sequencer section to the reset inputs of all of the flip-flops in the other sequencer section.

81. A stored program data processing system as defined in claim 80 wherein said machine cycle sequencer means further includes first indicator means connected to an output of each sequencer section to provide an indication that no sequencer section is actuated.

82. A stored program data processing system as defined in claim 81 wherein said machine cycle sequencer means further includes second indicator means connected to an output of each of said sequencer sections to provide an indication that more than one sequencer section is actuated at the same time.

* * * * *

UNITED STATES PATENT OFFICE
CERTIFICATE OF CORRECTION

PATENT NO. : 3,662,349
DATED : May 9, 1972
INVENTOR(S) : William F. Bartlett, et al.

It is certified that error appears in the above-identified patent and that said Letters Patent are hereby corrected as shown below:

| | |
|---|---|
| Col. 8, line 69 | "busY" should be ---busy---. |
| Col. 18, line 9 | after "1"; and before the "and" (first occurrence) insert ---if the A input is a "0" and the B input is a "1", the BO output will be a "1";---. |
| Col. 19, line 66 | "fro" should be ---from---. |
| Col. 40, line 73 | "line" should be ---link---. |
| Col. 42, line 46 | delete "impulse". |
| Col. 43, line 37 | "the" should be ---then---. |

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*